US008712426B2

(12) United States Patent
Stine

(10) Patent No.: US 8,712,426 B2
(45) Date of Patent: Apr. 29, 2014

(54) LOCATION-BASED METHOD TO SPECIFY RATIO FREQUENCY SPECTRUM RIGHTS

(75) Inventor: John Andrew Stine, McLean, VA (US)

(73) Assignee: The MITRE Corporation, McLean, VA (US)

(*) Notice: Subject to any disclaimer, the term of this patent is extended or adjusted under 35 U.S.C. 154(b) by 1692 days.

(21) Appl. No.: 11/984,671

(22) Filed: Nov. 20, 2007

(65) Prior Publication Data
US 2012/0238218 A1 Sep. 20, 2012

Related U.S. Application Data

(60) Provisional application No. 60/859,941, filed on Nov. 20, 2006.

(51) Int. Cl.
H04W 4/00 (2009.01)
H04W 72/00 (2009.01)

(52) U.S. Cl.
USPC ...... 455/454; 370/329; 455/426.1; 455/452.1

(58) Field of Classification Search
USPC ......... 370/338, 341, 287, 328, 329, 336, 339; 455/67.11, 67.13, 115.1–115.4, 446, 455/452.1, 452.2, 454, 447, 448, 426.1
See application file for complete search history.

(56) References Cited

U.S. PATENT DOCUMENTS

| 5,983,101 | A * | 11/1999 | Billstrom .................. 455/452.2 |
| 6,850,764 | B1 * | 2/2005 | Patel ........................ 455/450 |
| 6,985,839 | B1 * | 1/2006 | Motamedi et al. .............. 703/6 |
| 7,859,247 | B2 * | 12/2010 | Gianola et al. ............... 455/522 |
| 2006/0031082 | A1 | 2/2006 | Amaitis et al. | |
| 2006/0094371 | A1 * | 5/2006 | Nguyen ..................... 455/67.13 |
| 2006/0143111 | A1 | 6/2006 | Mylet | |
| 2008/0222019 | A1 | 9/2008 | Stanforth et al. | |
| 2008/0222021 | A1 | 9/2008 | Stanforth et al. | |
| 2010/0145745 | A1 | 6/2010 | Stanforth et al. | |
| 2010/0146416 | A1 | 6/2010 | Palmer | |
| 2010/0261423 | A1 | 10/2010 | Stanforth et al. | |
| 2011/0194503 | A1 | 8/2011 | Stanforth | |
| 2011/0231302 | A1 | 9/2011 | Stanforth et al. | |
| 2011/0250915 | A1 | 10/2011 | Stanforth et al. | |

OTHER PUBLICATIONS

Stine, John A., "Enabling Secondary Spectrum Markets Using Ad Hoc and Mesh Networking Protocols", *Journal of Communications*, vol. 1, No. 1, pp. 26-37. Apr. 2006, Academy Publisher.

(Continued)

*Primary Examiner* — Ariel Balaoing
*Assistant Examiner* — Larry Sternbane
(74) *Attorney, Agent, or Firm* — Sterne, Kessler, Goldstein & Fox P.L.L.C.

(57) ABSTRACT

The disclosed methods, systems, and computer-program products generate location-based RF spectrum rights for components in a radio frequency (RF) system. In an embodiment, a location-based spectrum right for an RF system's operational use of RF spectrum includes the spectrum rights of each component of the system, a definition of all locations at which each component might possibly operate, and a specified time period of this operational use. In an additional embodiment, the location-based RF spectrum right include a transmitter right and a receiver right, and the transmitter and receiver rights may be based on a combination of maximum power density, spectrum masks, underlay masks, power maps, locations, minimum power density, start times, end times, protocol specifications, and rules. Most transmitter rights and all receiver rights include propagation maps to articulate the rate at which signals attenuate away from transmitters and toward receivers.

47 Claims, 42 Drawing Sheets

(56) References Cited

OTHER PUBLICATIONS

DARPA XG Working Group, "The XG Vision: Request for Comments", Version 2.0, pp. 1-17, Jan. 2004, BBN Technologies, Cambridge, MA, USA.

Shared Spectrum Company News Release, "Shared Spectrum Company Successfully Demonstrates neXt Generation (XG) Wireless Communications System", Sep. 18, 2006, http://www.sharedspectrum.com/inc/content/press/XG_Demo_News_Release_060918.pdf, Vienna, VA, USA.

DARPA XG Working Group, "XG Policy Language Framework: Request for Comments", Version 1.0, pp. 1-91, Apr. 16, 2004, BBN Technologies, Cambridge, MA, USA.

DARPA XG Working Group, The XG Architectural Framework: Request for Comments, Version 1.0, pp. 1-16, Jul. 2003, BBN Technologies, Cambridge MA, USA.

Berlemann, Lars et al., "Policy Defined Spectrum Sharing and Medium Access for Cognitive Radios", *Journal of Communications*, vol. 1 No. 1, pp. 1-12, Apr. 2006, Academy Pubisher.

* cited by examiner 50 51 52 53 54 55 56
(10, 20, 220, 60, 125, 150, 60, 0)

192 - LOCATION: POINT LOCATION OF A
193 - MAXIMUM POWER DENSITY: 20 dBW/m$^2$
194 - PROPAGATION MAP: (0,0)
195 - POWER MAP: (15, 255, 50, 0, 25, 3, 40, 7, 92, 15, 251, 0, 0)
196 - THRESHOLD POWER DENSITY: -80 dBW/m$^2$

198 CENTER FREQUENCY, $f_c$: 400 MHz,
199 FREQUENCY INCREMENT, $f_i$: 100 KHz
200 SPECTRUM MASK: (67, 80, 87, 30, 107, 0, 147, 0, 167, 30, 187, 80, 255)
201 UNDERLAY MASK: (97, 20, 102, 40, 152, 40, 157, 20, 255)

LOCATION-BASED METHOD TO SPECIFY RATIO FREQUENCY SPECTRUM RIGHTS

CROSS-REFERENCE TO RELATED APPLICATIONS

This application claims priority to U.S. Provisional Patent Application No. 60/859,941, filed Nov. 20, 2006, which is hereby incorporated by reference in its entirely.

FIELD OF THE INVENTION

The present invention relates generally to the field of wireless communications. More specifically, the present invention relates to methods for capturing RF spectrum consumption.

BACKGROUND OF THE INVENTION

Radio frequency (RF) spectrum is a critical resource upon which many people across the world rely on for their safety, employment, and entertainment. Technological advances are making further uses of RF spectrum possible, increasing demand for spectrum and fueling competition among government, public, and commercial sectors for access. In the interest of all it is important to make the use of RF spectrum efficient.

Spectrum is a renewable resource that is finite in any instant of time. However, through its different dimensions of use (i.e, space, time, frequency and bandwidth), spectrum can be distributed to many users simultaneously. The process of distributing spectrum to users is spectrum management. Traditionally, this function has been performed globally through international agreements and nationally by government administrations. Bands of spectrum are divided into allocations that are designated to support particular services. The allocations are subdivided into allotments that may be used by administrations in specified geographic areas. National administrations may further allot the spectrum into channels, specify the conditions of their use, and assign (a.k.a. license) them to users. Historically, the growth in spectrum requirements was accommodated through technology that made the higher frequency bands available for use. Little unassigned spectrum remains, and as such, spectrum management is now the business of reallocating, re-allotting, and reassigning spectrum. This places government, public, and commercial interests in tension, as each has a perceived need for spectrum access and operational and financial stakes in the decisions that are made.

SUMMARY OF THE INVENTION

Accordingly, the present disclosure introduces methods, systems, and computer-program products for articulating the spatial, spectral, and temporal consumption of spectrum of a radio frequency (RF) system.

According to various embodiments of the disclosed processes, a location-based RF spectrum rights is generated for each component in a RF system. In an embodiment, a location-based spectrum right for operational use of RF spectrum includes the spectrum rights of each component of the system, a definition of all locations at which each component might possibly operate, and a specified time period of this operational use. In an additional embodiment, the location-based RF spectrum right include a transmitter right and a receiver right. A transmitter right is generated to specify a location or region that one or more components of a system may emit RF energy and to specify both a spectrum mask and power maps of those emissions. A receiver right is subsequently generated to specify a location or region that one or more receivers of an RF system can operate and a maximum permissible interference from other RF systems using a power map across a band of spectrum specified by an underlay mask. In additional embodiments, some transmitter rights and all receiver rights include propagation maps to articulate the rate at which signals attenuate away from transmitters and toward receivers Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein

DESCRIPTION OF THE DRAWINGS

The present invention is described with reference to the accompanying drawings. The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
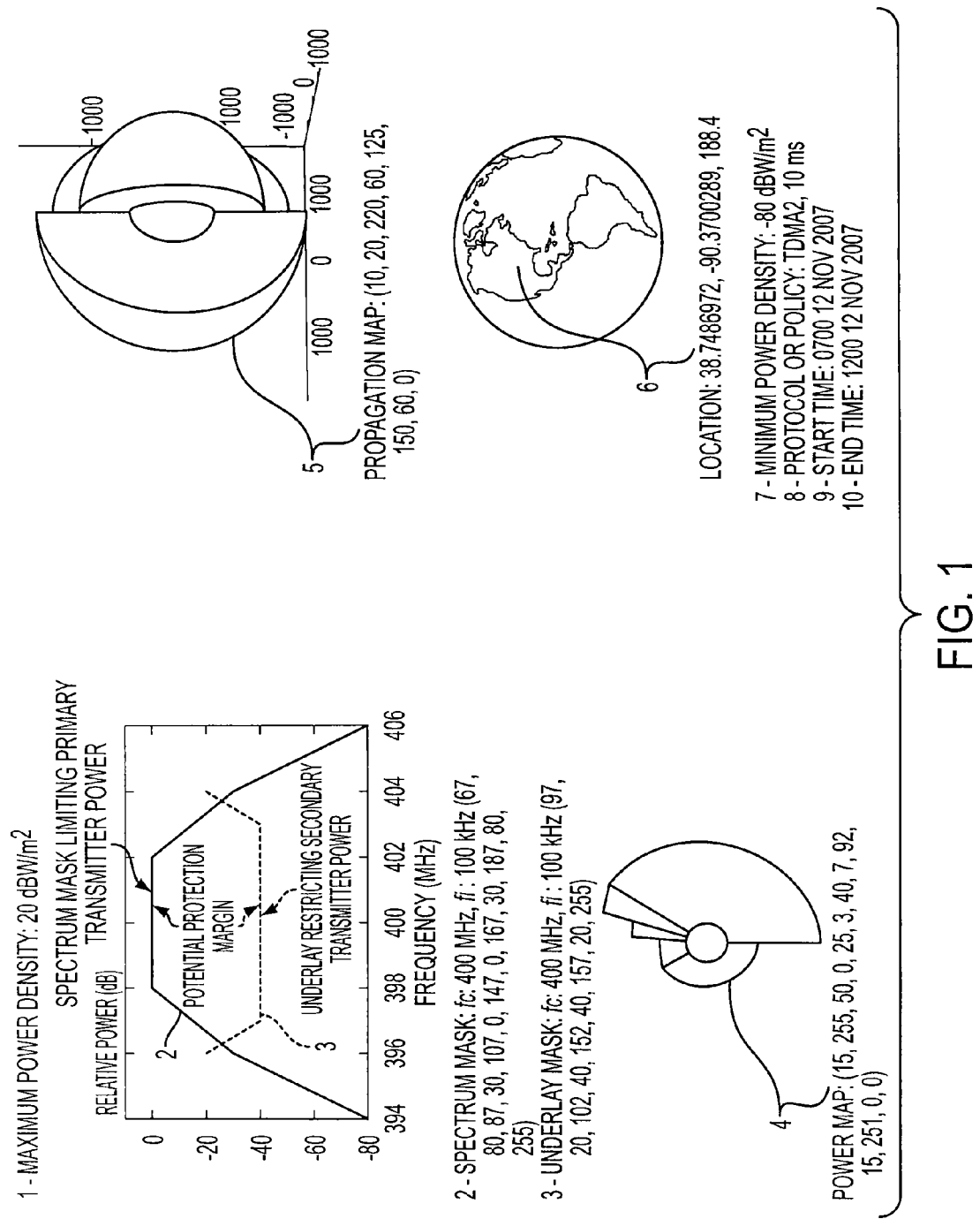
FIG. 1 illustrates examples of the components that may be combined to form a definition of an RF spectrum right.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Introduction

Observations of spectrum use has made it apparent that many users only sporadically use their spectrum or use it in such confined spaces that there are many opportunities for its reuse. Creating efficiency in these circumstances requires more sophisticated spectrum management. Multiple spectrum management approaches have been proposed. In 2002, the Federal Communications Commission (FCC) established a Spectrum Policy Task Force (SPTF) to provide recommendations on how to evolve spectrum policy into an "integrated, market oriented approach that provides greater regulatory certainty while minimizing regulatory intervention." In November of that year it produced a report that as its most significant recommendations proposed that the FCC move more spectrum from the command and control management model to the exclusive use and commons models.

The command and control model is a legacy model where an administration licenses spectrum to users under specific conditions. Changing uses of spectrum is a deliberative process that involves study and opportunities for public comment. The major complaints against this approach are that it is very slow to adapt, it is unfriendly to commercial interests, and it results in inefficient use of spectrum. Nevertheless, the command and control model is still necessary to protect public interests that are not market-driven such as public safety, scientific research, and government operations, and to conform to treaty obligations. Even with the use of the other spectrum management model, the command and control model will remain the overarching spectrum management model, the difference being that parts of the spectrum will have more liberal rules that allow commercial development and changing uses without the administrative proceedings.

The exclusive use model is a licensing approach in which the licensee has exclusive rights to a band of spectrum within a defined geographic region. The licensee has flexibility to implement different technologies and can transfer the use rights. The best example of the exclusive use model in practice is cellular telephony. The licensees develop the technologies, infrastructure and services and transfer spectrum use to subscribers of those services. There are great incentives to promote this model, especially for the most desirable spectrum, because licensees bid for the spectrum which brings revenue to governments and creates the incentive that the licensees apply the spectrum for its best valued use. This model favors service providers.

The commons model opens bands of spectrum for unlicensed use with etiquettes that allow as much coexistence among different applications and users as feasible. Examples of spectrum bands that are managed in this way are the industrial, scientific, and medical (ISM) bands. The 2.4 GHz ISM band has been very successful being used for wireless LAN, personal area networks, microwave ovens, cordless telephones, and other consumer products. Harmful interference among devices, e.g. a cordless telephone with a wireless LAN, is tolerated or is resolved by the owners of the devices. This model favors manufacturers of consumer products.

It is mistaken to place the exclusive use and commons models as equivalents to the command and control model. Movement of bands to these models are outcomes of the command and control process to support business models, service providers and product developers that can provide temporary services to users on an as needed basis.

The FCC has also supported the sharing of spectrum between users in a primary and secondary status. In this approach, secondary users are allowed to use a specified band of spectrum so long as they do not cause harmful interference to the spectrum users. The secondary users must accept all interference from the primary users. In this dual approach to spectrum management, the command and control model designates who is in a primary or secondary status. In many cases, those in the secondary status may be used in a commons model.

In a recent ruling, the FCC opened the 3650-3700 MHz band of spectrum to still another approach to spectrum management. The Commission decided to manage this band using a non-exclusive licensing scheme coupled with a number of provisions designed to allow cooperative shared use of the band. These provisions include a streamlined licensing mechanism and the requirement that equipment that uses the band employ a contention-based protocol to minimize interference. Licenses are granted on a nation-wide non-exclusive basis to licensees that demonstrate that the technology they will employ meets the contention-based protocol requirements. They then must obtain station authorization for each base station they deploy. Licensees and applicants are expected to cooperate in the selection and use of frequencies. To assist, the FCC will maintain a database identifying the locations of all registered stations. However, an existing station in an area does not preclude new stations from being deployed in its vicinity. These stations are expected to cooperate with each other to find a mutually satisfactory arrangement for shared use. Commercial standards are being developed for this model, most notably the IEEE 802.11y standard.

All of these approaches pursue a persistent assignment of spectrum to users and/or uses. The commission attempts to avoid serving the role of a dynamic temporal arbitrator of spectrum use. It recognizes the need for cooperation and, as the rules for the 3650-3700 MHz band indicate, it would prefer that the users cooperate with each other to reuse spectrum both temporally and spatially. Unfortunately, a number of uses of spectrum are sporadic yet intolerant of interference. Further, the users may be mobile and thus only consume spectrum in a small space at any time but must be protected over larger spaces in anticipation that they could move anywhere in those spaces. Persistent arrangements to protect these uses also allow much of the potential spectrum use in these bands to be lost.

The comprehensive assignment of spectrum and the apparent availability of sporadically used spectrum have triggered efforts to find new technologies to share spectrum that will protect these users and still allow spectrum management administrations, like the FCC, to avoid the role of temporal arbitrator. These are broadly categorized as dynamic spectrum access technologies. There are two potential approaches, develop devices that sense the use of spectrum and use it when sensed unused or create technologies that enable a third party arbitrator to manage spectrum in a finer spatial, temporal and spectral resolution.

Current research is seeking a cognitive radio that will autonomously move to and use unused spectrum. As described in the DARPA Next Generation (XG) vision, development consists of four parts, technologies for sensing and characterizing the environment, a language for specifying policy, abstract behaviors that are governed by the policy, and finally the protocols of the communication network. The intent is for the radios to be policy controlled. Policy is written and loaded into a radio under the theory that a regulator would license equipment that can comply with policy and that the regulator then manages the policy used by the radios in their administrative region. The first development goal was to demonstrate that a policy based control of radio use of spectrum could be written and that radios could be built to comply with that policy. Experiments executed in 2006 demonstrated that this was possible.

Spectrum rights in this architecture are provided to a radio in a policy language. The XG Policy Language (XGPL) is intended to be a declarative language based on facts and rules. Policies are encoded as a set of facts and expressions and then rule constructs are used to specify the processing logic for policies. A policy rule consists of three facts: a selector description which defines the spectrum rule applies and where and when it applies; a selector description which defines the conditions for making the spectrum available to the radio; and finally a usage constraint description that defines how a radio may use the spectrum if the selector description is met. The syntax of the language provides an ontology to specify bands of spectrum, geographical regions of applicability (relevant only if the radio has a means to determine its location), time of applicability, and power levels. As typical in a language these can be combined in multiple combinations to specify a usage constraint that can vary by any one or all of these dimensions possibly generating multiple spectrum usage masks that apply to finite regions during certain time periods each day. But in writing a policy, a policy administrator must assess whether the policy protects the spectrum rights of any primary user. To protect a single user, multiple policies for different locations may be necessary and if the location resolution is impractical, a very conservative policy may be the only alternative. Thus the language supports the specification of the spectrum rights of the radio user but the spectrum rights of primary users are not defined and are protected only by how well the policies are written.

This approach has several deficiencies. The predominant philosophy for managing dynamic spectrum access, i.e., equipping each radio with sensors to detect spectrum use and then rule sets that define behavior based on what is sensed fails to account for the fact that the devices that must be protected are normally passive receivers, which may not be detectable. Additionally, sensed conditions frequently misrepresent the use of spectrum on account of environmental effects such as shadowing or fading. Spectrum use predicated on these conditions could cause harmful interference to receivers. Further, a priori commitment to rule sets without certainty where devices will be used can result in overly restrictive policy and uncertain protection. In anticipation that the devices may be used in any location in an administrative region, the rule sets could be overly restrictive in order to manage the worst case. Once a rule set is decided upon, use of the devices would be restricted to the specific geographic regions covered by the rules. Primary spectrum users, administrators, and device users would still be uncertain whether there is sufficient control of devices to prevent the inappropriate interference that results from operating the devices outside the regions for which they were configured. An additional deficiency is if this type of device uses spectrum inappropriately, there is no recourse to fix the problem. It is unlikely that regulators would want to be placed in the position of creating or certifying policy that results in conditional execution based purely on sensed conditions.

Therefore, it would be beneficial to provide a means to specify policy to these types of radios that can better protect passive devices by accounting for location of use. Rather than imposing the burden on regulators to certify policy as being good enough to avoid harmful interference, allow regulators to specify what would be harmful interference, and create cognitive radios that comply with the specification of rights of other users. Unfortunately, the current methods of specifying rights are transmitter focused and do not provide sufficient information to impose a policy on dynamic spectrum access devices. Current methods only specify the allowed radiated power, spectrum of use, and the location of transmitters, and do not convey any information about receivers. Receivers are protected by the licensing process where new transmitter licenses are authorized only after verifying they will not cause harmful interference to legacy users of spectrum. This is an administrative process that is lengthy and typically results in legacy users opposing any new uses. A reason for this contentious environment and the inability of current rights specifications to articulate reuse opportunities by cognitive radios is that receiver rights are ambiguous. A desirable objective is to remove this ambiguity.

Cognitive radios that are preloaded with policy are constrained in their use of spectrum by possible conditions, not actual conditions of spectrum use. There are additional reuse opportunities if spectrum management systems can track actual uses, determine these opportunities, and convey them to radios or other systems that are prepared to reuse the spectrum. We refer to this approach to spectrum management as the fast command and control model (FCCM) of spectrum management. The FCCM vision is for spectrum access to be managed through a network. Rather than spectrum policy being written and loaded into a radio, radios get authorization to use spectrum from a spectrum manager through a network. Radios would be loaded with the logic to conform to the spectrum rights they are informed and, in a fashion similar to the XG vision, the radios can be licensed without commitment to a spectrum policy. Unlike the XG vision, radios do not act autonomously but must connect to a network to get spectrum use rights and these spectrum rights can be cancelled by the spectrum manager. The existence of a spectrum manager and his ability to control spectrum use provides three significant capabilities that could encourage the availability of spectrum for dynamic access. The spectrum manager can assess or validate whether violations occur, it can enforce appropriate spectrum use and so fix problems, and it can be the broker in secondary markets. However, in order to implement the FCCM of spectrum management it is necessary to create a method to convey spectrum rights to systems over the network.

Since the systems that would be managed are wireless, these rights would need to be communicated through the wireless networks. Certain wireless networks, especially ad hoc networks in hostile environments, have a very limited bandwidth. Therefore, it is desirable for spectrum rights messages to be concise to minimize the consumption of this bandwidth.

The consumption of spectrum by any RF system is a function of the environment, the antenna systems that radiate and receive emissions, the specific capabilities of the RF system, specifically the sensitivity of the receivers to interference and then the specific locations or possible locations of the components of a system. The ability of two RF systems to coexist is dependent on the sensitivity of each on the other's use of the spectrum which can vary by system, and as such, consumption is not definitive but relative. Packing RF systems into spaces to get best reuse of spectrum demands a technique that captures the sensitivity of each RF system's use of spectrum on the other.

Numerous spectrum management tools have been developed to collect the plurality of spectrum assignments so that spectrum reuse opportunities can be computed. These tool capture the details of the transceivers, the signals they emit, their antennas, their location and the specific channels they are assigned. Creating a new assignment involves collecting the same information on the new RF system and determining whether it would interfere with existing assignments. Computations that support this assessment are a primary function of the spectrum management tools and are based on models that are populated into the spectrum management tools, in particular the propagation models and the rules about how to consider location in computing interference. The algorithms attempt to prevent all levels of harmful interference. Since the goal of most of these spectrum management tools is to achieve a persistent assignment, the output is typically a yes or no based on the full operational parameters across all possible uses of both RF systems. Thus the resolved solutions and assignments are very conservative. The methods for capturing assignments, each RF system's characteristics, and their operational use do not provide means to differentiate temporal variation in use. Many RF systems cannot consume the full spatial and spectral assignment they are given, and there is no way to make what they do not use available to other RF systems. Since these inefficient assignments are pervasive and since they consume spectrum to an extent where new uses are prevented, removing their inefficiency is the most promising approach to enabling new uses. Therefore, it is desirable to provide a method of articulating temporal and spatial consumption of spectrum of a particular operational use of spectrum. Given such a definition of spectrum use spectrum management tools can manage spectrum with greater temporal and spatial resolution enabling more reuse.

Spectrum management has traditionally been a centralized activity where the spectrum manager carves out an assignment based on conveyed operational use and RF system characteristics. In a highly dynamic environment with a great number of possible uses of RF spectrum, this can be overwhelming for a single office to handle. A desirable objective is to distribute the spectrum management task. For example, each RF system could compute its own compatible use given the rights of others. This is not easy using RF system characteristics as the foundation of computing compatibility since it would require the distributed parts to also have a database of the RF characteristics of the RF systems that use the same spectrum. A better alternative would be to convey the spatial and temporal rights that constrain a RF system's use of spectrum, allow that system to compute its own spatial and temporal right that is compliant with the constraining rights, and then communicate that right as a request to the spectrum manager. To enable such a capability it is desirable to have a method to describe spectrum consumption of an RF system without having to describe the RF system itself as currently required to compute compatible spectrum reuse.

A characteristic of most spectrum management approaches is that the computations that determine compatible reuse are confined to the spectrum manager's tool set. With the current advent of cognitive systems and location awareness, it is desirable that remote systems and individual components in these systems, even individual radios, be able to compute whether they can use spectrum in a way that remains compatible with rights given to other users. It is unreasonable to expect these systems to employ high resolution propagation models especially with the costs involved, both monetary costs for memory, computing power, and rights to use the propagation models, and performance costs resulting from the processing time. Therefore, it is desirable to create spectrum rights that can inform cognitive RF systems how to treat propagation so compatible reuse is less costly to compute. Also, incorporating the propagation model into the right removes ambiguity about the extent of that right.

Many uses of spectrum follow well defined protocols. These protocols exist to arbitrate the shared use of spectrum by the components of a system. Because of the predictability of some protocols it becomes possible for secondary systems to implement other protocols that allow concurrent spectrum use where the secondary system can use spectrum in the same space as the primary without affecting the performance of the primary system. In the general case, it may be possible to create policies that define a behavior to avoid interference to existing systems without committing to a specific protocol within a system. Therefore, it is desirable to create spectrum rights that can account for the protocols or policies that are used by systems so that secondary users can be enabled when their protocols or policies are compatible with primary users.

RF spectrum is considered valuable and getting the most benefit from spectrum can be market driven. However, recent auctions for spectrum used in cellular telephony have resulted in a near permanent movement of spectrum to a specific business entity. Many uses of spectrum do not have a business model as valuable such as government uses for public safety and defense. Further, some uses that are extremely important do not require continuous use. It may be desirable to allow reuse of this RF spectrum in a temporally controlled way that can protect the extremely important use. As described earlier, spectrum management administrations do not want this role; however, because of the potential value of RF spectrum, such a role might be taken-on by a spectrum broker. The economic benefit from the trade of spectrum and its commercial use would encourage greater sharing. In order to broker RF spectrum in this manner it would be necessary to define spectrum as a commodity that can be subdivided or combined and then traded. Therefore, it is desirable to create a method to define a temporal and spatial spectrum resource that can be traded. Such a definition should provide criteria against which to measure compliance.

RF propagation is a complex phenomenon that is difficult to model with certainty. Therefore, precise prediction of the strength of RF emissions in the far field is often unreliable. Thus, a spectrum right should bound the environmental effects in a way that provides adequate protection to the plurality of spectrum users. Tension will occur if the bound affects the value of the resource. The more conservative the right, the more space will be consumed, and some bidders for RF spectrum will request more optimistic definitions that do not consume as much of the resource. If these rights become constraints to other secondary users, and if those secondary users ultimately interfere with the primary user, there will be an issue whether the secondary user is compliant with his rights. Therefore, a spectrum right should have a clear definition of what to measure for compliance that is independent of the actual environment of use.

In view of the above, what would be truly useful is a method to define the spatial and temporal consumption of spectrum of an RF system. Such a method would be generic so that no details of actual RF systems nor access to any particular third party tool would be required for computation of compatible RF spectrum reuse Location-Based Methods for Specifying RF Spectrum Rights FIG. 1 illustrates examples of the components that may be combined to form a definition of an RF spectrum right. A maximum power density 1, a spectrum mask 2, an underlay mask 3, a power map 4, a propagation map 5, a minimum power density 6, a location 7, a specified protocol 8, a start time 9, and an end time 10 embody aspects of the invention. Maximum power density 1 specifies that maximum power density at some designated distance toward any direction from a transmitting antenna for a transmitter right or at a receiving antenna from any direction for a receiver right. Spectrum mask 2 specifies the spectral power density relative to the maximum power density for all frequencies of a transmitter right. Underlay mask 3 specifies the spectral power density relative to a maximum power density at a receiving antenna of the maximum allowed interference of a remote interfering transmission. Power map 4 specifies the variation by direction of the maximum transmitted power density relative to the maximum power density of the right. Propagation map 5 specifies an attenuation model value by direction that indicates the rate of attenuation that should be used for computing compatible uses of spectrum. Minimum power density 6 specifies the attenuation level where transmitted signals are no longer protected. Location 7 may be points at which, a volume within which, or a track along which the components of the RF system receiving the RF spectrum rights may operate. The present invention is not limited to a single method for specifying volume and tracks and for defining location, and one skilled in the art would recognize that the additional methods for specifying volume and tracks and for defining location may be utilized without departing from the spirit and scope of the present invention. The specified protocol 8 is a constraint that restricts the use of spectrum to a particular protocol. The start time 9 is the time that right begins to apply and the end time 10 is the time that it ends. It should be obvious to one practiced in the art that the specific approaches used to specify values by direction for propagation and power maps and to specify power density by frequency does not change the invention.

In one embodiment, the present invention creates RF spectrum rights that have a geospatial limit. For such a system to work, the right must be decoupled from antenna technology, and therefore, transmit power is defined as the effective power density at a specified distance away from the antenna. Transmitters with high gain antennas must still conform to these limits in the rights. The maximum power density specifies that maximum power density of any frequency in the right toward any direction from a transmitting antenna for a transmitter right or at a receiving antenna from any direction for a receiver right. As all other transmitter power constraints in rights are relative to this maximum power density, changing this value changes all power constraints in a right. The designated distance for a transmitter right power density may be specified for a particular right, or be a universally applied distance for all rights being managed, and it should be obvious to one practiced in the art that the specific distance does not change the invention. In one embodiment, the transmitter power densities are specified for the one-meter distance from the centroid of the antenna. These transmit power densities are equivalent to the RP(1 m) in the log distance pathloss model which is described later. One skilled in the art would recognize that additional techniques may explicitly specify the power density for all frequencies and directions without departing from the spirit and scope of the present invention.

A spectrum mask specifies a limit on the power density over a band of spectrum that a transmitter may emit. In one embodiment, the spectrum mask is presented as a piecewise linear graph of power versus frequency, where power is the power density on a dB scale and frequency is either on a linear scale, a logarithmic scale, or any additional scale that would be apparent to one skilled in the art.

In one embodiment, a spectrum mask is specified using a vector of values alternating between frequency and power density of the form, $(f_0, p_0, f_1, p_1, \ldots, f_x, p_x)$, with each sequential pair specifying an inflection point in the mask. These frequency values may be relative to a center frequency and maximum power density, or alternatively, these frequencies may be independent, absolute values. In one embodiment, the relative values are preferred because they allow the spectrum right to have a more general meaning, i.e., they allow the whole spectrum mask to shift by specifying a new center frequency. Since power density in a spectrum right is a function of location, a spectrum mask with relative power densities allows that mask to be applicable to all locations of the right.

Figure 2:
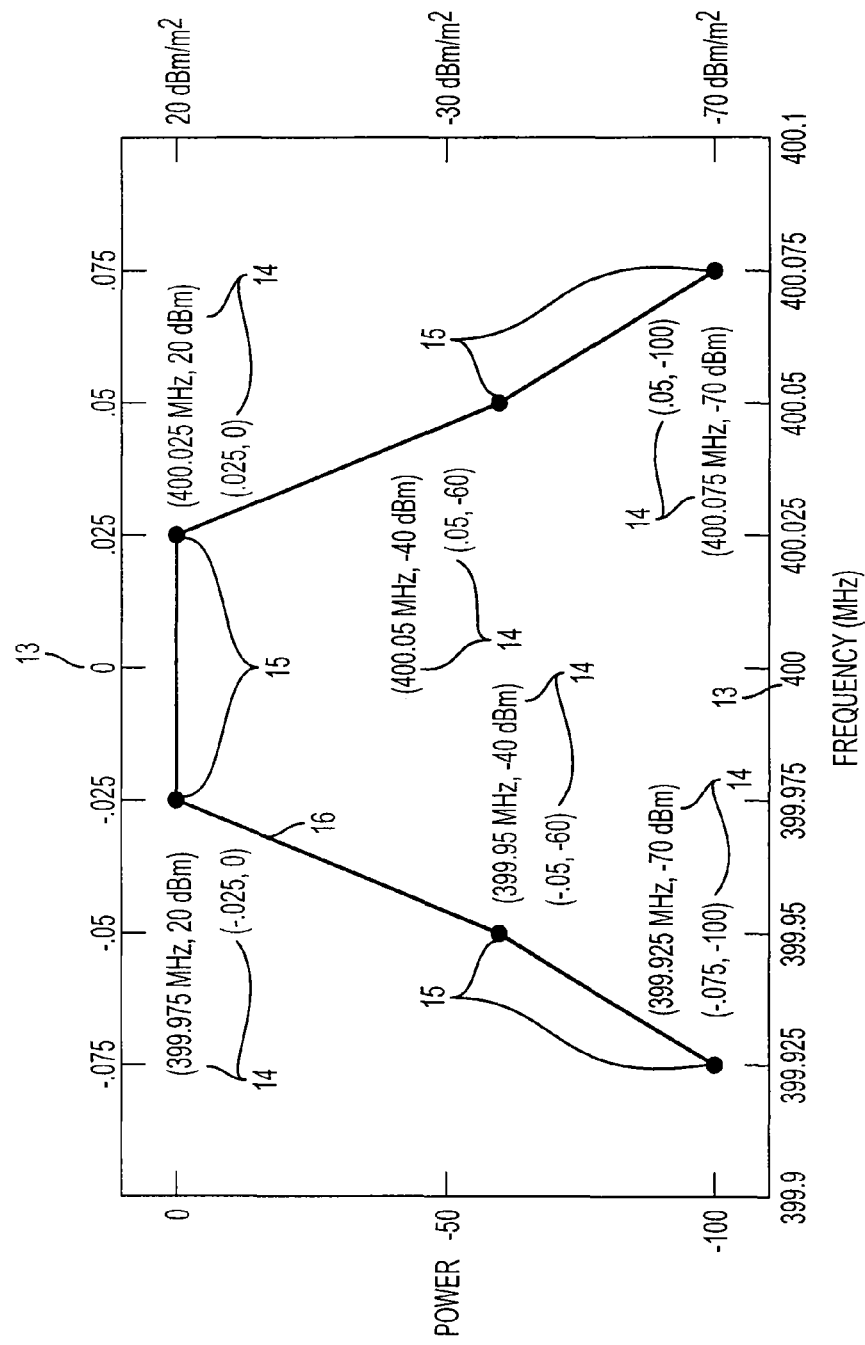
FIG. 2 illustrates an exemplary vector approach for specifying a spectrum mask and its graphical interpretation.

FIG. 2 illustrates an exemplary vector approach for specifying a spectrum mask and its graphical interpretation. Vectors 11 and 12 consists of frequency and power density pairs 14, each of which correspond to inflection points 15 in a piecewise linear spectrum mask 16. The vector 11 consists of absolute values of frequency in MHz and relative power densities in decibels, dB relative to the maximum power density of the mask. The vector 12 consists of frequency power pairs MHz relative to the center frequency, $f_c$ 13, and dB relative to the maximum power level of the mask. In FIG. 2, the power density is the relative power density in dB from the specified maximum power density of the spectrum right. The mask specifies the limit on emitted power by frequency. The emitted power for all frequencies within the mask may not exceed the masks bound and the emitted power for all frequencies outside the mask may not exceed the smallest value specified by the mask. One skilled in the art would recognize that using an alternative approach to specify pairs of values such as using separate vectors for frequency and power density does not depart from the spirit or scope of the invention. One skilled in the art would recognize that alternative approach may be used to specify pairs of values, such as using separate vectors for frequency and power density, without departing from the spirit and scope of the present invention.

Spectrum masks can be made more concise, and therefore more suitable for over-the-air transmission, by encoding the vector into m-bit words, where m is an integer number greater than 1 but, for practical reasons, usually greater than or equal to 8. Each word corresponds to a unique frequency value or a unique power density value. The concise spectrum mask data structure also alternates between the frequencies of the inflection points and their power density levels, e.g. ($f_0$, $p_0$, $f_1$, $p_1$, ..., $f_x$, $p_x$, $2^m-1$). Three values orient the mask, the center frequency of the mask $f_c$, the reference transmission power of the mask (which is usually the maximum power density of the right), and the resolution of the frequency step $f_i$. There are $2^m$ frequency levels where each subsequent value is separated by the specified frequency step resolution. The frequency $2^{m-1}$ maps to the center frequency and the value $2^m-1$ is used just to denote the end of the mask. There are also $2^m$ power levels where 0 represents the maximum power density level of the mask, and each coded value maps directly to a decibel reduction in power from the maximum power.

Thus, the conversions between the frequency coded values and their real values are $$|f| = f_c + f_i(f - 2^{m-1} + 1) \quad (1)$$

$$f = \frac{|f| - f_c}{f_i} + 2^{m-1} - 1$$

where f is the coded value and |f| is the value that is coded. The conversions between the power values are $$|p| = p_c - p$$

$$p = p_c - |p| \quad (2)$$

where all variables use the same decibel power units as $p_c$, p is the coded value and |p| is the real value that is coded. It is assumed that all emissions from a transmitter in the bands outside the spectrum mask are attenuated to below the lowest values in the mask.

Figure 3:
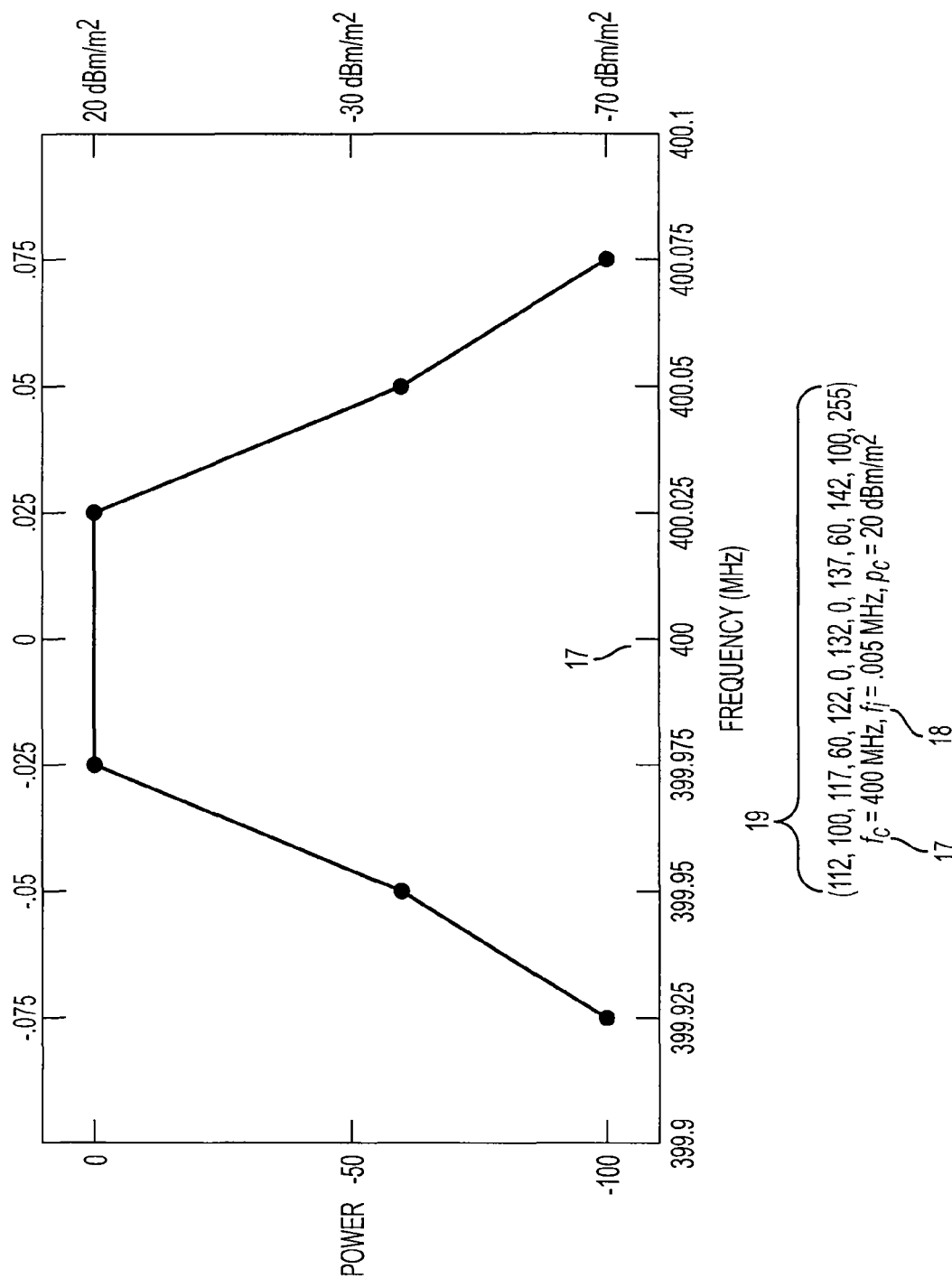
FIG. 3 illustrates a concise vector approach to specify a spectrum mask and its graphical interpretation.

FIG. 3 illustrates the concise vector approach to specify the exemplary spectrum mask depicted in FIG. 2 and its graphical interpretation. The spectrum mask of FIG. 3 uses 8 bit words. The mask first specifies a center frequency 17, a frequency step resolution 18, and then a vector of 8-bit words 19 to define the spectrum mask where 0 dB corresponds to the maximum power density, and the positive power density values are the number of dB below this maximum.

Figure 4:
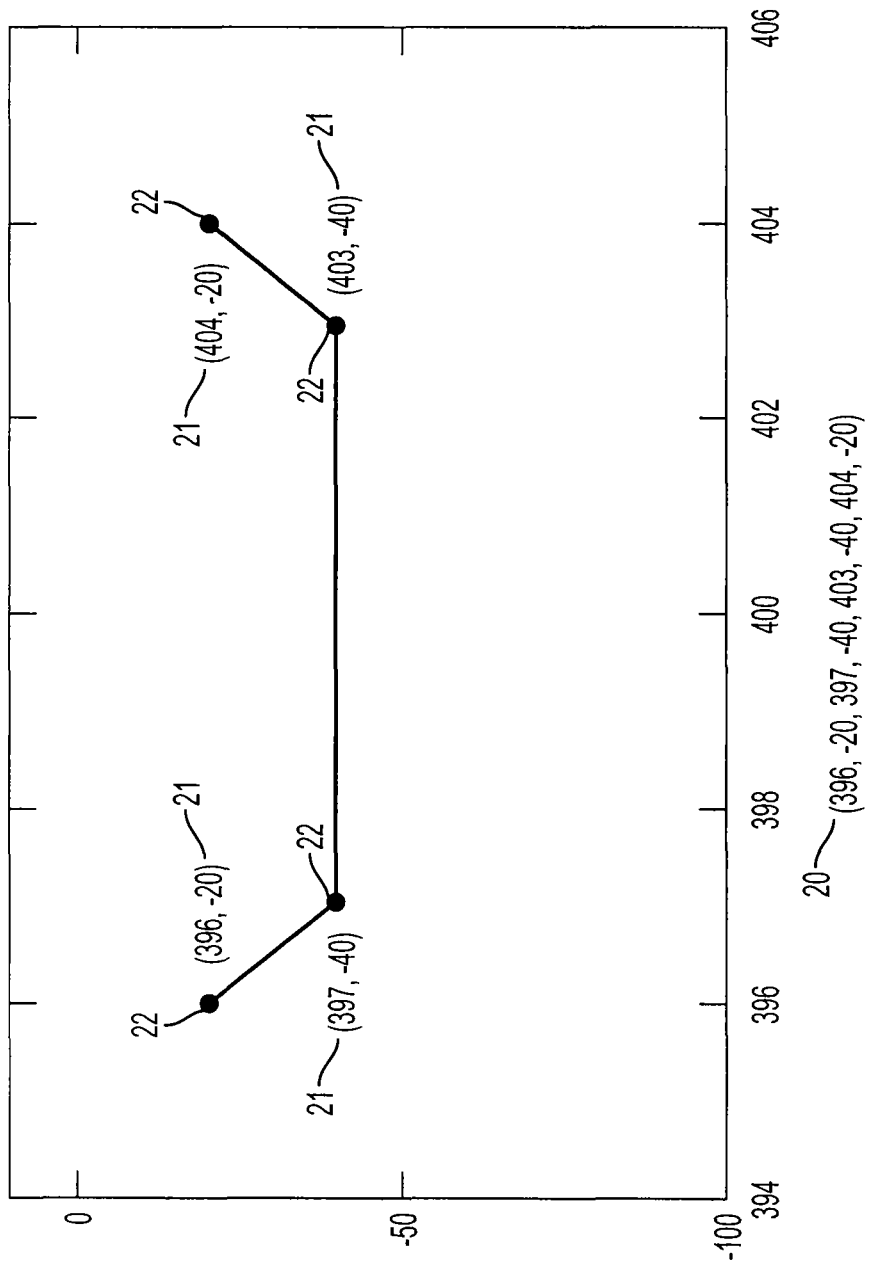
FIG. 4 illustrates a spectrum underlay mask.

An underlay mask is identical in structure to a spectrum mask but has a different function. In one embodiment, the underlay mask defines the maximum interference a remote secondary system may cause at a primary receiver. Further, in additional embodiments, the underlay mask is selected to provide a margin of interference that is expected to protect the primary receivers from harmful interference. FIG. 4 illustrates an exemplary spectrum underlay mask. A vector 20 consist of frequency and power density pairs 21 each of which correspond to inflection points 22 in a piecewise linear spectrum mask. The piecewise linear graph specifies the limit to the power of interfering signals as a function of frequency. However, the restrictions of an underlay mask only apply to the limits of the mask. Identical to a spectrum mask, it consists of a vector of frequency and power density pairs. The power density in these pairs is the relative power density in dB from the specified maximum power density. It is assumed the maximum power density is represented as 0 dB in the underlay mask. Unlike the exemplary spectrum mask described above with reference to FIG. 2, the exemplary underlay mask of FIG. 3 may not have an inflection point at the 0 dB level.

In one embodiment, underlay masks are coded to a concise form using the same approach as used for spectrum masks, where the conversions between the m-bit coded values and real values are the same and executed using equations 1 and 2.

RF emissions attenuate as they propagate from their source. The quantity of attenuation is a function of frequency, distance, and the environment. Precise prediction is usually untenable since total attenuation can vary significantly by slight movements and subtle changes in the environment. Therefore, attenuation trends are more practical to express. In one embodiment, attenuation trends may be represented by a log-distance pathloss model. The log-distance pathloss model is a linear model in which pathloss (PL) and distance (d) are related by PL(dB)=PL(1 m)+10n log(d) on a logarithmic scale and are related by $PL=PL_{1m}d^n$ on a linear scale, where the parameters of the model include the pathloss $PL_{1m}$ of the first meter and the pathloss exponent n. In the log-distance pathloss model, a pathloss exponent of 2 corresponds to the freespace pathloss model, i.e., Friis equation, and larger exponents are used in terrestrial models where reflected signal are likely to result in destructive interference and where atmospheric gases contribute to signal attenuation.

In one embodiment, the log distance model may be used to express spectrum rights in terms of received signal strength. In such an embodiment, an estimated power density RP(dB) at a distance d may be expressed as RP(dB)=RP(1 m)=10n log(d), where RP(1 m) is the allowed power density at 1 meter from the transmitter, and where RP(1 m) and RP(dB) are expressed in decibel units of power, e.g., dBm/m² or dBW/m².

The log distance model supports a distance varying spectrum use right. Rights may be specified to protect transmissions in which case signals attenuate away from the origin or may protect receivers in which case signals attenuate toward the origin. For example, if the pathloss exponent were n=2, then the allowed strength at 100 meters from the protected device would be 40 dB beneath that at 1 meter in a transmitter oriented right and would be 40 dB above that at 1 meter from the 100 meter point in a receiver-oriented right.

The log distance model is generally considered to be an unreliable predictor of pathloss due to the wide variance in pathloss that occurs due to shadowing and multipath fading. Nevertheless, the log-distance pathloss model for spectrum rights possess advantages over comparable models, including, but not limited, the simplicity of the model, as pathloss is linear in the log-log plot of signal strength to distance, and because the model is sufficient to capture the pathloss trend. The variance in signal strength caused by fading and shadowing is accommodated by the protection margin of the right.

Figure 5:
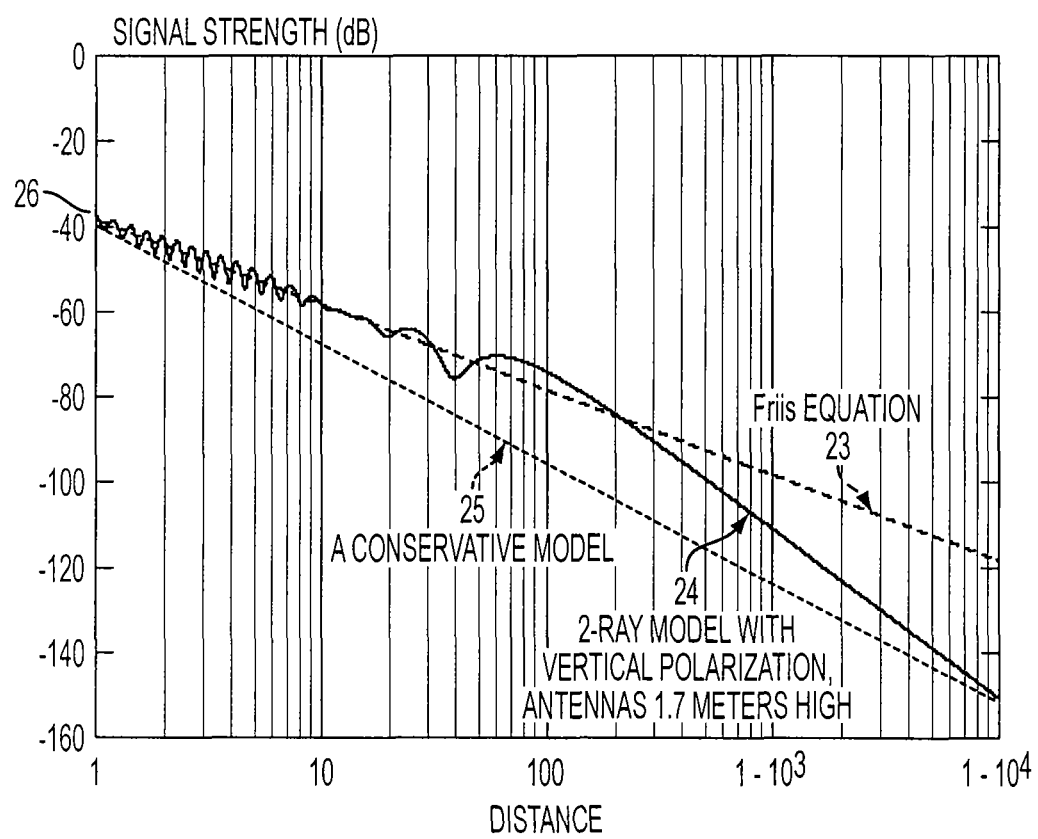
FIG. 5 illustrates a graph of two pathloss models and a linear bound on a dB versus log of distance plot.

FIG. 5 illustrates a graph of two exemplary pathloss models and a linear bound on a dB versus log of distance plot. FIG. 5 illustrates pathloss attenuation as a function of distance for a 2.4 GHz signal using the freespace equation, Friis' equation 23, the two ray propagation model with vertical polarization 24, and then a linear bound 25 that bounds the two ray model performance to the point where the pathloss reaches a specified threshold. In all cases, the signal attenuates 40 dB 26 over the first meter of propagation. In a spectrum right, this initial pathloss of the first meter of propagation would be accounted for in the 1-meter power density that is specified.

Further, FIG. 5 illustrates the suitability of the log distance pathloss model for spectrum rights. Despite the non-linear pathloss of the two-ray model, a linear model can still be used to bound the pathloss that actually occurs in the range of interest. A margin of protection can be created in rights by the choice of the 1 meter power density and the pathloss exponent values in the model and is described further later in this specification.

The initial 1-meter power density of a signal can vary by direction on account of the effects of the emitting antenna. Similarly, the attenuation of signals can vary by direction due to spatially dependent environmental effects. Thus, the spectrum right specifies multiples of these parameters as a function of direction. The data structures that are used to specify parameters by direction are referred to generally as maps and specifically the data structure to capture directional variation in 1-meter power density is referred to as a power map and the data structure to capture directional variation in pathloss is referred to as a propagation map.

Figure 6:
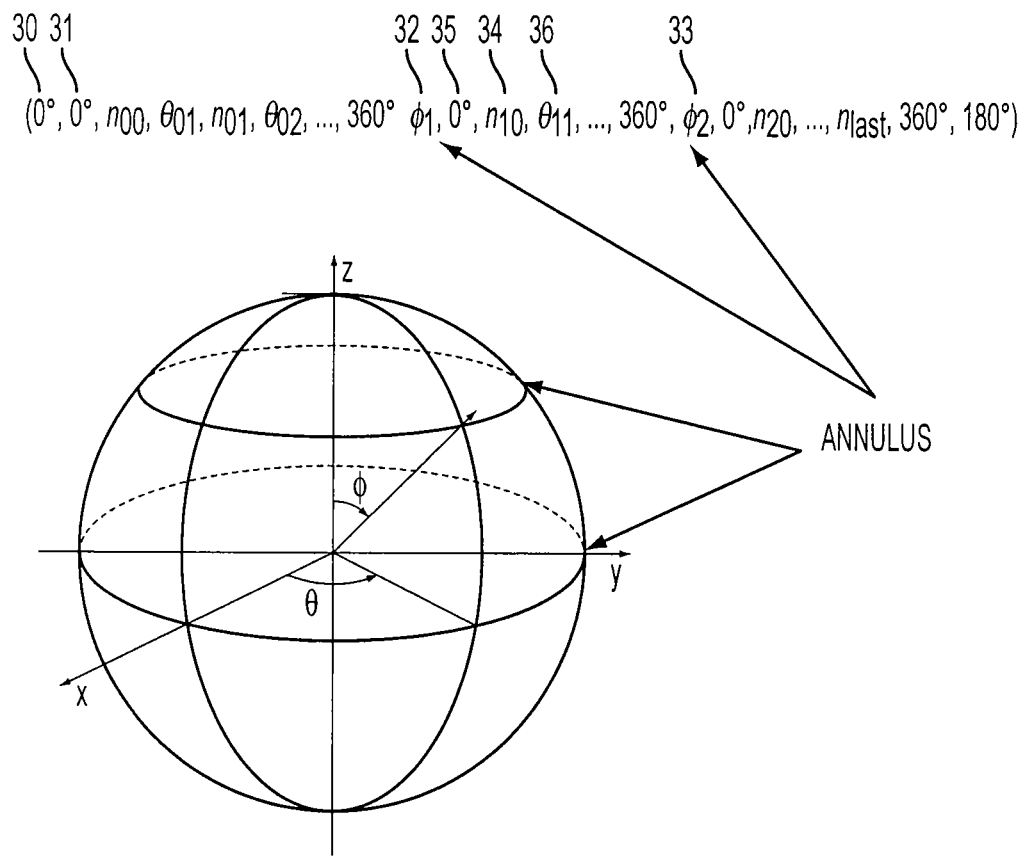
FIG. 6 illustrates an interpretation of the directional maps used to specify power density and pathloss exponents by direction.

In one embodiment, model parameters, such as power densities or pathloss exponents, are specified by direction using a vector that lists azimuths, elevations, and model parameters in a prescribed order so there is no ambiguity as to which elements in the vector represent what type of value and so that the elements collectively specify a model parameter toward all directions. The vector starts with elevations ($\phi$) from the vertical up direction 0° and reaching to the vertical down direction 180°, and azimuths ($\theta$) reaching about the node on the horizon. The first and last azimuths point in the same direction, i.e. 0° and 360°.) The vector uses two latitudes to define a spherical annulus about a node and then a series of parameters and azimuths that specify different parameters on that annulus by sector. One or multiple annuluses are defined ultimately to define parameters for all directions. The number and spacing of elevations and azimuths that are listed in the vector is arbitrary and used as necessary to provide resolution. The form of the vector is (0°, 0°, $n_{00}$, $\theta_{01}$, $n_{01}$, $\theta_{02}$, . . . , 360°, $\phi_1$, 0°, $n_{10}$, $\theta_{11}$, . . . , 360°, $\phi_2$, 0°, $n_{20}$, . . . , $n_{last}$, 360°, 180°). FIG. 6 illustrates an interpretation of this vector. The vector starts in the 0° 30 elevation and the 0° 31 azimuth, and an annulus is specified for each pair of elevations and so from 0° 30 to $\phi_1$ 32 and as called out in FIG. 6 from $\phi_1$ 32 to $\phi_2$ 33.

These elevations bound a series of values alternating between model parameters and azimuths. Each model parameter $n_{xy}$ applies to the sector that reaches from elevation $\phi_x$ to $\phi_{x+1}$ and from azimuth $\theta_{xy}$ to $\theta_{x(y+1)}$. For example, in FIG. 6, the model parameter $n_{10}$ 34 extends from elevation $\phi_1$ 32 to $\phi_2$ 33 and from azimuth 0° 35 to $\theta_{11}$ 36.

In one embodiment, the World Geodetic System—1984 (WGS 84) ellipsoid is used to orient directions for maps. WGS 84 defines an earth-centric ellipsoid to serve as a reference datum for location. Further, WGS 84 is a global system and is the datum for GPS and in this invention is used as the basis of orientation. The horizon of a map, i.e., the plane coincident to the 90° elevation, is the plane tangent to the ellipsoid at the map center. The 0° azimuth direction of the propagation map points in the easterly direction coincident to the WGS 84 latitude grid, and the 90° azimuth points north coincident to the WGS 84 longitude grid. In some cases it is better to point the circular portion of map that is at the map's axis, for example to better model a power map accounting for circular power patterns of dish antennas. In these cases we recommend the convention that it be pointed by defining two rotations from the above orientation, the first about the y-axis pointing in the 0 azimuth and then about the original vertical axis to the correct azimuth. One skilled in the art would recognize that additional methods may be used to orient maps to the earth without departing from the spirit and scope of the present invention.

Figure 7:
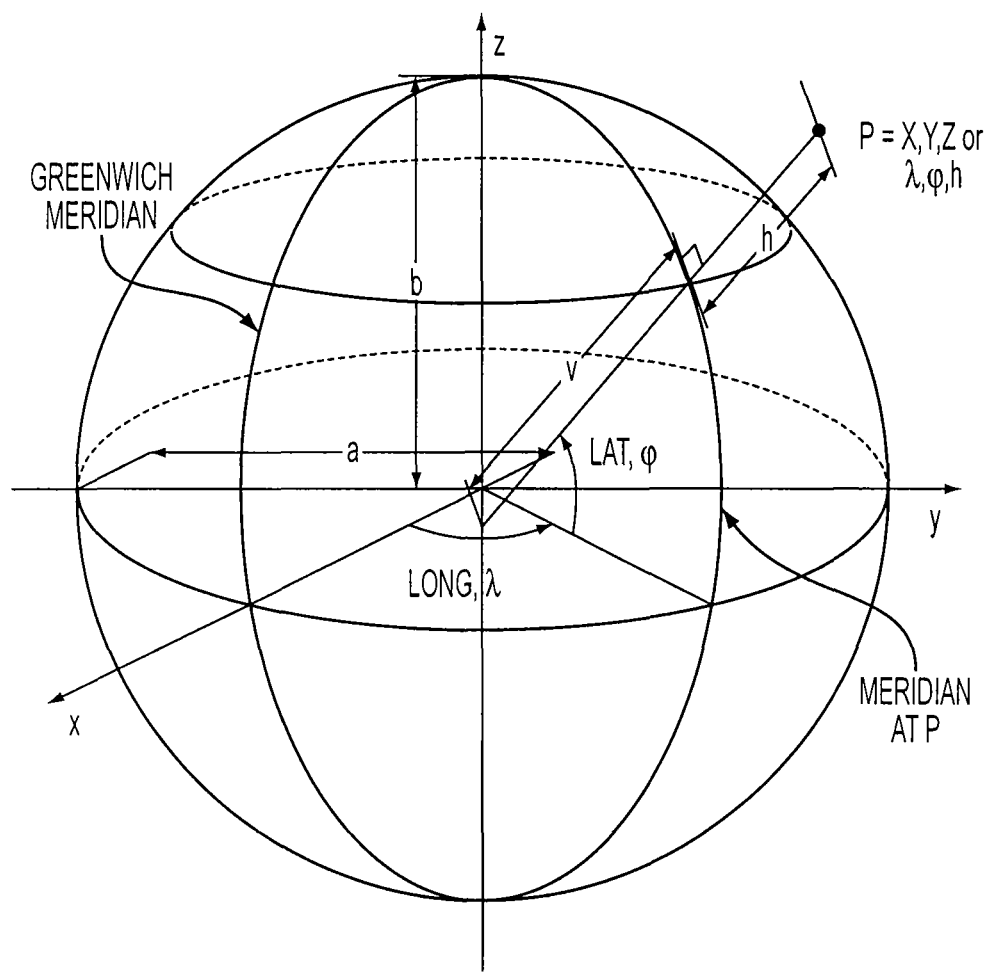
FIG. 7 illustrates the relationship between ellipsoidal and Cartesian coordinates.
Figure 8:
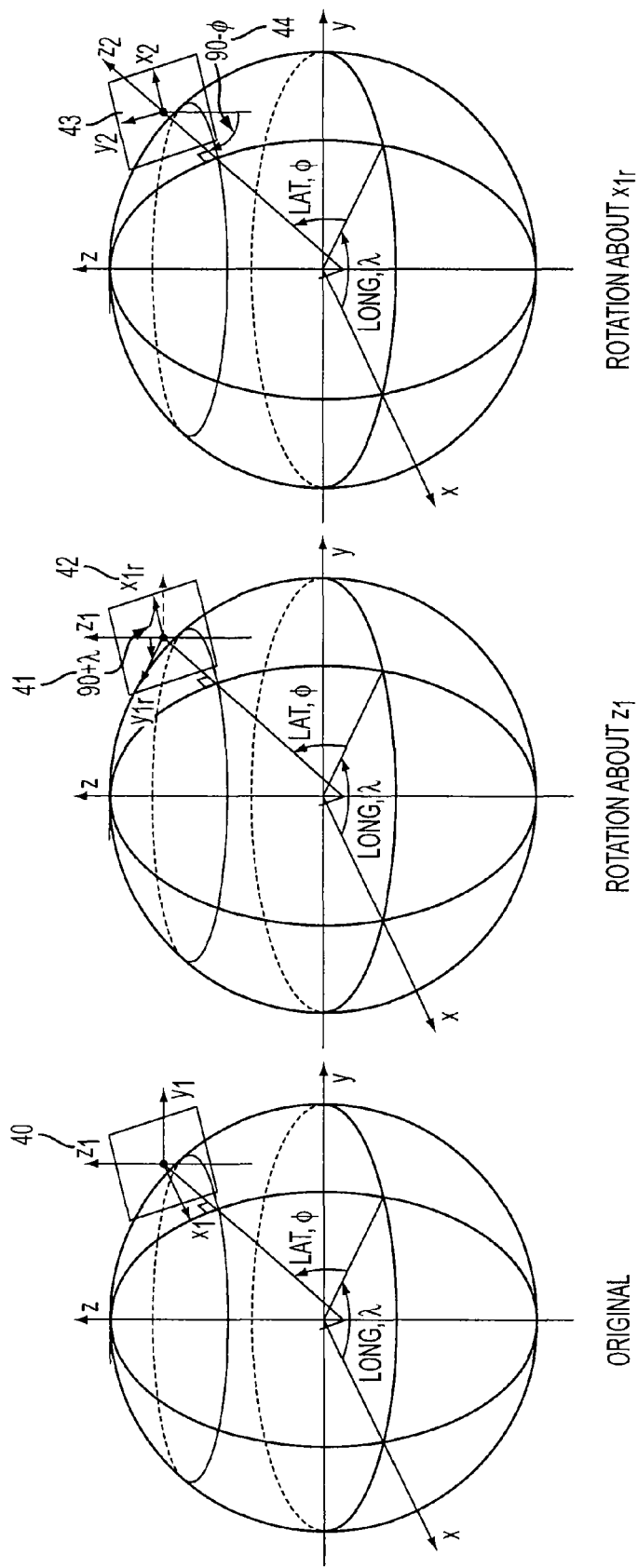
FIG. 8 illustrates the process of creating a map reference coordinate system centered at a point directly using the WGS 84 longitude and latitude of that point.

A map and the directions it specifies are unique to its location, and FIGS. 7 and 8 illustrates an exemplary process for converting a point in WGS-84 coordinates, for making the point an origin of a propagation or power map reference system, for converting other WGS-84 coordinates to that reference system, and for determining direction from the origin to those points.

Ellipsoids are formed by rotating an ellipse about one of its axes, the minor axis in the case of geographical reference datums. An ellipsoid formed by rotating an ellipse about its minor axis has four measures, the diameter of the semimajor axis, a, the radius of the semiminor axis, b, the flattening, f, and the eccentricity, e. These measures are related as follows:

$$f = \frac{a-b}{a} \tag{3}$$

$$e = \frac{a^2 - b^2}{a^2} = \sqrt{2f - f^2}. \tag{4}$$

The minor axis is coincident with the axis of rotation of the earth. For a global datum reference, the center of the coordinate system is located at the center of the earth with the z axis coincident to the minor axis of the spheroid with positive direction toward the north pole. The x axis lies on the equatorial plane pointing toward the meridian passing through the Greenwich Observatory. The positive direction of the y axis is chosen to get a right handed coordinate system.

FIG. 7 illustrates the relationship between ellipsoidal and Cartesian coordinates. In one embodiment, two parameters are needed to specify an ellipsoid: a and b, a and f or a and e. Normally a and f are given. Conversion between ellipsoidal and Cartesian coordinates requires an initial calculation of the radius of curvature of the prime vertical v which is a function of latitude. The geodetic latitude is the angle between the plane at the equator and the geodetic normal to the ellipsoid surface. Note that the prime vertical is perpendicular to the ellipsoid surface and extends to the minor axis and may not intersect at the x, y, z origin. This radius of curvature is determined by:

$$v = \frac{a}{\sqrt{1 - e^2\sin^2\varphi}} = \frac{a}{\sqrt{1 - (2f - f^2)\sin^2\varphi}}. \quad (5)$$

The radius to the point P is (v+h). The WGS 84 Cartesian coordinates follow using the equations:

$$x = (v+h)\cos\phi \cos\lambda \quad (6)$$

$$y = (v+h)\cos\phi \sin\lambda \quad (7)$$

$$z = (v(1-e^2)+h)\sin\phi. \quad (8)$$

Table 1 lists the WGS 84 parameters. The conversion from WGS 84. Cartesian coordinates back to ellipsoidal coordinates is much more involved.

TABLE 1

THE WGS-84 ELLIPSOID PARAMETERS

| Parameter | Value | Units |
|---|---|---|
| a | 6378137 | meters |
| b | 6356752.31245 | meters |
| f | 1/298.257223563 | |
| e | 0.0818191908426 | |
| $e^2$ | 0.00669437999014 | |

FIG. 8 illustrates and exemplary method for converting the WGS 84 longitude and latitude of a point to a propagation map reference system centered at a point. The method of FIG. 8 begins with a Cartesian coordinate system 40 having the same directions as the WGS 84 reference directions. The transformation begins with a rotation about the z axis to bring the y axis to the meridian plane that corresponds to the new system's origin and causes it to point toward the opposite hemisphere. This rotation is (90+λ)° 41. This rotation will bring the x axis 42 to the tangential plane pointing easterly. The second rotation is about the x axis and brings the z axis coincident to the prime vertical and brings the y axis 43 to the tangential plane pointing in the desired direction. The angle of rotation about the x axis is (90−φ)° 44. The coordinate conversion matrix for this new system is the matrix defining these rotations $$R_M = \begin{bmatrix} -\sin\varphi & -\cos\varphi\sin\lambda & \cos\varphi\cos\lambda \\ \cos\varphi & -\sin\varphi\sin\lambda & \sin\varphi\cos\lambda \\ 0 & \cos\lambda & \sin\lambda \end{bmatrix}. \quad (9)$$

The transformation of other WGS 84 Cartesian coordinates to this new system is $$\begin{bmatrix} x \\ y \\ z \end{bmatrix}_{Map} = R_M \left( \begin{bmatrix} x \\ y \\ z \end{bmatrix}_{WGS84} - \begin{bmatrix} x_O \\ y_O \\ z_O \end{bmatrix}_{WGS84} \right), \quad (10)$$

where the coordinates $x_O$, $y_O$, and $z_O$ are the WGS 84 coordinates of the system origin.

Directions from the origin to a point follow directly from their coordinates in the map system. Map azimuths are measured from the x axis about the z axis just as in geodetic systems, however, the elevations are measured from the z axis rather than from the equatorial plane of the system. This latter convention is used to simplify the map construction. The longitude can be determined directly from the x, y, and z coordinates in the map reference system:

$$|\theta| = \tan^{-1}\frac{y}{x}, \quad (11)$$

where the vertical slash about |θ| indicates a true angle and not a coded angle and is used to be consistent with the notation elsewhere. The latitude is determined using $$|\phi| = \cos^{-1}\frac{z}{\sqrt{x^2 + y^2 + z^2}}, \quad (12)$$

where the vertical slash about |φ| also indicates a true angle not a coded angle and is used to be consistent with the notation elsewhere.

Rotations of the map coordinate system to point the map's axis off of the vertical requires two rotations, the first about the z axis to align the 0° meridian with the pointing azimuth, a and then the rotation about the y-axis to bring the axis to the correct elevation φ. The rotation matrix for this transformation is $$R_A = \begin{bmatrix} \cos\phi\cos\alpha & -\cos\phi\sin\alpha & \sin\phi \\ \sin\alpha & \cos\alpha & 0 \\ -\sin\phi\cos\alpha & \sin\phi\sin\alpha & \cos\phi \end{bmatrix}. \quad (13)$$

In one embodiment, maps may be made more concise, and therefore more suitable for over-the-air transmission, by encoding the vector into m-bit words, where m is an integer number greater than 1 and, for practical reasons, usually greater than or equal to 8. A concise map is identical in form to a regular map, except it users a vector of m-bit words where each word is coded and supports specifying up to $2^m$ model parameters mapped to values from some minimum to some maximum value, $2^m-2$ elevations (φ) starting from the vertical up direction and reaching to the vertical down direction (an odd number of latitudes so the middle latitude will point to the horizon), and $2^m-1$ azimuths (θ) reaching about the node on the horizon (the first and last azimuths, 0 and $2^m-1$ point in the same direction). If all sectors were explicitly defined by the map, the map would have the form (0, 0, $n_{00}$, $\theta_{01}$, $n_{01}$, $\theta_{02}$, ..., ($2^m-1$), $\phi_1$, 0, $n_{10}$, $\theta_{11}$, ..., ($2^m-1$), $\phi_2$, 0, $n_{20}$, ..., $n_{last}$, ($2^m-1$), ($2^m-2$)). Since θ=0, θ=$2^m-1$, and φ=$2^m-2$ appear predictably in the vector, the vector is reduced by deleting the obvious. Further, the elevation φ=0, which is no longer used at the beginning, may be used to delimit the end of the vector. The reduced vector becomes ($n_{00}$, $\theta_{01}$, $n_{01}$, $\theta_{02}$, ..., ($2^m-1$), $\phi_1$, $n_{10}$, $\theta_{11}$, ..., ($2^m-1$), $\phi_2$, $n_{20}$, ..., $n_{last}$, 0). The initial value of an unreduced vector is $\phi_0$, and the initial value is always 0 so it is not listed. The initial azimuth value of each annulus is also 0 and therefore, is also not listed. Finally, a vector always ends in the combination ($2^m-1$), ($2^m-2$), and therefore, these two terms are replaced with a single term 0 that would occur out of order for any other interpretation.

The discrete incremental values used to specify directions and exponents in propagation maps are mapped to values. In our implementation the azimuth directions are evenly spaced about the map, with 0 and $2^m-1$ values pointing in the same direction. The conversion from a map azimuth value to an angular direction is $$|\theta| = \frac{\theta \cdot 360°}{2^m - 1}, \quad (14)$$

where θ is the coded value and |θ| is the real azimuth that is coded.

In some embodiments, it is desirable to have greater elevation resolution near the horizon than elsewhere or, alternatively, to have a greater resolution near the axial directions. As a general method to provide the shifting of resolution, apply is applied to incrementally scale subsequent elevation by some scaling factor moving from the axis to the horizon. Given a scaling factor of s, the relation of subsequent values are $$(|\phi+2|-|\phi+1|)=s(|\phi+1|-|\phi|)\phi \leq 2^{m-1}-1$$

$$(|\phi+1|-|\phi|)=s(|\phi+2|-|\phi+1|)\phi > 2^{m-1}=1 \quad (15)$$

where φ is the coded value and |φ| is the real elevation that is coded and where the elevation $\phi=(2^{m-1}-1)$ points to horizon. When the scaling achieves finer resolution at the horizon, s<1, the conversion between values and coded values are $$|\phi| = (1-s^\phi)\frac{90°}{(1-s^{2^{m-1}-1})} \quad 0 \leq \phi \leq 2^{m-1}-1 \quad (16)$$

$$|\phi| = 180° - (1-s^{2^m-2-\phi})\frac{90°}{(1-s^{2^{m-1}-1})} \quad 2^{m-1}-1 < \phi \leq 2^m-2$$

$$\phi = \frac{\ln\left(1-\frac{|\phi|(1-s^{2^{m-1}-1})}{90°}\right)}{\ln(s)} \quad 0° \leq |\phi| \leq 90°$$

$$\phi = 2^m - 2 - \frac{\ln\left(1-\frac{(180°-|\phi|)(1-s^{2^{m-1}-1})}{90°}\right)}{\ln(s)} \quad 90° < |\phi| \leq 180°$$

When there is no scaling, s=1:

$$|\phi| = \frac{\phi}{2^m-2}180°, \quad (17)$$

and when finer resolution is used at the axes, s>1:

$$(18)$$

$$|\phi| = 90° - \left(1-\left(\frac{1}{s}\right)^{2^{m-1}-1-\phi}\right)\frac{90°}{\left(1-\left(\frac{1}{s}\right)^{2^{m-1}-1}\right)} \quad 0 \leq \phi \leq 2^{m-1}-1$$

$$|\phi| = 90° + \left(1-\left(\frac{1}{s}\right)^{\phi-2^{m-1}-1}\right)\frac{90°}{\left(1-\left(\frac{1}{s}\right)^{2^{m-1}-1}\right)} \quad 2^{m-1}-1 < \phi \leq 2^m-2$$

$$\phi = 2^{m-1} - 1 - \frac{\ln\left(1-\frac{(90°-|\phi|)\left(1-\left(\frac{1}{s}\right)^{2^{m-1}-1}\right)}{90°}\right)}{\ln\left(\frac{1}{s}\right)} \quad 0° \leq |\phi| \leq 90°$$

$$\phi = 2^{m-1} - 1 + \frac{\ln\left(1-\frac{(|\phi|-90°)\left(1-\left(\frac{1}{s}\right)^{2^{m-1}-1}\right)}{90°}\right)}{\ln\left(\frac{1}{s}\right)} \quad 90° < |\phi| \leq 180°$$

In one embodiment, the power density model parameters are coded in a concise power map vector in the same manner as that used for concise spectrum masks. The pathloss exponent model parameters in concise propagation map vectors are coded such that subsequent coded exponents estimate nearly equidistant change in propagation range from the largest to the smallest exponent value. Range is the distance to where attenuation causes a signal to go below a threshold, RT, according to the model, and the smallest exponent value estimates the furthest range. The conversion equation may be created from a nominal RP(1 m) and RT and selected values for $|n_{low}|$ and $|n_{high}|$. A process to create the conversion equation first determines a maximum and minimum range predicted by the nominal RP(1 m) and RT and the selected values for $|n_{low}|$ and $|n_{high}|$. Further, the incremental distance, $d_{inc}$ expressed by the exponents determined by:

$$d_{low} = 10^{\left(\frac{RP(1m)-RT}{10|n_{low}|}\right)} \quad (19)$$

$$d_{high} = 10^{\left(\frac{RP(1m)-RT}{10|n_{high}|}\right)}$$

$$d_{inc} = \frac{d_{low} - d_{high}}{2^m - 1}.$$

The conversions between the coded exponents and the actual exponent values are $$n = \frac{d_{low} - 10^{\left(\frac{RP(1m)-RT}{10|n|}\right)}}{d_{inc}} \quad (20)$$

$$|n| = \frac{RP(1m) - RT}{10\log(d_{low} - n \cdot d_{inc})},$$

where n is the coded value and |n| is the real elevation that is coded. As demonstrated, the interpretation of the concise propagation map is dependent on the method to code the exponents. In practice, the method may be explicitly defined by regulation or be arbitrary dependent on the decision of the map's creator. In the case of the latter, the map must be accompanied with the values used in the conversion, specifically $|n_{low}|$, $|n_{high}|$, RP(1 m), and RT. Other techniques could be employed to code pathloss exponents, one skilled in the art would recognize that additional techniques may be used to code these model parameters without departing from the spirit or scope of this invention.

Figure 9:
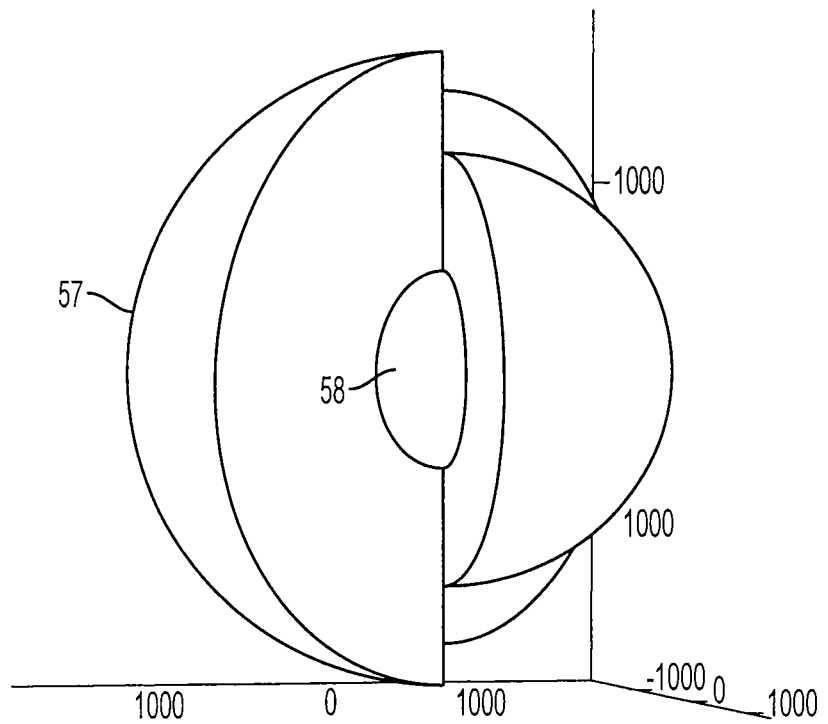
FIG. 9 illustrates a surface plot of the range predicted by an example propagation map.
Figure 10:
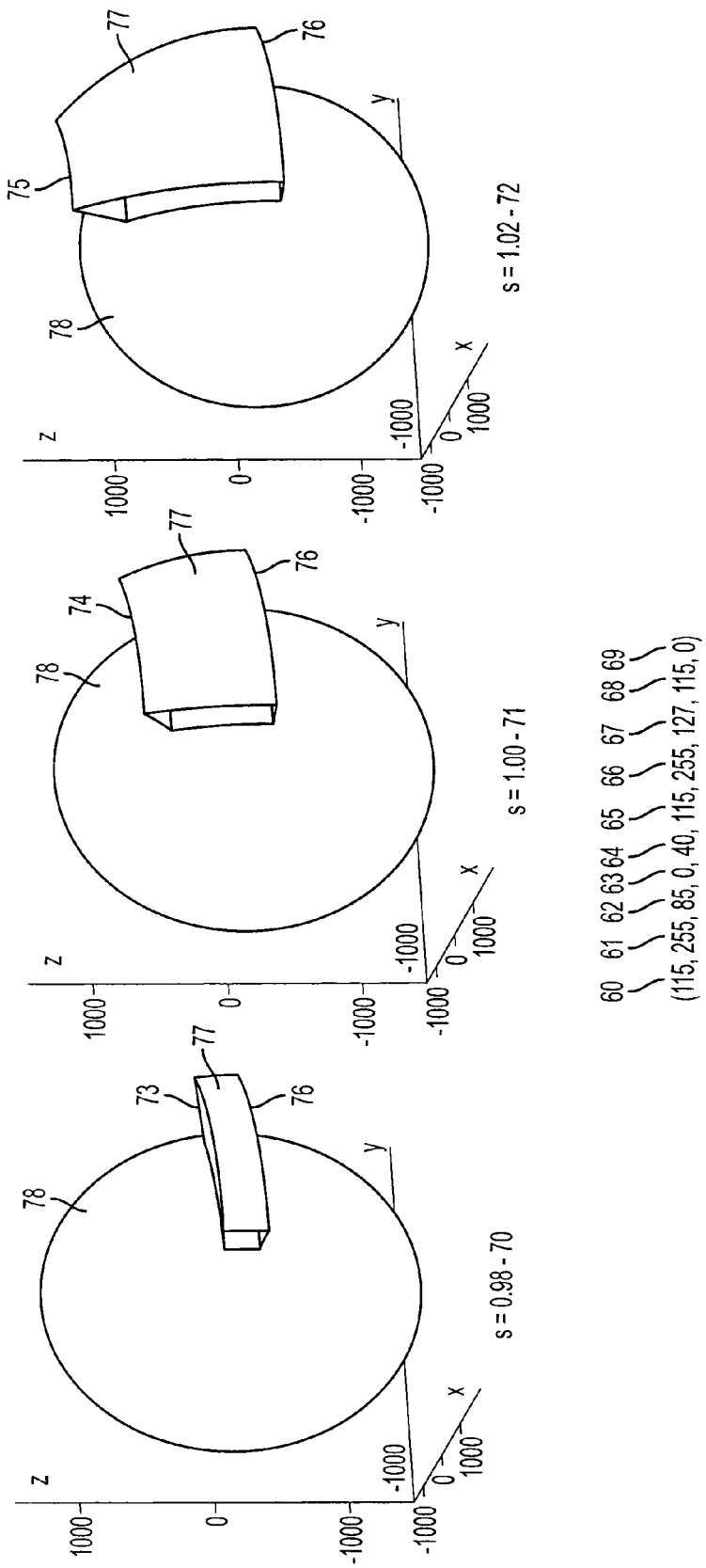
FIG. 10 illustrates surface plots of the range predicted by a common propagation map vector using different scaling factors.

FIG. 9 and FIG. 10 illustrate the interpretation of concise propagation maps. The parameters in Table 2 calibrate the map, and the power density is assumed isotropic. The surface of these propagation maps identify the range from a transmitter where the signal strength threshold, RT, is reached. FIG. 9 illustrates an exemplary surface plot of the range predicted by an example propagation map. The exemplary surface plots of FIG. 9 demonstrate an ability to specify different exponents by azimuth. In FIG. 9, all values in the vector are coded, and the meanings of the values are known by their position. For example, an exponent 10 50 extends from an azimuth 0 to an azimuth 20 51; an exponent 220 52 extends from azimuth 20 51 to an azimuth 60 53; an exponent 125 54 from azimuth 60 53 to an azimuth 150 55; and an exponent 60 56 applies the rest of the way around the map. There are no elevation breaks in the example of FIG. 9. In propagation maps, smaller exponents generally predict larger ranges, and therefore, a surface 57, which corresponds to exponent 10 50, is further from the center than a surface 58, which corresponds to exponent 220 52.

FIG. 10 illustrates exemplary surface plots of the range predicted by a common propagation map vector using different scaling factors. FIG. 10 illustrates a map with elevation breaks and describes the effect of the scaling factor on the actual elevation values. An exponent 115 60 extends from azimuths 0 to 255 61, and the next value in the vector, 85 62, is the coded value of an elevation. In the second annulus, an exponent 0 63 applies to a sector from azimuths 0 to 40 64, and then an exponent 115 65 extends the rest of the way around to an azimuth 255 66. Since this is the end of the annulus the next vector value, 127 67, is an elevation value. The last annulus has an exponent value 115 68. As 0 69 follows 115 68, an exponent 115 68 applies all the way around the annulus and down to the last elevation. The solid angle projections differ because they use different scaling factors. With scaling factors of 0.98 70, 1 71, and 1.02 72, the coded value for the elevation 85 62 corresponds to actual values 79.99° 73, 60.24° 74, and 34.71° 75, respectively. As elevation 127 67 represents the horizon, so elevation 127 62 has an actual value of 90° 76 for all scaling factors. As described in FIG. 10, the exponent 0 implies greater range 77 than the range 78 implied by exponent 115.

TABLE 2

PROPAGATION MAP PARAMETERS
(General design parameters for propagation map definition)

| Symbol | Description | Value |
| --- | --- | --- |
| $f_c$ | Center frequency | 400 MHz |
| $P_c =$ (RP(1 m)) | Maximum 1-meter power density | −24 dBm/m$^2$ |
| RT | Receive power threshold | −80 dBm/m$^2$ |
| $n_{high}$ | Largest pathloss exponent | 10 |
| $n_{low}$ | Smallest pathloss exponent | 2 |
| m | Number of bits per word | 8 |

A location in a spectrum right may be specified as a point, a volume, or a movement track. In one embodiment, the WGS 84 coordinates of a point may be used to specify the point. These coordinate can be converted into whatever reference coordinate systems is being used when computing the compatibility of rights or policy compliance in reuse. Volumes may specified using a definition of a solid primitive oriented by one or more points, a series of points to define an irregular volume, or a set of solid primitives where either their intersection, their union, their difference, or some combination of these operations define the volume. Tracks convey the movement of systems and so indicate the location of a component with a temporal reference, i.e., given a time the track will reveal a point location for an object. There is usually uncertainty about the exact location of an object, and as such, the variance of this position may be specified by a solid primitive, i.e., given a time the track reveals the reference point of a solid primitive. A track may be periodic such as a satellite orbit or be a discrete trajectory. A number of additional techniques may be used for specifying volumes and tracks and other coordinate reference systems might, and one skilled in the art would recognize that any of these techniques could be used to specify location without departing from the spirit and scope of this invention.

In one embodiment, the possible location of protected receivers about a stationary transmitter may be determined by specifying a minimum power density to specify the attenuated signal strength that together with the maximum power density, power map, and propagation map define the boundary of that transmitter's right. The boundary is the point at which a transmitted signal specified by the right attenuates to the strength of the minimum power density using the specified propagation map. Only receivers within this boundary are protected. The minimum power density value may be specified as an absolute power density or as a relative power density to the maximum power density, although the absolute power density is recommended in some embodiments.

Protocols make the use of spectrum by systems more predictable and so enable opportunities for secondary users to exploit that predictability and use the same spectrum in the same space, and examples of such protocols include, but are not limited to, the predictability of chirping rates of radars that allow communications systems to communicate between chirps and communications systems that use time division multiple access protocols where secondary systems can use the space within unused slots to communicate. Further, protocols can be intentionally designed to allow multiple different users to share spectrum. Protocols can be quite varied, and it is anticipated that protocol compatibility will involve some certification process that verifies the compatibility. Thus, it is also anticipated that the entity managing rights will know which protocols are compatible. Conveying the protocol to use involves identifying the protocol and specifying key operating parameters of that protocol which might include timing information and carrier sensing sensitivity. In various embodiments, the present invention may incorporate any of a number of specific naming convention for protocols and specifying parameters.

Cognitive RF systems generally seek an agile use of spectrum, and components of such systems dynamically access spectrum, i.e. momentarily move to unused bands of spectrum for each use. However, methods to control cognitive RF systems are still necessary to prevent chaos and harmful interference. The prevailing method that has been proposed to control these systems is to specify policy. In the LBSR maximum power density, spectrum masks, underlay masks, power maps, propagation maps, and minimum power density describe the spectral and spatial aspects of policy. The behavioral aspects of policy are conveyed in the same way as protocols. The behavioral aspects of policy, like protocols, specify behavior but differ in that their primary focus is to specify behaviors that prevent harmful interference as opposed to behaviors that describe how they use spectrum. Behavioral policies may not specify the details of how the system itself arbitrates the use of spectrum among system components. Thus, behavioral policy allows greater flexibility for the design of these systems while still providing a means to protect legacy uses of spectrum.

For example, a behavioral policy may specify a sensing threshold, abandonment time, and disuse time where the cognitive system components must abandon use of a band of spectrum within the constraint of the abandonment time after sensing a signal at or above the sensing threshold and may not try to use the spectrum until it has been sensed idle for the disuse time. Just as with protocols, it is anticipated that the entity managing rights will know which behavioral policies are compatible with other uses of spectrum. Conveying the behavioral policy to users involves identifying the behavioral policy and specifying key operating parameters of that behavioral policy. This invention has no preference for the specific naming convention for behavioral policies nor the number or method of specifying parameters.

In one embodiment, a naming convention for known behavioral policies and protocols is used in conjunction with the parameters of those behavioral policies and protocols. However, the present invention is not limited to a specific naming convention for behavioral policies or a number or method of specifying parameters, and one skilled in the art would recognize that a number of different conventions be used to describe behavioral policies or protocols without departing from the spirit or scope of the present invention. Similarly, one skilled in the art would recognize that the spectrum management entity may use any number of methods to compose a protocol or behavioral policy without departing from the spirit or scope of this invention.

Many standardized formats exist for specifying time, including, but not limited to those within such standards as ISO 8601. Similarly, many techniques exist to code time into one or more numbers. The present invention is not limited to specific formats for specifying time or specific techniques for coding time, as long as the technique used be concise and avoid unnecessary precision. Precision to the nearest minute is probably sufficient for most location-based RF spectrum rights. Periodic spectrum rights such as daily from a start to end time may be specified in lieu of a single start and end time. The period and the duration of a right within a period may be specified in a number of ways. For example, the period and the duration of the right may be specified by providing a start and end time with a specified repeated duty cycle, e.g., three hours on and then four hours off. In an additional embodiment, a rate with a time of day for the rights, e.g., daily from 6:00 AM to 10:00 AM. One skilled in the art would recognize any number of techniques for specifying the duration of rights may be used without departing from the spirit or scope of the present invention.

Figure 11:
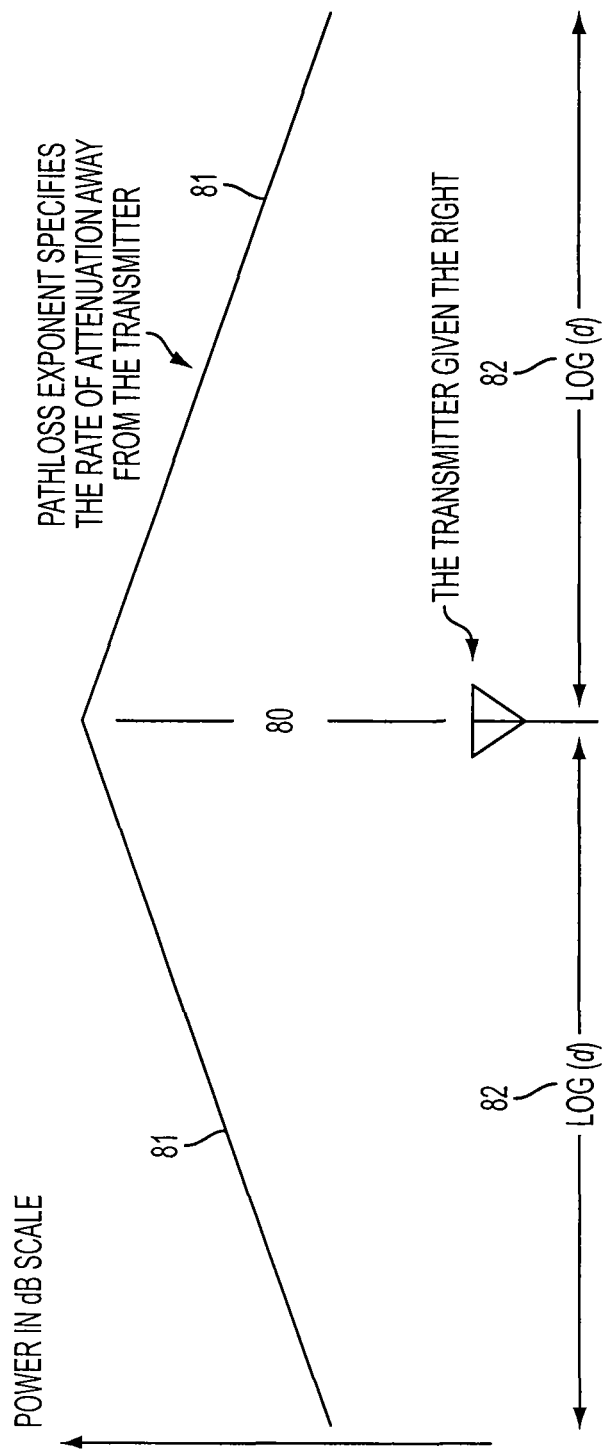
FIG. 11 illustrates how the attenuation specified in propagation maps applies to transmitter rights.
Figure 12:
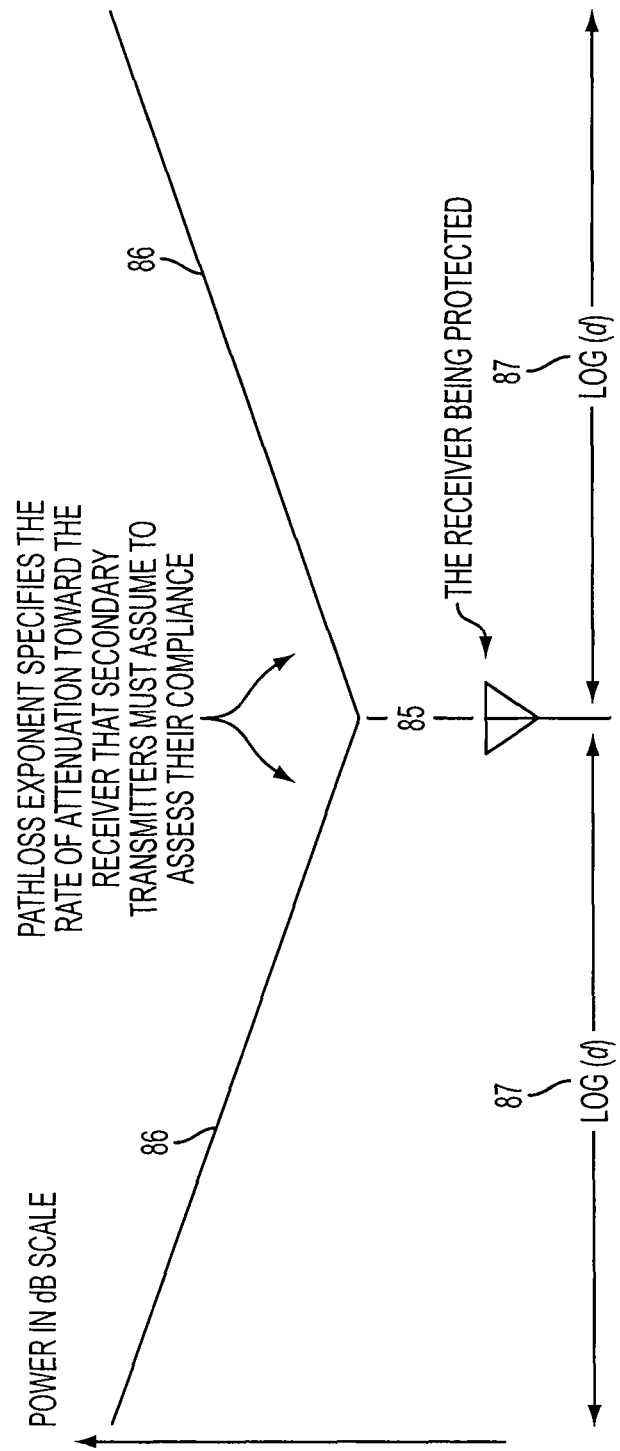
FIG. 12 illustrates how the attenuation specified in propagation maps applies to receiver rights.

In one embodiment, spectrum rights may be articulated using combinations of the maximum power density, spectrum masks, underlay masks, propagation maps, power maps, locations, protocol specifications, start times, end times, protocols, and policies. These parameters, either singly or in combination, may be used to convey transmitter rights and receiver rights. Transmitter rights specify the allowed power density of emissions from an RF system while receiver rights specify the permitted interference. As a minimum, a transmitter right includes a maximum power density, a spectrum mask, a power map, a location, and optionally a propagation map, minimum power density, and a protocol specification. The assumption in a transmitter right is that the maximum power density and power map specify the maximum strength of the emission and that this strength attenuates as the signal propagates away from the emitting antenna, and FIG. 11 illustrates how the attenuation specified in propagation maps applies to transmitter rights. The strength of the signal is at its maximum at the transmitting antenna 80 and it attenuates linearly 81 in dB with the logarithm of the distance 82 over which the signal propagates. As a minimum, a receiver right includes a maximum power density, an underlay mask, a power map, a propagation map, and a location. The assumption in a receiver right is that the maximum power density and power map specify the maximum strength of an interfering signal at the receiver and that the strength of the interfering signal attenuates as it propagates away from the emitting antenna toward the receiving antenna, and FIG. 12 illustrates how the attenuation specified in propagation maps applies to receiver rights. The strength of the interfering signal is at its minimum at the receiving antenna 85, and the strength attenuates linearly 86 in dB with the logarithm of the distance 87 as the signal propagates toward the receiving antenna. The implication of the receiver right is that an interfering transmitter may transmit at a power no greater than that bounded by the receiver right based on the interfering transmitter's location. FIG. 12 illustrates that authorized secondary users can transmit more power the further they are from the protected receiver. A receiver right is a constraint on distant transmitters and does not grant transmission rights. Timing parameters, start and end times, or definitions of periodic use are combined with transmitter and receiver rights to specify the period they apply.

Creating the Components of Spectrum Rights

Methods for creating RF Spectrum Rights for Systems that Use RF Spectrum are varied and not only capture the specific characteristics of the RF components, but also capture the concept of their operational use. Systems can be designed to comply with a spectrum right, or a spectrum right can be created to capture the specific characteristics of a system. Further, spectrum rights can be created for stationary systems or extended for mobile systems. The embodiments below describe exemplary approaches for creating the component elements of spectrum rights, first for stationary transmitters and receivers followed with explanations of how the rights might differ if the components are mobile.

Figure 13A:
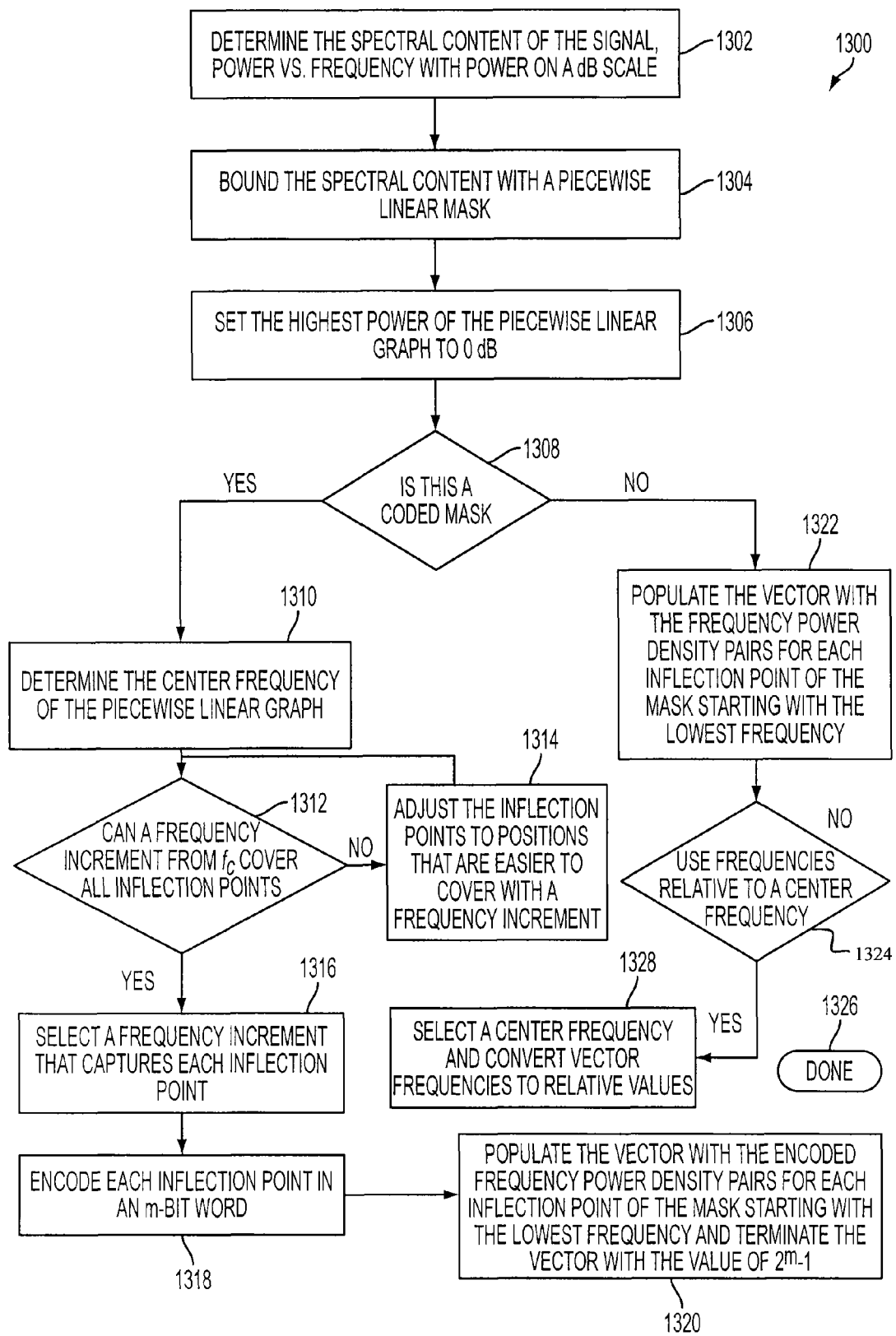
FIG. 13A illustrates an exemplary method for creating a spectrum mask that captures the spectral content of a signal.

FIG. 13A illustrates an exemplary method 1300 for creating a spectrum mask to capture the spectral content of a signal. In FIG. 13A, step 1302 determines the spectral content of a signal, which may be described as a power of the signal in dB as a function of frequency. Step 1304 then creates a piecewise linear graph of the spectral content that forms the basis of a spectrum mask. In one embodiment, the spectrum mask contains the spectral content margin within some margin of error. In step 1306, the maximum power of the spectrum mask set to 0 dB, a value that should be equivalent to the maximum power of the spectral content.

Step 1308 then determines whether the spectrum mask is intended to be a concise vector. If the spectrum mask were intended to be a concise vector, then step 1310 selects a center frequency for the spectrum mask. Step 1312 then determines whether all of the inflection points of the piecewise linear graph may be covered by a frequency increment from the center frequency. If step 1312 determines that the inflection points are unable to be covered by a frequency increment from the center frequency, then the piecewise linear graph is modified in step 1314 such that the inflection points of the piecewise linear graph support the use of the increment. The exemplary method then passes back to step 1312.

If step 1312 determines that all of the inflection points of the piecewise linear graph are covered by a frequency increment from the center frequency, then a specific frequency increment is selected in step 1316 to capture each inflection point of the piecewise linear graph. Step 1318 then encodes the values of the pairs of frequency and power of each inflection point into a respective m-bit word. In one embodiment, the frequency and power of each inflection point are encoded into an eight-bit word. A vector is then populated in step 1320 with the pairs of frequency and power of each inflection point of the spectrum mask and a terminating value. In one embodiment, the vector is populated with frequency-power density pairs for each infection point starting with the lowest frequency and terminating with the value of $2^m-1$.

If, however, step 1308 determines that the vector is not intended to be a concise vector, then step 1322 creates a vector of absolute values of the frequencies of the mask. In various embodiments, the frequencies of a mask may be relative or absolute, and step 1324 then determines whether the frequencies of the mask should be specified as absolute or as relative. If step 1324 determines that the frequencies of the mask are absolute, then the vector of absolute frequencies of the mask if output in step 1326. However, if step 1324 determines that the frequencies should be specified relative to a center frequency, then step 1326 selects a center frequency and all frequencies in the vector of absolute values are converted to relative values based don the selected this center frequency.

Figure 13B:
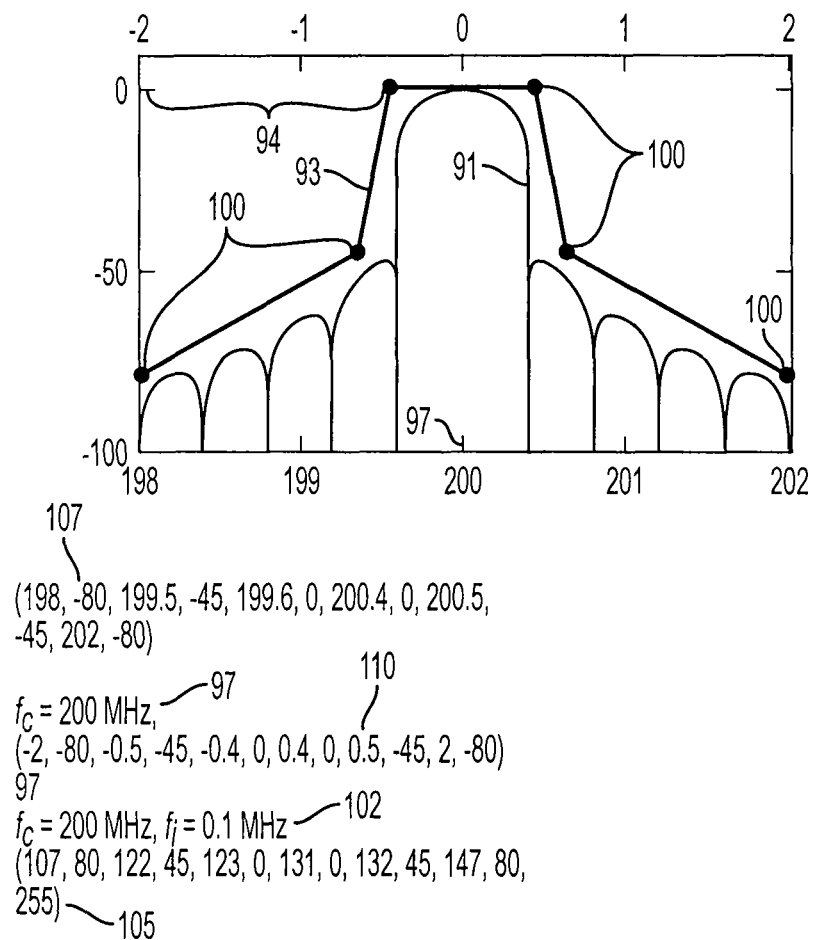
FIG. 13B illustrates the exemplary method of FIG. 13A.

FIG. 13B is an example illustrating the exemplary method of FIG. 13A. In FIG. 13B, a spectral content 91 of a signal is described as a power of the signal in dB as a function of frequency. A spectrum mask, shown generally as a piecewise-linear graph 93, contains spectral content 91 within some margin of error. A maximum power 94 of the spectrum mask is set to 0 dB (shown at 95) and should be the same value as a maximum power of the spectral content.

As described in FIG. 13A, if the spectrum mask is intended to be a concise vector, then a center frequency, $f_c$, is selected for the mask. In the example of FIG. 13A, the center frequency is shown generally at 97 and is selected to be 200 MHz. Next, step 1312 determines whether inflection points 100 may be covered by a frequency increment from the center frequency 97. If the inflection points cannot be covered, then the piecewise-linear graph 93 is modified to adjust inflection point 100 such that inflection points 100 may be covered by a frequency increment. If inflection points 100 can be covered by a frequency increment, then an appropriate frequency increment 102, $f_i$ is selected, and in the example of FIG. 13A, frequency increment 102 is 0.1 MHz. Once a frequency increment 102 is selected, then pairs of values of frequency and power of all the inflection points 100 are encoded, and a vector 105 is populated with the encoded values and a terminating value, the value 255 in the vector. In the example of FIG. 13B, the pairs are encoded using 8-bit words.

If the spectrum mask is not intended to be a concise vector, then, as described in step 1322 of FIG. 13A, a vector of absolute frequencies 107 is created for the spectrum mask. As described above, the frequencies of a mask may be relative or absolute. If the frequencies are absolute, then vector 105 is output from the exemplary method 1300 of FIG. 13A. However, if the frequencies of the mask are relative frequencies, then a center frequency, such as center frequency 97, is selected and all frequencies in vector 105 are converted to values relative to this center frequency. The final vector with relative frequencies is shown generally at 110.

In an additional embodiment, underlay masks may be created for receivers. One question that must be answered for a receiver is what amount of interference can it tolerate. Given this answer, an underlay mask relative to the receive signal is drawn and its vector is created in the exact same manner as the spectrum mask except the power values are relative to the signal strength not the maximum value of the mask. Underlay masks are selected to provide sufficient margin for signal reception to account for variations in attenuation that can occur in the environment of the right. The amount of margin is balanced with the selection of pathloss exponents in the propagation map of receiver rights. Both can contribute to protection from interferers, e.g., a propagation model that underestimates the attenuation of an interfering signal from a secondary transmitter will cause the secondary transmitter to use a lower transmit power than is necessary.

Figure 14:
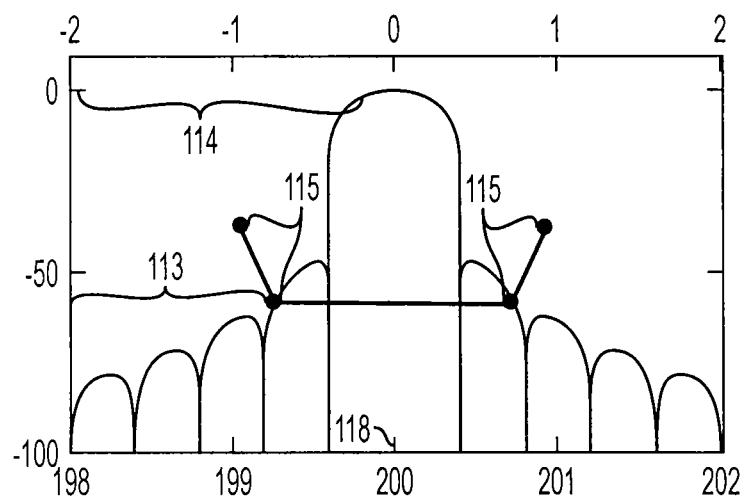
FIG. 14 illustrates an example of an underlay mask relative to the spectral content of a received signal.

FIG. 14 illustrates an exemplary underlay mask generated relative to the spectral content of a received signal. In the example, of FIG. 14, the underlay mask specifies a 60 dB margin 113 over a 1.4 MHz band with respect to the signal strength, which is set at 0 dB 114 and which provides protection for a 2 MHz band. In FIG. 14, the underlay mask is drawn as a piecewise linear graph with inflection points shown generally at 115. Once an underlay mask is drawn, the mask may be converted into a vector by listing the inflection points 115 in a manner similar to that described above for a spectrum mask in FIGS. 13A and 13B. However, unlike the exemplary method described in FIG. 13A, an exemplary method for generating an underlay mask replaces step 1308 with a similar step that determines what type of mask to create. FIG. 14 illustrates three exemplary vector types for an underlay mask. An unencoded vector is shown generally at 116, an unencoded vector with relative frequencies is shown generally at 117 (where 200 MHz 118 is chosen as the center frequency), and a concise vector is shown generally at 119 and is constructed using the a center frequency 118 of 200 MHz and a frequency increment 120 of 0.1 MHz.

In general, spectrum masks and underlay masks have a small sensitivity to mobility. Location does not affect spectrum masks; however, signals sent or received by components that are moving may be affected by Doppler shifts. The exemplary methods of FIGS. 13A, 13B, and 14 may account for Doppler shifts by adding margin in the bandwidths of spectrum and underlay masks.

Figure 15:
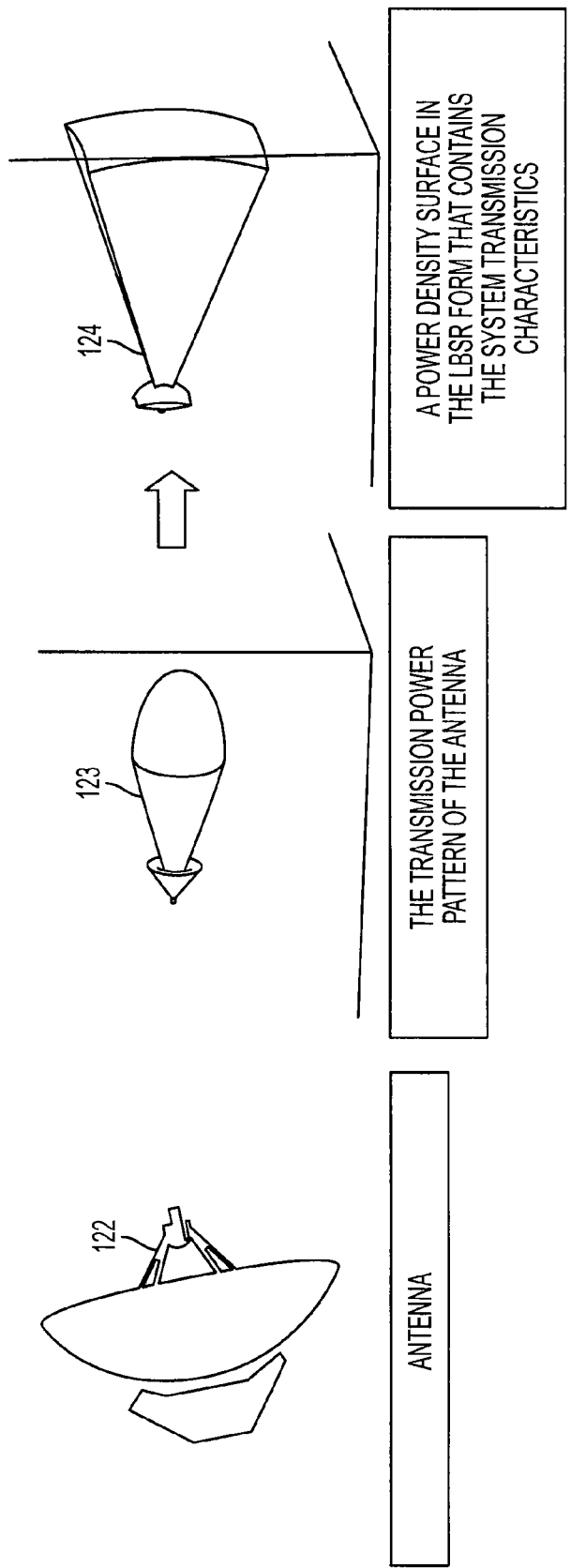
FIG. 15 illustrates an exemplary method for capturing a power pattern for a transmitter where the actual gain of the antenna is captured.

A similar approach may be used to capture a power pattern for transmitters where an actual gain of antennas is captured, and FIG. 15 illustrates such an approach. Given an antenna 122 and its transmission power pattern 123, a power mask 124 may be drawn to cover the gain of antenna 122. In the embodiment of FIG. 15, the power map represents a power density surface in LSBR form that includes transmission characteristics of the antenna 122. Further, in the embodiment of FIG. 15, antenna orientation is important in drawing the power map. The elevations and azimuths of the power map are selected to cover the regions that the antenna points and sometimes modified trading off resolution and precision for more concise maps.

Figure 16:
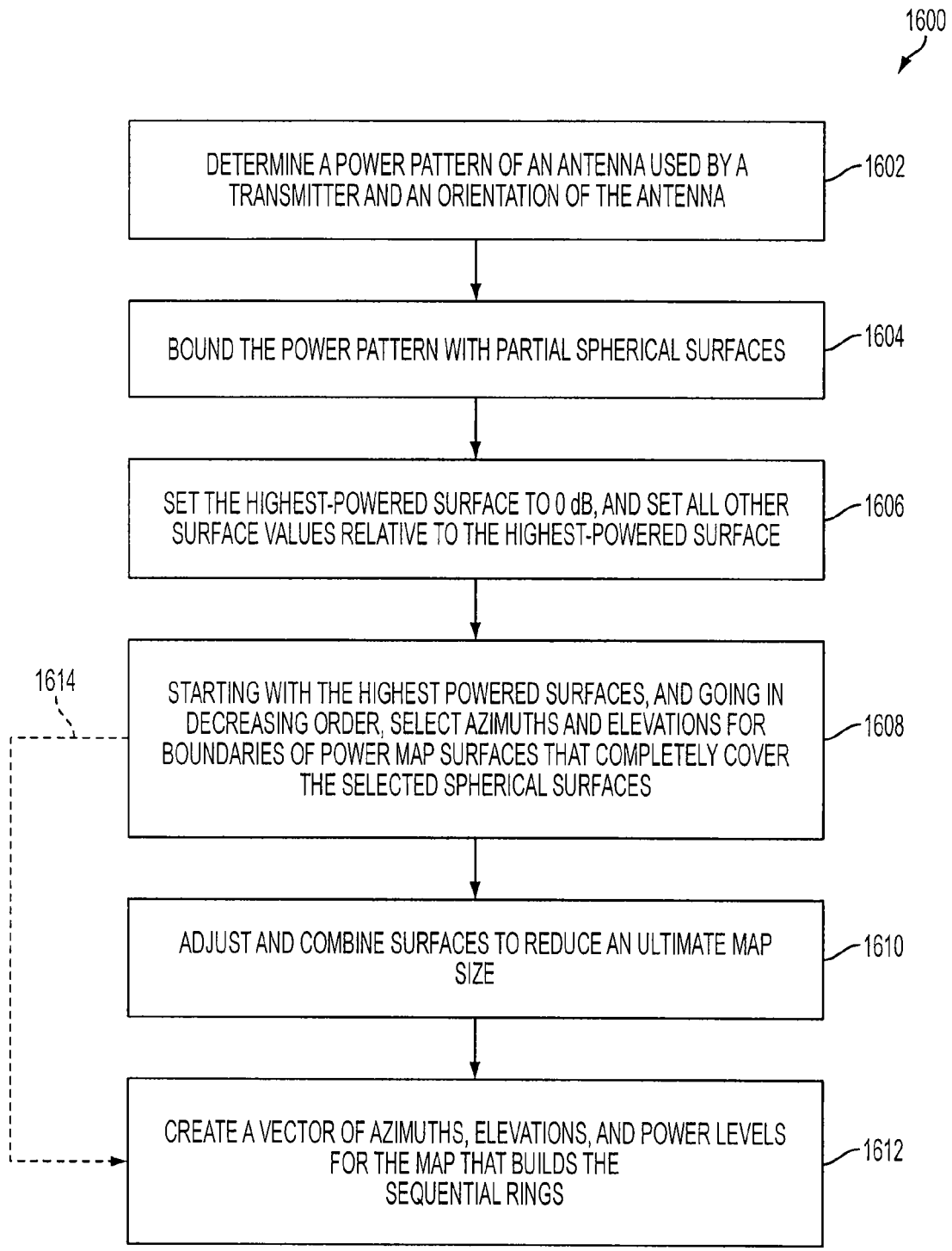
FIG. 16 illustrates a sequential process of creating a power map for a transmitter with a specified antenna.

FIG. 16 illustrates an exemplary method 1600 for generating a power map, such as a power map for a transmitter with a specified antenna. In FIG. 16, step 1602 determines a power pattern of an antenna, such as antenna 122 of FIG. 15 A surface of a transmitter power pattern is a function of the gain of the antenna, with the distances further from the center corresponding to greater gain. In the embodiment of FIG. 16, the power pattern should be on a dB scale. In step 1604, this power pattern is covered by surfaces that are segments of spherical surfaces that are greater than or equal to those of the power pattern, e.g., at distance greater than or equal to the distance of the power pattern surface from the center. Although these surfaces may be greater than those of the power pattern, the surface of highest gain is selected to be tangent to the power pattern, and as such, no other surfaces should be greater than this surface.

In step 1604, covering the power pattern implies specifying a surface in all directions that are greater than or equal to the power of the surface of the power pattern. The covering process of step 1604 is somewhat arbitrary process, as there are an infinite number of ways in which the surfaces may be defined. Therefore, a tradeoff exists between the number of surfaces used to cover the power pattern and the resolution of the map. Using fewer surfaces to cover the power pattern results in a more conservative map that supports a more concise map vector.

Next, in step 1606, values are assigned to all of the surfaces. For example, the surface having the greatest value is set to 0 dB, and all other surfaces are assigned values relative to this 0 dB surface. Each covering surface is then bounded in step 1608 by two elevations and azimuths using the conventions of the map data structure. In one embodiment, step 1608 bounds each of the surfaces starting from the highest power until the full sphere is defined. The map surfaces are then considered to cover a covering surface if the boundaries surround the covering surface and the value of the bounding surfaces is greater to or equal to the corresponding value of the covering surface.

In one embodiment, surfaces of the map may be combined in step 1610 to merge two surfaces, such that the lower value surface assumes the value of the higher power surface, and the boundaries are shifted to bound the combination of surfaces. The motivation for this step is to reduce the ultimate map size, and step 1612 then creates a vector of azimuths, elevations, and power levels for the map that builds the surfaces. In additional embodiments, exemplary method 1600 may not merge surfaces to reduce map size in step 1610, and in such an embodiment, the exemplary method may pass directly from step 1608 to step 1612, as shown by path 1614.

Figure 17:
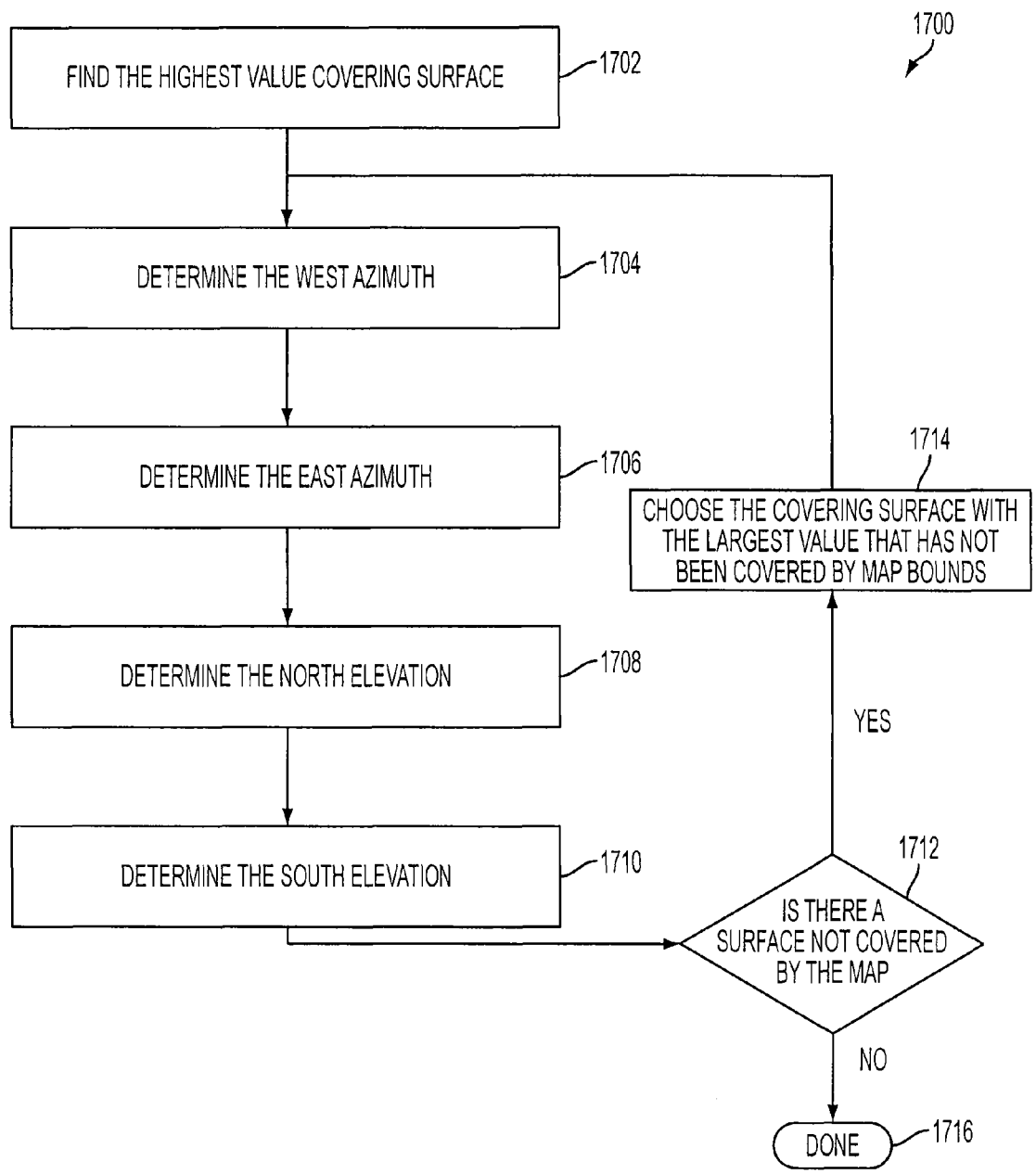
FIG. 17 illustrates a process of converting covering surfaces to the elevations and azimuths of a power map.

FIG. 17 illustrates a method for converting covering surfaces for transmitter power patterns to elevations and azimuths of a power map that may be incorporated into step 1608 of FIG. 16. In FIG. 17, step 1702 first identifies the covering surface with the largest value, e.g., the covering surface with the highest power. The mapping of the covering surfaces in descending value order ensures the lower value surfaces do not encroach upon the higher value surfaces. However, in additional embodiments, exemplary method 1700 may incorporate an opposite process and select the covering surface having the smallest value in step 1702. In such an embodiment, e.g., a lower value surface is within a larger value surface, then the limits of the lower surface are constrained by the boundaries of the larger value surface rather than the tangents to the boundaries of the lower value surface.

Step 1704 then determines the west azimuth for the covering surface having the largest value. In one embodiment, the west azimuth may be set to zero degrees (0°) if the covering surface with the largest value extends around the sphere.

Step 1706 then selects an east azimuth for the covering surface having the largest value. In one embodiment, the east azimuth may be set to 360° if the surface extends around the sphere. Further, if the covering surface having the largest value crosses the zero-degree (0°) azimuth but fails to extend around the sphere, then the east azimuth selected in step 1706 will be greater than the west azimuth selected in step 1704.

Steps 1708 and 1710 respectively select a north elevation and a south elevation for the covering surface having the largest value. In one embodiment, the north elevation selected in step 1708 may be set to zero degrees (0°) if the covering surface having the largest value extends from the top of the sphere. Further, in an additional embodiment, the south elevation selected in step 1708 may be set to 180° if the covering surface having the largest value extends to the bottom of the sphere.

Once the east and west azimuths and the north and south elevations have been selected, step 1712 then determines is there are covering surfaces that have not yet been mapped. If covering surfaces have yet to be mapped, then step 1714 selects the covering surface with the largest value that has not been covered by the map bounds. The selected covering surface is then passed back to steps 1704 through 1710, which respectively determine east azimuth, the west azimuth, the north elevation, and the south elevation for the selected covering surface.

If, however, step 1716 determines that no additional covering surfaces are to be mapped, then the mapping process is completed in step 1716 and the mapped surfaces are passed back to the exemplary method of FIG. 16.

Steps 1704 through 1710 have been described in terms of specific techniques for selecting the east and west azimuths and the north and south elevation. The present invention is not limited to such techniques, and one skilled in the art would recognize that any number of additional techniques may be used to select the azimuths and elevations without departing from the spirit or scope of the present invention.

Figure 18:
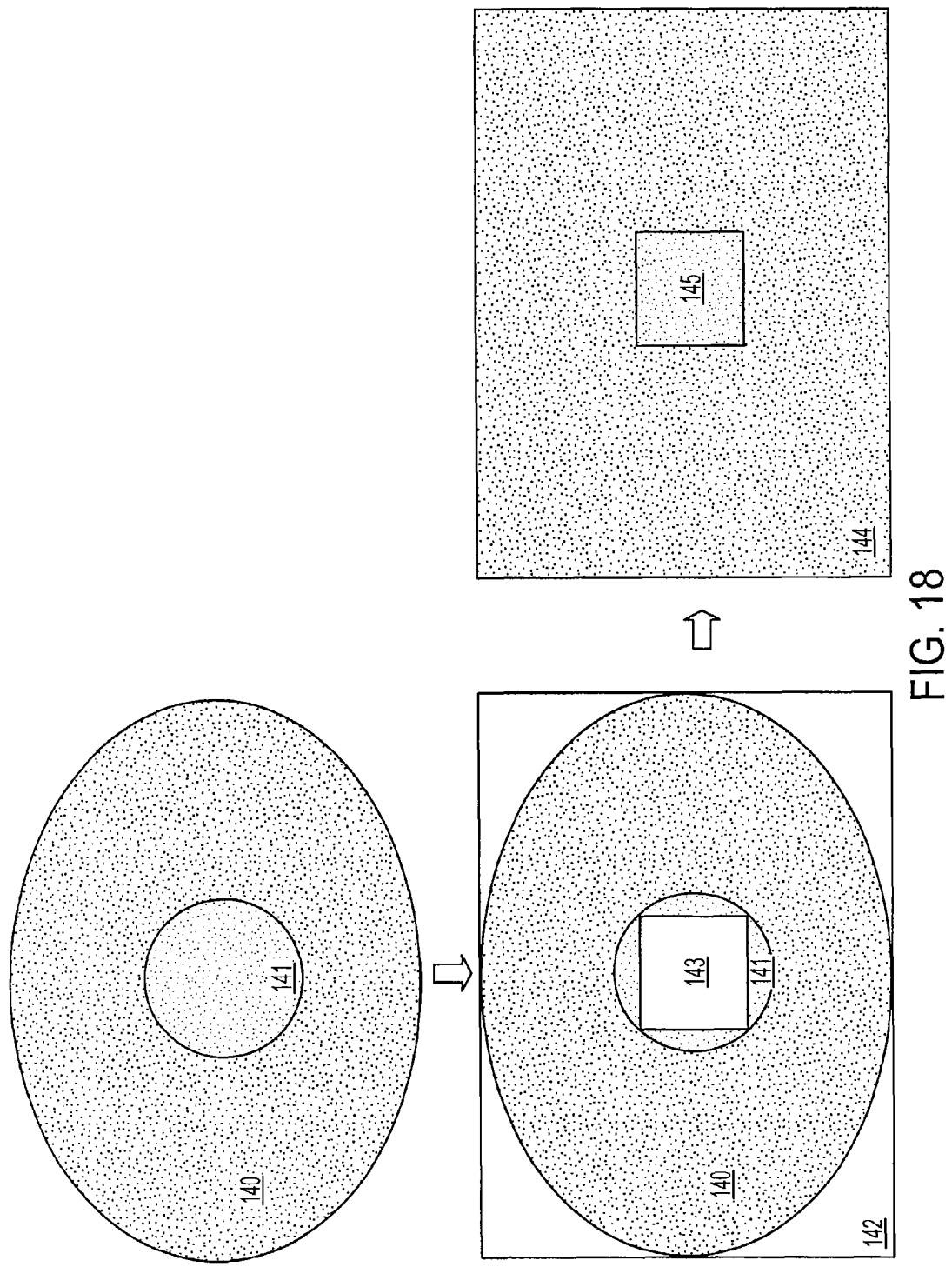
FIG. 18 illustrates the selection of map boundaries given covering surface boundaries for a power map.

FIG. 18 is an example that illustrates the exemplary method of FIG. 17. FIG. 18 depicts two elliptical covering surfaces 140 and 141, the surface 140 having a larger value than 141. Boxes 142 and 143 illustrate the boundaries for the propagation map, where the left and right boundaries are the west and east azimuths, respectively, and the top and bottom boundaries are the north and south elevations, respectively. Box 142, which contains the larger value surface 140, has boundaries that are tangents to that surface. Box 143, which represents the interior lower value surface 143, has boundaries that are within the original interior lower value covering surface. The resulting power map surfaces 144 and 145 share the general shape of boxes 142 and 143. In the embodiment of FIG. 18, two-dimensional objects are used for exemplary purposes only, and the present invention is not limited to two-dimensional mappings. One skilled in the art would recognize that the surfaces depicted in FIG. 18 are, in actuality, portions of spheres wherein the surfaces and boundaries are curved.

Figure 19A:
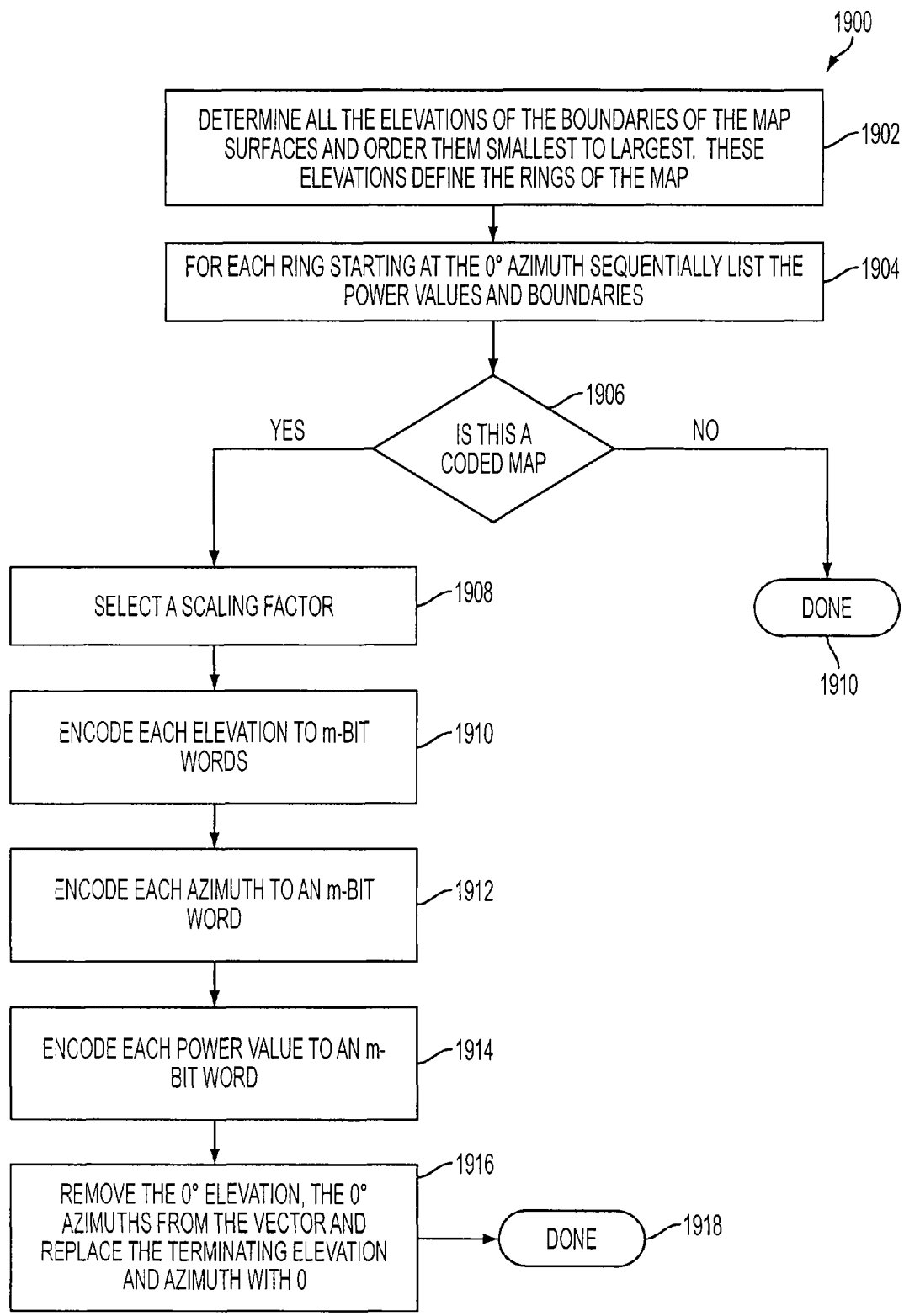
FIG. 19A illustrates an exemplary method for converting map surfaces to a map vector.

FIG. 19A illustrates an exemplary method 1900 for converting map surfaces into a map vector. In FIG. 19A, step 1902 receives one or more map surfaces and determines all elevations of the boundaries of the received map surfaces before ordering the determined elevations from smallest to largest. In one embodiment, the ordering process of step 1902 may list the elevations in order from top to bottom of a graph of the map surfaces, and as the space between each elevation is a ring, the ordering of step 1902 defines the rings of the map. In step 1904, the power values and boundaries of each surface on each ring are listed sequentially, starting at the zero-degree azimuth, to generate, respectively, a vector for each surface on each ring.

Once the vectors of power values and boundaries for each surface have been generated, step 1906 determines if a concise vector is desired. If step 1906 determines that a concise vector is desired, then the values in the generated vectors are coded into m-bit words, and a scaling factor is chosen in step 1908. In one embodiment, the scaling factor may be unity, although the present invention is not limited to such a scaling factor.

Step 1910 then encodes each elevation, such as the north and south elevations described above with reference to FIG. 17, into a m-bit word and replaces the corresponding value of the elevation in the vector with the encoded value. Subsequently, step 1912 encodes each azimuth, such as the east and west azimuths described above with respect to FIG. 17, into a m-bit word and replaces the corresponding value of the azimuth in the vector with the encoded value. Step 1914 then encodes each power value into a m-bit word and replaces the corresponding value of the power value in the vector with the encoded value. Although steps 1910, 1912, and 1914 are described sequentially in FIG. 19, the present invention is not limited to such embodiments, and in additional embodiments, steps 1910, 1912, and 1914 may be executed in parallel or in reverse order without departing from the spirit or scope of the invention.

Once encoded values of elevations, azimuths, and power values have been generated and have been incorporated into the vectors, step 1916 generates a concise power map that removes the predictable values in the vector. In one embodiment, step 1916 removes all zero-degree (0°) elevations and azimuths replaced the final azimuth-elevation pair with a value of zero. The final concise, coded vector is subsequently output in step 1918.

Figure 19B:
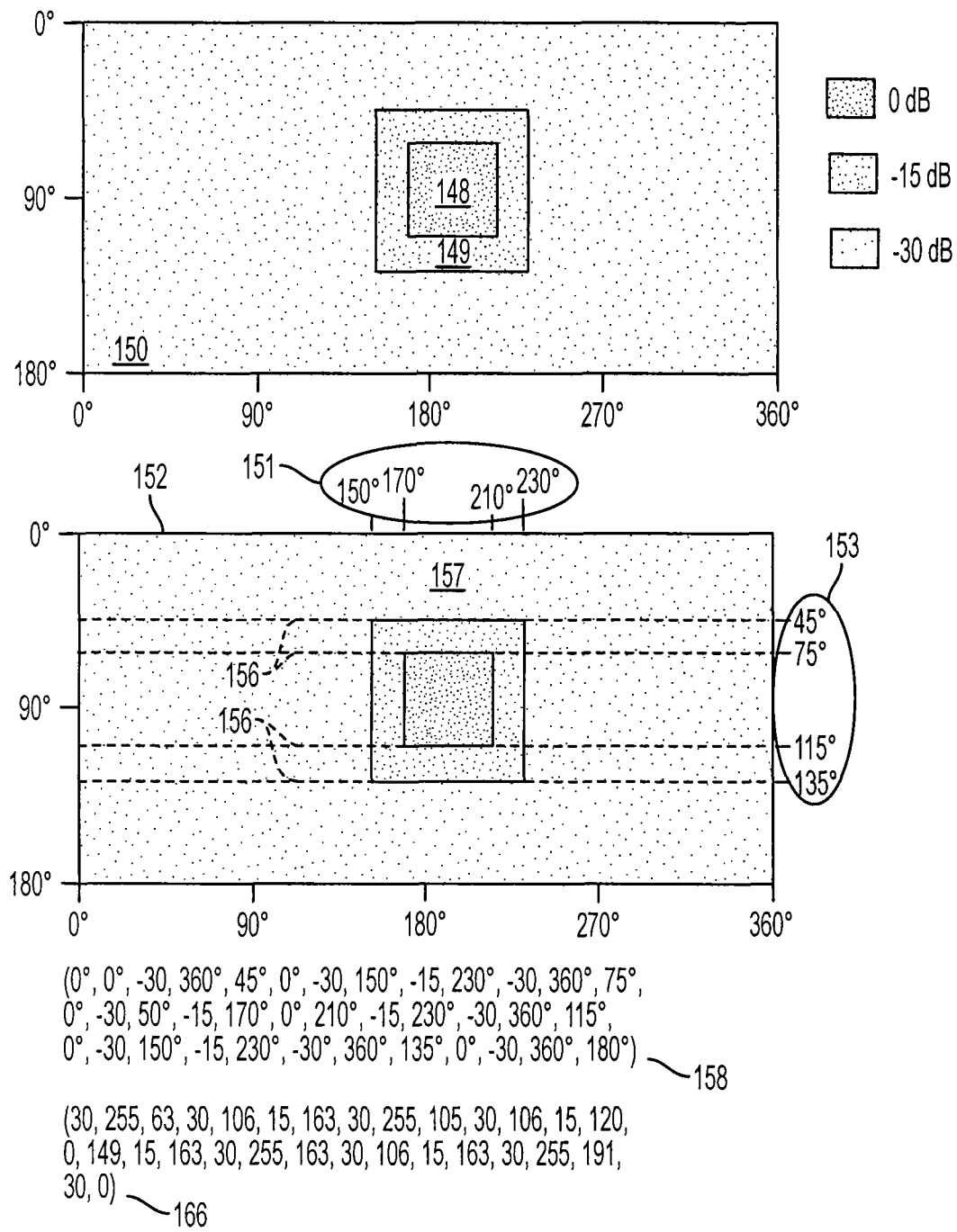
FIG. 19B illustrates the exemplary method of FIG. 19A.

FIG. 19B illustrates the exemplary method of FIG. 19A. In FIG. 19B, one or more surfaces are laid out on a rectangular graph of elevations on the mantissa and azimuths on the abscissa. Although not depicted in FIG. 19B, an equivalent polar plot of the map would look very similar to power mask 124 of FIG. 15. The map of FIG. 19B has three surface levels of 0 dB 148, −15 dB 149, and −30 dB 150, and the boundary values for the protruding surfaces are illustrated. The azimuth values of the boundaries 151 are listed on the top of the second graph 152, and the elevations values 153 are listed to the right of the same graph 152.

As described in FIG. 19A, the elevations 148, 149, and 150 are first listed in order from top to bottom on graph 152, with the space each elevation is a ring. Further, as described above, a vector is created by listing the power values and boundaries of each surface on each ring. Graph 152 illustrates the rings using the 0° and 180° boundaries and dashed lines 156 correspond to the elevation boundaries of the internal surfaces. Starting with the top ring 157, the vector starts with the 0° elevation of the top boundary of the ring and the 0° value of the first azimuth. There is one surface on this ring at −30 dB which extends from 0° to 360°. This ring ends at the elevation of 45°, and so the first five values of the power map vector 158 are these values in order, 0°, 0°, −30, 360°, and 45°. The elevation 45° is the delimiter between the first ring and the second ring. The second ring extends from this 45° elevation down to the 75° elevation and has three surfaces, the first having a value of −30 dB and extending from the 0° azimuth to 150°, then −15 dB to 230°, and finally −30 dB to 360°. This process continues for the remaining rings resulting in the vector 158. Given this vector, the next step is to determine if a concise vector is desired, and if not, the process ends and vector 158 is output.

However, if a concise coded vector is desired, then the values in vector 158 are coded into m-bit words. The first step of the coding process is to choose a scaling factor, and in the example of FIG. 19B, a scaling factor of 1 is used. The next step is to convert the elevations to 8-bit words. With a scaling factor of 1, the elevations 0°, 45°, 75°, 115°, 135°, and 180° convert to 8-bit magnitudes of 0, 63.5, 105.83, 162.28, 190.5, and 254. When the boundary is a northern boundary, then the magnitude is rounded down to obtain the 8-bit boundary, and if the boundary is a southern boundary, then the magnitude is rounded up. The resulting elevations for the vector are 63, 105, 163, and 191. The next step encodes the azimuths to 8-bit words. For example, azimuths 0°, 150°, 170°, 210°, 230°, and 360° convert to 8-bit magnitudes of 0, 106.25, 120.42, 148.75, 162.92, and 255. Western boundaries of larger magnitude surfaces are rounded down, and the eastern boundaries are rounded up. Therefore, the final 8-bit values of the azimuths are 0, 106, 120, 149, 163, and 255. The next step is to convert the surface magnitudes to 8-bit words. The three values used in this example, 0 dB, −15 dB, and −30 dB convert to 0, 15, and 30, respectively. Once the conversion process is complete, the original vector is replaced with these coded values, and the final step of the process creates a concise power map. In the example of FIG. 19B, the process to create the concise vector removes the predictable values in the vector, which are all zero-degree (0°) elevations and azimuths, and replaces the final azimuth elevation combination (255, 254) with a value of zero 0. The final concise coded vector of FIG. 19B is shown generally at 166.

In one embodiment, power maps for receiver rights may be created in a manner similar to that used to generate power maps for receiver rights, except the relation between the antenna power patterns and the power surfaces is inverted. Receiver power maps direct that less interference power be allowed in directions where antenna gain is greatest. There are a number of possible methods for specifying a receiver right power map. In one embodiment, a receiver power map can be created from a transmitter power map by converting the power levels where the lowest power level of a transmitter right is set to 0 dB, and the remaining surfaces are set to values that are negative their difference from this reference value. For example, the transmitter right levels of −30 dB, −15 dB, −7 dB, and 0 dB become the receiver right values 0 dB, −15 dB, −23 dB, and −30 dB respectively when −30 dB is the lowest transmitter right value. In this approach, the maximum power density of the receiver right is matched to the antenna gain that is least and so is actually larger than what can be tolerated in the directions where antenna gain is greater. In another embodiment, the maximum power density of the receiver right be associated with the direction of highest antenna gain. In this case, the negative gains of a transmitter right power map become positive gains in the receiver right map.

Figure 20:
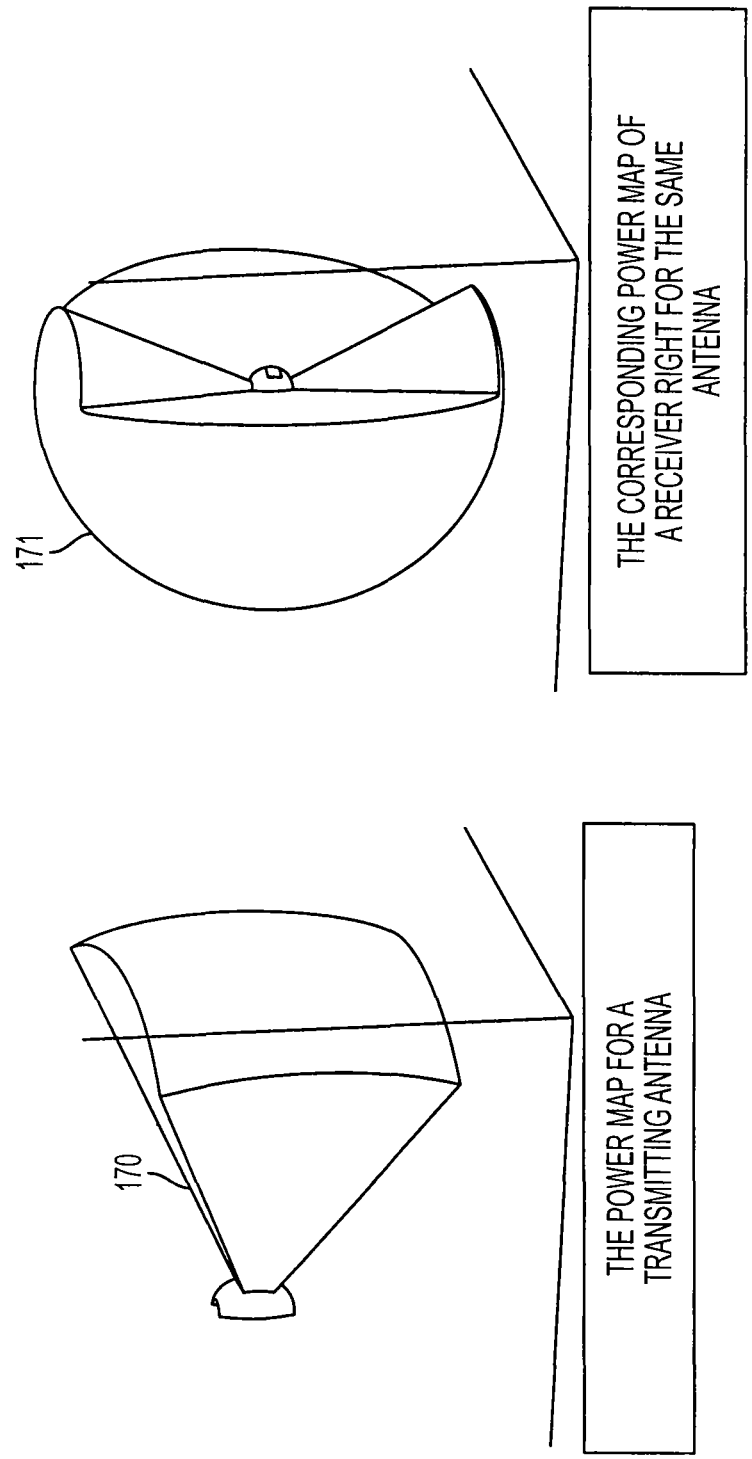
FIG. 20 illustrates a power map for a transmitter right and its inverse, the power map for the receiver right using the same antenna.

FIG. 20 illustrates a power map 170 for a transmitter right and its inverse, a power map 171 for the receiver right using the same antenna. In the transmitter right 170, the surface represents the permitted power of the transmitted signal by direction. In the receiver right 171, the surface represents the allowed power of interfering signals by direction.

Figure 21:
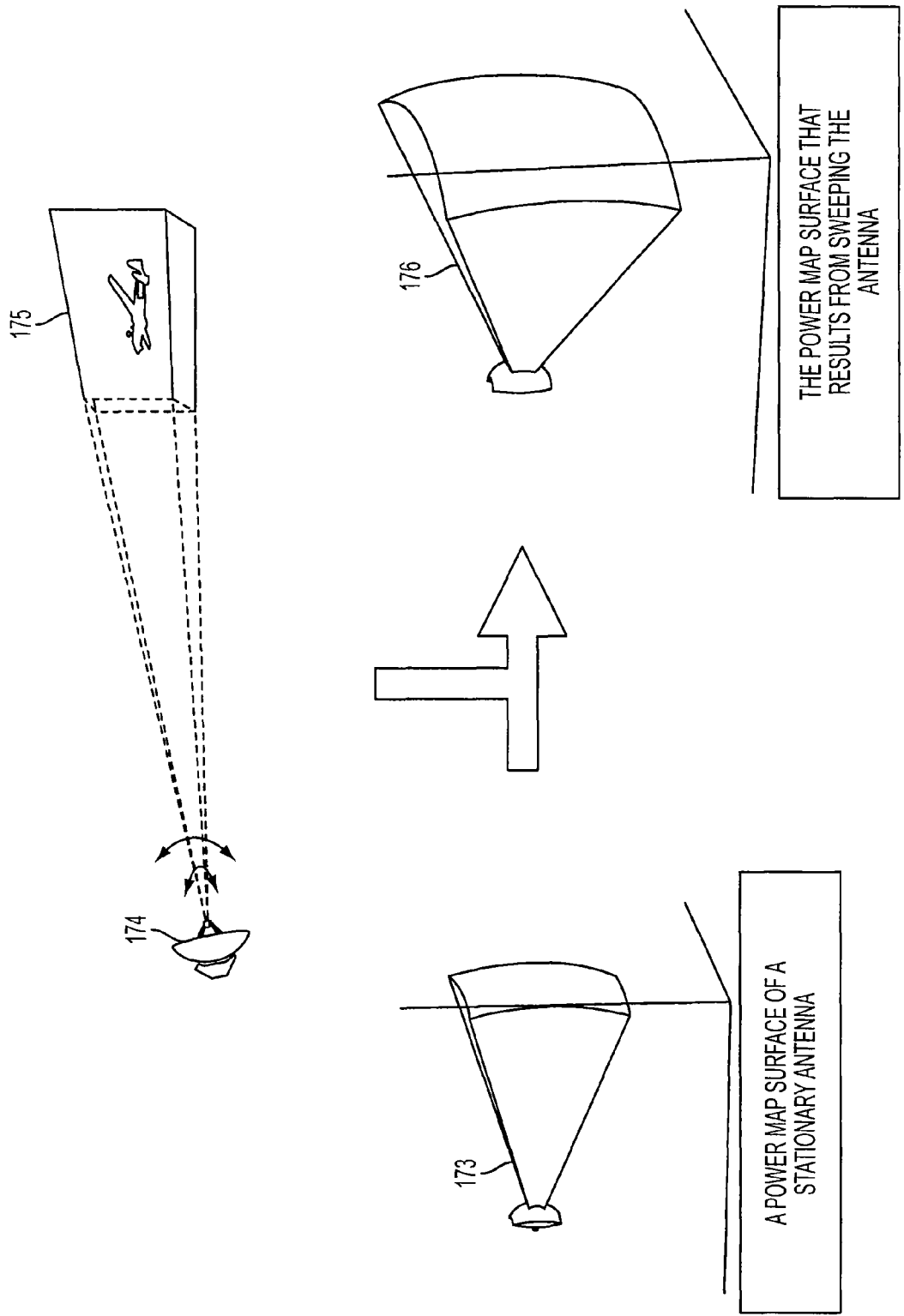
FIG. 21 illustrates the impact of mobility on exemplary power maps of receivers and transmitters.

Power maps of transmitters and receivers can be affected by mobility because mobility affects the directions that antennas are pointed on the components that move or possibly the stationary antennas that are pointed toward the systems that move. If the antenna itself is mobile, and the pointing of the antenna cannot be specified, then the greatest gain of the antenna would need to be applied in all possible directions that that antenna might be pointed. If there is greater control of the antenna, such as an antenna that points toward a distant mobile object, then the new power maps can point the highest gain to a smaller region. FIG. 21 illustrates the impact of mobility on exemplary power maps of receivers and transmitters. In FIG. 21, a power map of a stationary antenna 173 is swept 174 across a region 175 over which a receiver may operate, thus resulting in a new power map 176 that accounts for the maximum power that may be transmitted in all directions as a result of the possible sweeping action of the antenna.

Propagation maps are created in a manner very similar to that used to create power maps, except that the surface values in propagation maps represent pathloss exponents. Selecting pathloss exponents for the surfaces in a particular environment may be based on the results of a propagation model for that environment or from the use of actual measurements. Further, the exact application of exponents to surfaces may be artful, accounting for the possible locations of transmitters and receivers and the uncertainty in the actual propagation for an environment. For example, a propagation map for a mobile device is unlikely to have as much variation as one for a stationary RF component where the propagation conditions can be better modeled or measured. In selecting boundaries for the propagation maps, smaller exponents get priority in being covered, just as higher power surfaces receive priority in transmitter right power maps. In general, smaller exponents are more conservative exponents (e.g., conservative in the sense of specifying greater spectrum consumption for a particular use) and indicate greater power emissions for transmitter rights and greater separation distances for interferers when used with receiver rights.

Locations, define where transmitters and receivers may possibly be in a right. In general, the most restrictive locations will be points in space, and in those cases where transmitters and receivers are mobile, volumes are used to specify location. Volumes can be expressed by many conventions, including various types of primitive solids, such as cylinders and cubes, or be expressed as a surface area when components are always operated from the surface of the earth with a volume being implied by the variations in the earth's surface. The only requirement for the volume is that the volume include all locations over which a component may operate when capturing a use of spectrum or that the components of a system remain within the volumes when the rights are used to specify a right to use spectrum.

In one embodiment, an assignment of a time period to a spectrum right is an obvious function based on knowledge of the temporal use of spectrum. The specification of a protocol, or a policy, is based on knowledge of neighboring uses of spectrum by other systems and knowledge of the compatibility of a protocol or policy with those uses. The role of time periods, protocols, and policies will be demonstrated in subsequent sections of this specification.

Exemplary RF Spectrum Rights

Transmitters must receive an authorization to transmit. In the case of a primary user, the transmitter right it receives is generally sufficient to specify its use of spectrum. In the case of secondary users, the received right is a maximum power constraint on its transmissions, and then the secondary users must tolerate the interference from a primary transmitter and comply with the receiver rights of primary users or other users specified by a spectrum manager. Six example rights follow to demonstrate how rights might be specified using combinations of the maximum power density, spectrum masks, underlay masks, propagation maps, power maps, locations, start times, end times, protocols and policies.

Example 1

RF Broadcaster Rights

Broadcasters are single transmitters that transmit signals to a number of subscribing receivers. These communications are continuous and are only a downlink. Exemplary users of broadcasting include, but are not limited to, commercial television stations, commercial radio stations, and satellite television. Currently, broadcasters are regulated by placing limits on the amount of power they may use in their broadcasts and controlling where that broadcast might originate. One benefit of using a location-based spectrum right (LBSR) to define broadcaster's rights is that the LBSR defines the geospatial limit on the broadcaster's right and reveals the conditions required for reuse of that spectrum.

In one embodiment of a broadcaster's location-based RF spectrum right, three different rights tuples are defined. The first tuple is a transmission right that specifies the maximum power density, a power map, the spectrum mask, the right's propagation model and the location of the transmitter. The second tuple is a transmission right underlay referenced to the transmitter right spectrum mask. This underlay specifies a margin that quantifies the relative quality of reception that receivers must achieve and provides opportunity for secondary spectrum users to use spectrum at a much reduced transmission power within the broadcaster's rights region. The third tuple is a receiver right and includes a power map, a propagation map that applies to interfering nodes, and a threshold receiver right power density. Times may be used to differentiate rights by time of day, such as specifying the use of different transmit powers between day and night, and protocols and policies are rarely given to broadcasters in their rights.

The three tuples work in concert with each other to define the opportunities for spectrum reuse which can be both within the region that broadcast subscribers operate as well as outside that region. The underlay works in concert with the transmitter right to identify the amount of interference that can be caused by a secondary user operating within the broadcast right. The receiver right works in concert with the underlay and the transmitter right to identify the amount of interference that can be caused by a secondary user outside the transmitter right. The boundary of the transmitter right is the point where the transmitter tuple's power map and propagation map predict the transmitted signal attenuates to the threshold receiver right power density.

Figure 22:
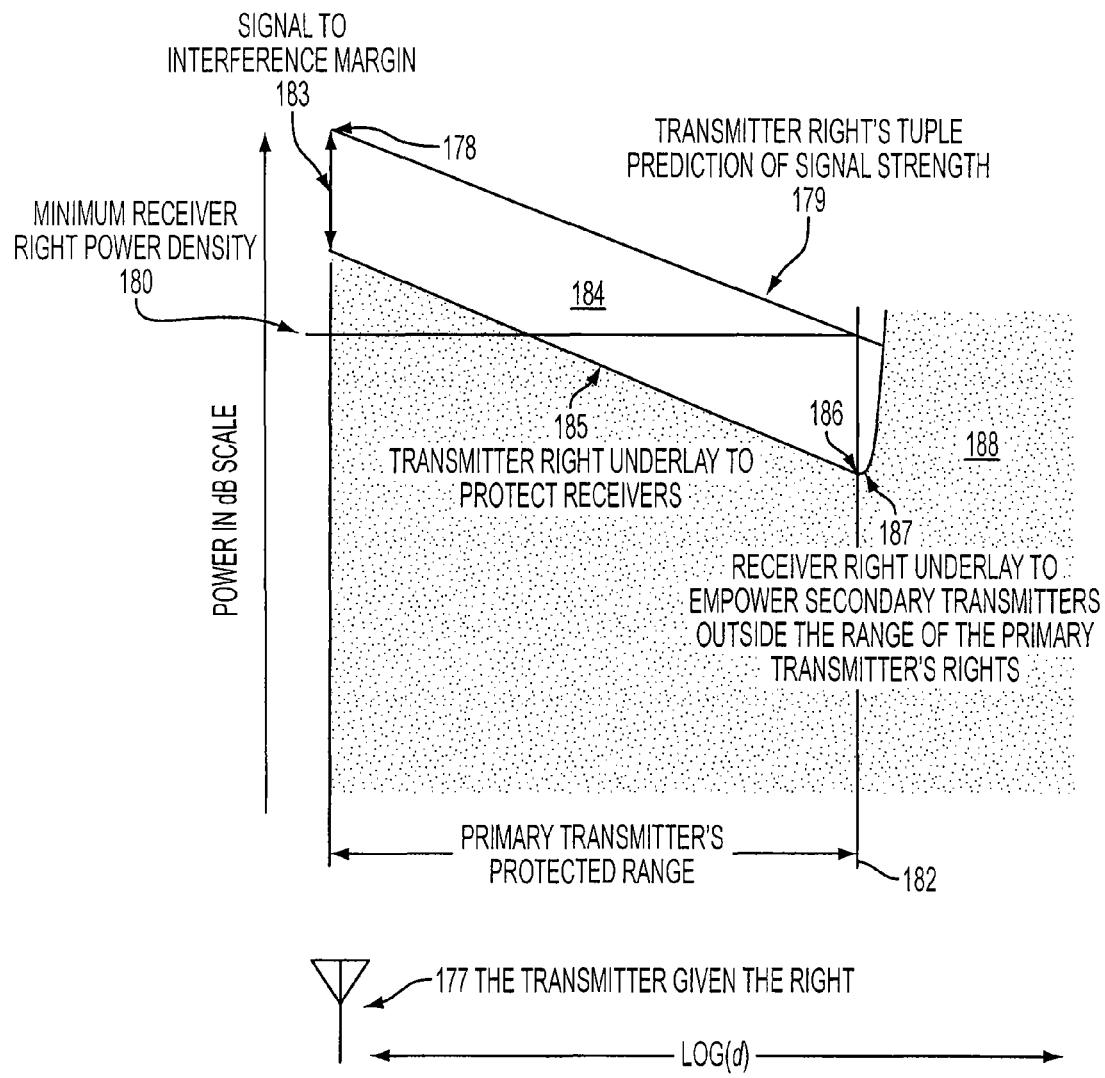
FIG. 22 illustrates an interpretation of components of an embodiment of a broadcaster's right for a single direction of the right.

FIG. 22 illustrates an interpretation of the components of an exemplary broadcaster right for a single direction in the right. A transmitter 177 is given a broadcaster's right in the manner described above. The 1-meter power density 178 in the direction considered is determined by the combined use of a maximum power density and a power map. The power density is predicted to attenuate 179 as it propagates away from the transmitter at a rate predicted by the transmitter right's propagation map. When this power density attenuates to the level of a threshold receiver right power density 180, the power density has reached the range of the right 182.

In FIG. 22, an underlay specifies a margin 183 in the right. This margin applies to the full range of the right 184, and as such, an absolute value of the margin attenuates together with the predicted transmitted power density 185. A margin boundary 184 specifies allowed interference power of secondary users operating within the broadcaster right. Beyond the range of the transmitter right, the margin at the limit of the right 186 determines the allowed interference at the boundary, and the receiver right propagation map determines the attenuation toward point 187 that is to be used to determine the amount of interference from a secondary user. Thus, secondary users can use spectrum so long as the strength of their signals are within the illustrated shaded regions 188 at all locations.

Although the example of FIG. 22 only depicts the right in one direction, different rights can be specified for other directions. In an additional embodiment, both the broadcaster and the subscriber have a requirement to achieve a particular performance that takes advantage of the right. The broadcaster tries to achieve the required power and the subscriber insures his receiver is in a position to take advantage of that power. In yet another embodiment, the definition of spectrum rights, in particular the propagation maps for a particular broadcaster, can be refined over time to accurately account for the environmental effects that are actually present.

Figure 23:
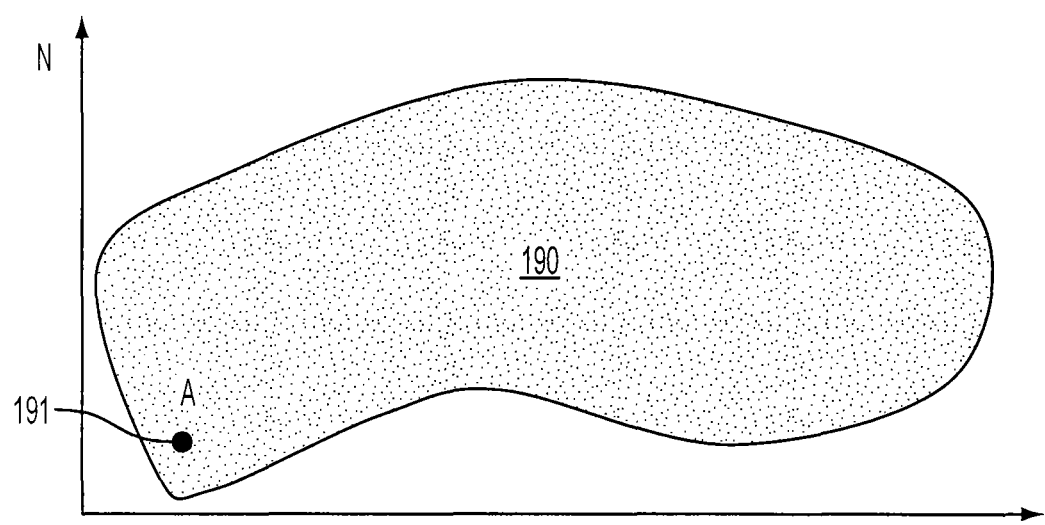
FIG. 23 illustrates an exemplary broadcaster's spectrum right.
Figure 24:
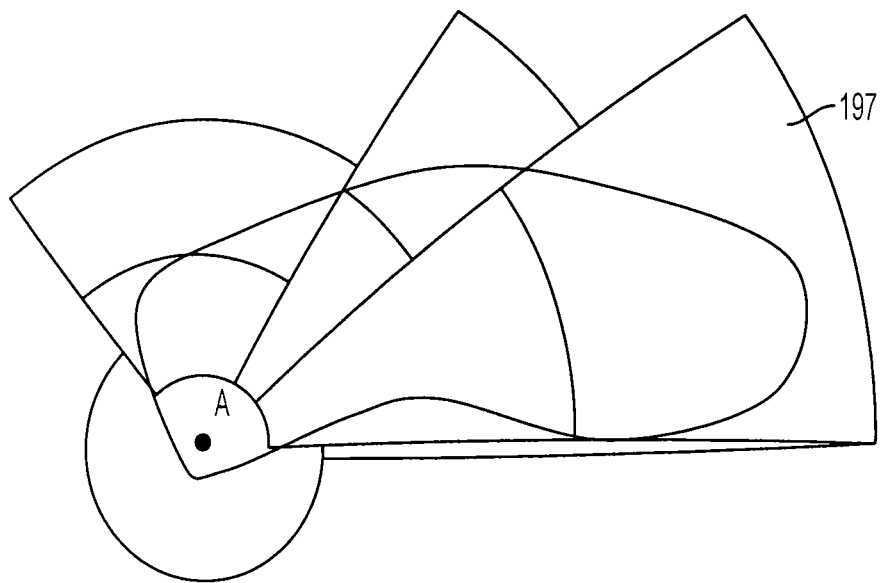
FIG. 24 illustrates an antenna location, a maximum power density, a propagation map, a power map, and a threshold power density combination for the exemplary right of FIG. 23.
Figure 25:
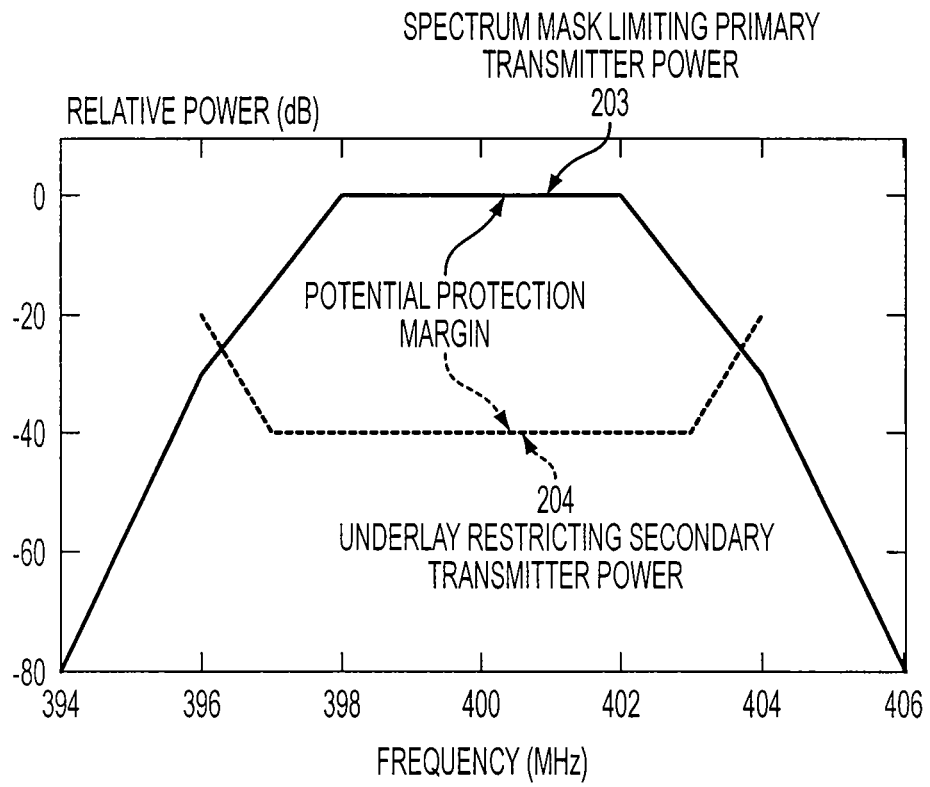
FIG. 25 illustrates a center frequency, frequency increment, spectrum mask, and underlay mask for the exemplary right of FIG. 23.
Figure 26:
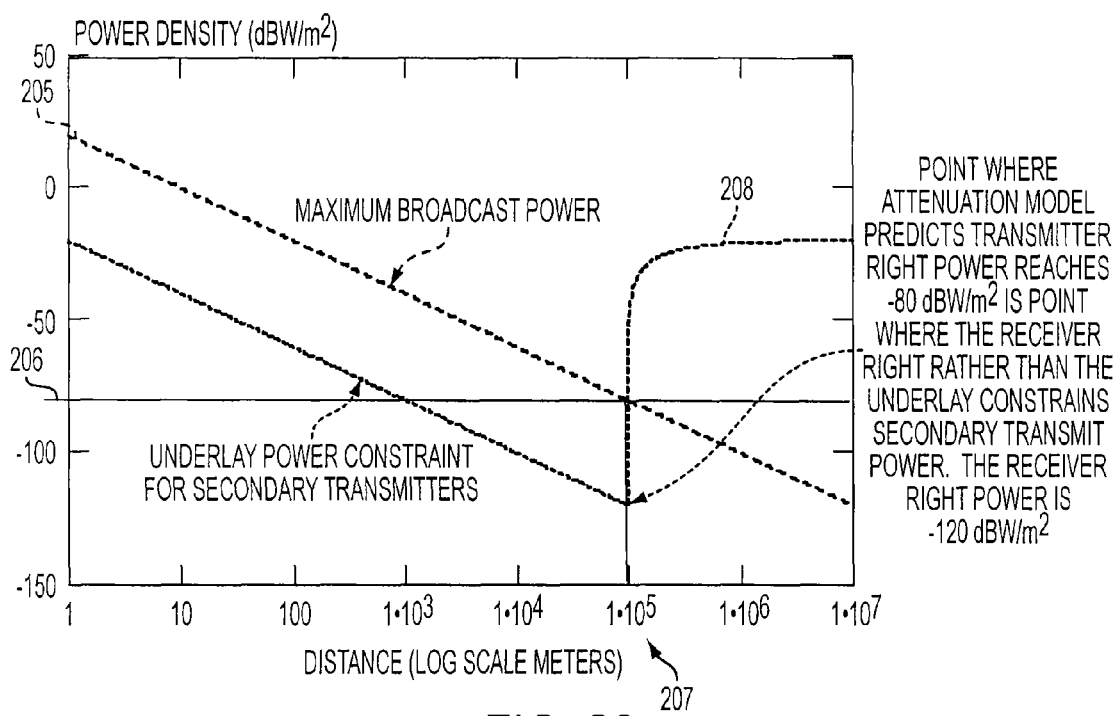
FIG. 26 illustrates an interpretation of the signal levels of a broadcaster's spectrum right in the direction of highest power density.

FIG. 23 through FIG. 26 respectively illustrate the creation of a broadcaster's spectrum right to conform to a particular operational requirement. FIG. 23 illustrates an exemplary scenario for a broadcaster's spectrum right. In FIG. 23, a required right needs to cover the shaded region 190, and a broadcast antenna is to be located at point A, shown generally at 191. In this scenario, it is assumed that an antenna can be built to any type of directionality. FIG. 24 illustrates an exemplary combination of a location 192, a maximum power density 193, a propagation map 194, a power map 195, and a threshold power density 196 combination that covers the shaded region of FIG. 23. The propagation map 194 and the power map 195 are coded into the concise versions of these masks. The shaded surface 197 is the volume that this combination covers with a right. FIG. 25 illustrates a center frequency 198, frequency increment 199, spectrum mask 200, and underlay mask 201 of an exemplary broadcaster's spectrum right. One of the piecewise linear graphs 202 illustrates a spectrum mask that results from the vector 200, and a second piecewise linear graph 203 illustrates the underlay mask that results from the vector 201. In the examples of FIG. 23 through FIG. 26, the final required component of the broadcaster's right is the propagation map to be used with the receiver right, and the coded version of the receiver right propagation map of this example is (0,0). FIG. 26 illustrates an interpretation of the signal levels of the broadcaster's spectrum right described above with reference to in FIGS. 24 and 25 in the direction of highest power density. The 1-meter power density 205 in direction of highest power density is 20 dBW/m$^2$, and 1-meter power density 205 attenuates to the threshold value of −80 dBW/m$^2$ 206 at a range of 100,000 meters, shown generally at 207. At the point where the power density threshold is reached, the receiver right propagation map is used to estimate the allowed transmission power of interfering nodes, and a power density of this prediction is shown generally at 208.

In the embodiments of FIGS. 23-26, secondary users of spectrum may be given dedicated propagation maps to specify the attenuation to use to assess compliance with primary rights in lieu of the propagation map that is part of the primary user's receiver rights. The motivation for allowing specific maps is that the restrictive nature of where the secondary user uses the spectrum, e.g., at a point or in a building, may allow better predictions of propagation conditions and so serve as a less restrictive constraint. The rules concerning what propagation maps to use to assess compliance are specified by the entity that manages spectrum.

In contrast to the embodiments of FIGS. 23-26, an additional embodiment of a broadcaster right may specify the spectrum rights with two tuples, a transmitter right and a receiver right. The transmitter right may include a location of the transmitter, a maximum power density, a power map, and the spectrum mask of the right. The receiver right may include of a volume for the receiver right, an underlay mask, a power map, and a propagation map. Further, the spatial limits of the right are determined by the receiver right. Secondary users would be able to use the spectrum so long as they respected the constraints of the receiver right portion of the broadcaster's right.

Example 2

Transmitter-Receiver Pair RF Spectrum Rights

In one embodiment, RF spectrum rights for a transmitter-receiver pair right consist of two tupples, a transmitter right for the transmitter and a receiver right for the receiver. The transmitter right conveys what the transmitter is allowed to do and any potential interference it may cause other users. At a minimum, a transmitter right would consist of a location, a maximum power density, a spectrum mask, and a power map. Optionally, the transmitter portion may include a propagation map. The receiver right conveys what a receiver requires to receive the transmitter's signal and represents the restrictive part of the right that would constrain any secondary users in the same spectrum. At a minimum, a receiver right would consist of a location, a maximum power density (possibly the same maximum power density as used by the transmitter right), an underlay map, and a propagation map.

Figure 27:
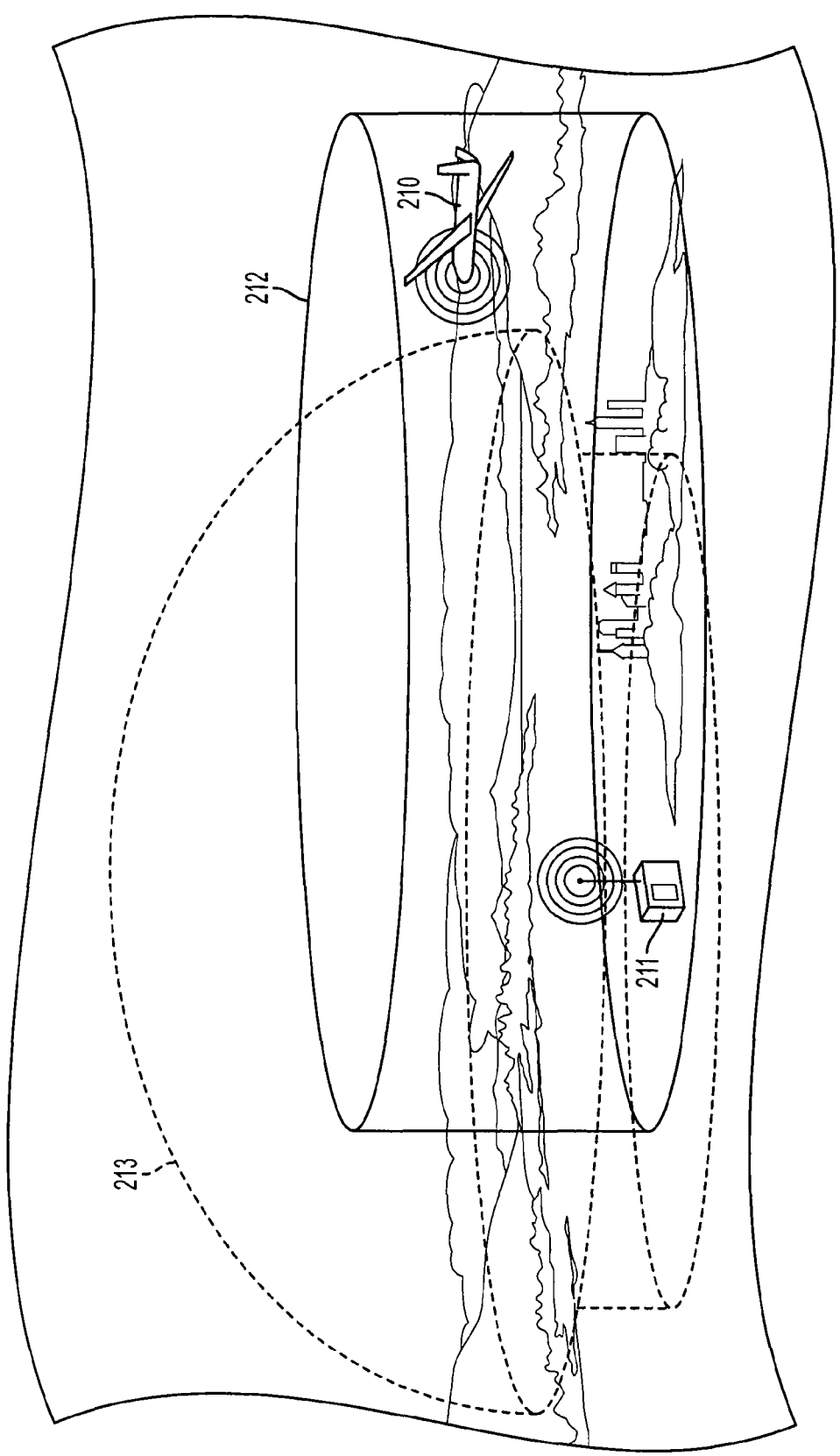
FIG. 27 illustrates an exemplary receiver-transmitter pair, where the transmitter is mobile and the receiver is stationary.

FIG. 27 is an example of a receiver-transmitter pair scenario where a transmitter is mobile and a receiver is stationary. The transmitter is a mobile unmanned aerial vehicle (UAV) 210, and the receiver is a stationary component 211. In such an embodiment, the transmitter right would consist of a location, in this case illustrated as a cylindrical volume 212, a maximum power density, a spectrum mask, and a power map. The receiver right would consist of a location (which in this case is a point), an underlay mask, a maximum power density (possibly the same as that used with the transmitter right), an underlay map, and a propagation map. The region of protection 213 would surround the receiver only.

Example 3

Transceiver Pair RF Spectrum Rights

In one embodiment, RF spectrum rights for a transceiver pair include a transmitter and receiver right for both ends of the pair. The transmitter and receiver rights for each transceiver would consist of, at a minimum, a location of the transceiver, and for the transmitter portion, a maximum power density, a spectrum mask, a maximum power density, and a power map, and for the receiver portion a maximum power density, an underlay mask, a power map, and a propagation map. In an embodiment, the rights could attempt to capture a half-duplex version of communications in which the transmitters and receivers at both ends of the communications use the same channel, or alternatively, the right could capture a full duplex version of communications where the transmitter of one end and the receiver of the opposite end of the pair are on the same channel, but different channels are used for each direction of communications.

Figure 28:
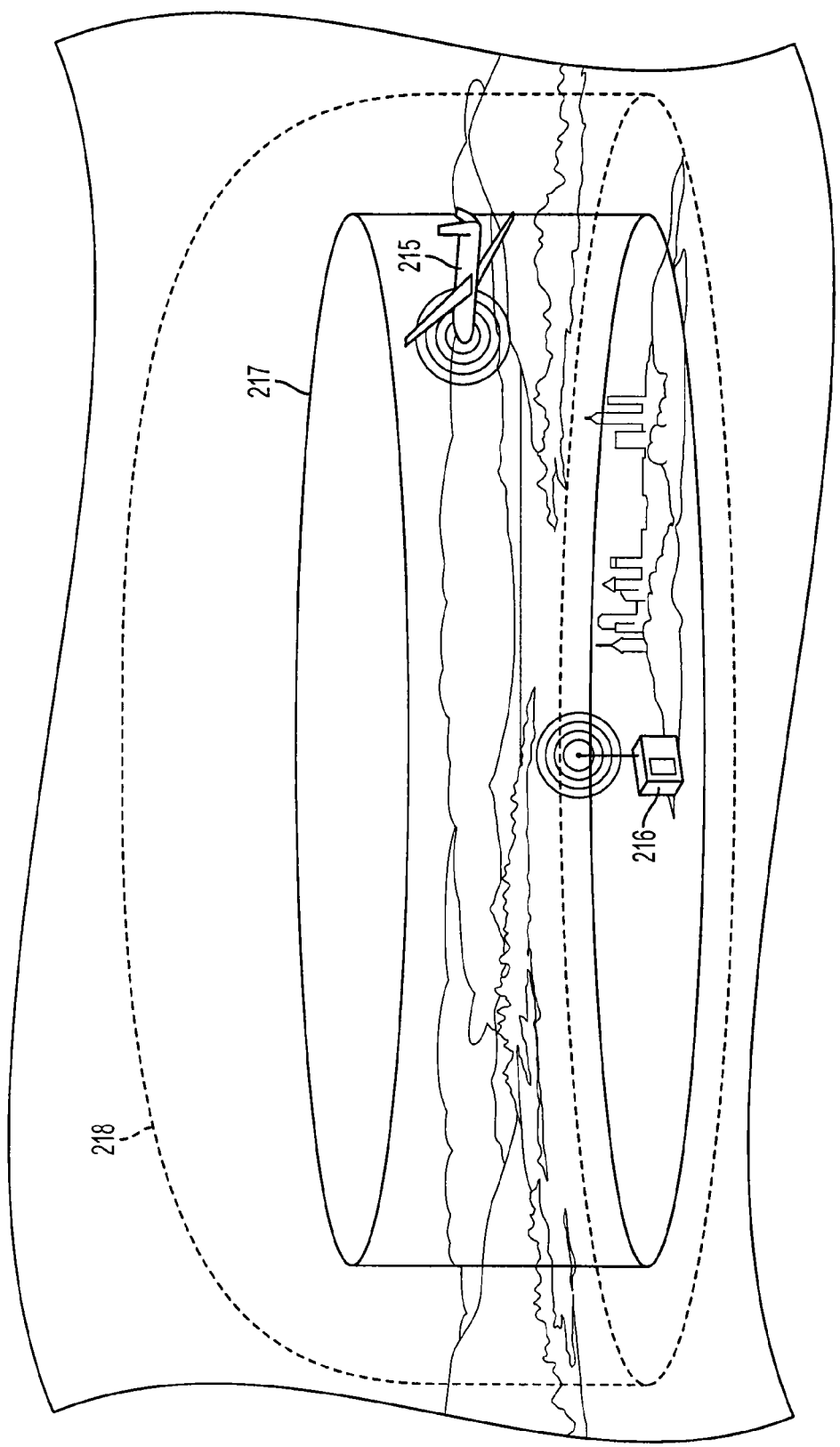
FIG. 28 illustrates an exemplary transceiver pair using a half-duplex channel, where one transceiver is mobile and the second transceiver is stationary.

FIG. 28 is exemplary of a transceiver pair scenario using a half-duplex channel where one transceiver is mobile and the second transceiver is stationary. The mobile transceiver is a UAV 215 and the second transceiver is stationary control station 216. The rights in this scenario could capture just the location of the UAV, the cylinder in which it operates 217 and provide just one set of transmitter and receiver rights or could specify unique rights for each end of the pair. The transmitter and receiver rights portions would consist of the standard components. The transmitter portion would have a maximum power density, a spectrum mask, and a power map and the receiver portion would have a maximum power density, an underlay mask, a power map, and a propagation map. This example has a larger region of protection 218 than the region of protection 213 of the similar transmitter-receiver pair scenario since the protection must extend to all possible locations 217 of the mobile transceiver 215.

Example 4

Mobile Network RF Spectrum Rights

Mobile networks consist of multiple mobile nodes and may use multiple channels. Further, the radios within the networks may use advanced radio technologies and protocols to adapt to the environment and each other for best network performance. The RF spectrum rights for a mobile network may specify transceiver rights for one or more channels. The location of one of these transceiver rights may extend to the whole location of the operating region of the network or to a portion of its operating region. The radios and the network would decide which components of the network use which channels at what time but their choices would be limited by the constraints of the rights. The right of a transceiver channel would include the location of the right as a volume and then a maximum power density, a spectrum mask, an underlay mask, a power map, and a propagation map. Only transceivers within the operating volume would be allowed to use the channel and although receivers outside the operating volume may receive the transmitted signals, only the receivers within the operating region would receive protection from the receiver portion of the right unless the receiver right is given with a separate volume.

Figure 29:
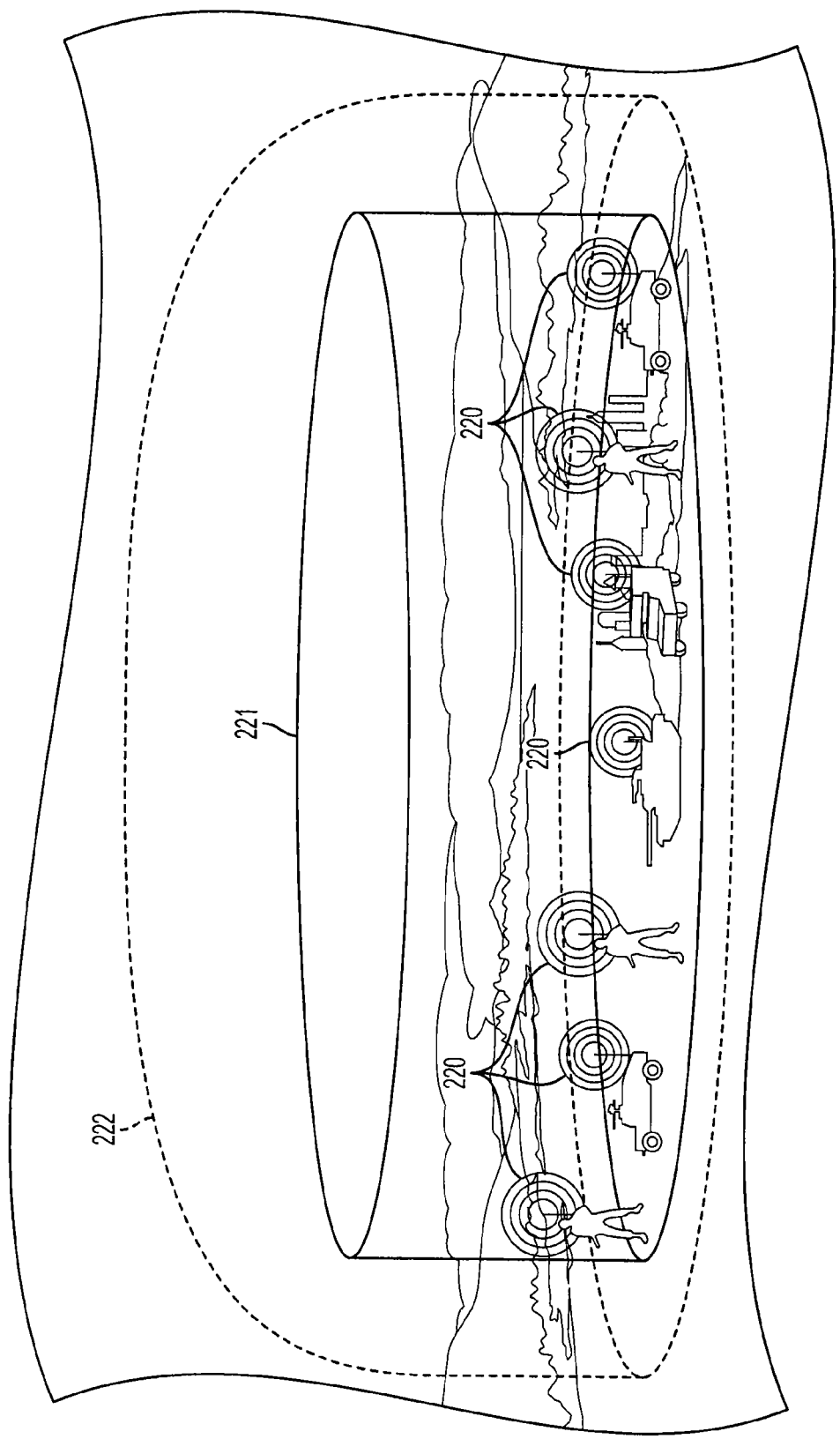
FIG. 29 illustrates an exemplary mobile network.

FIG. 29 illustrates an exemplary mobile network scenario. In FIG. 29, multiple mobile transceivers 220 may use the spectrum of the right if they operate within a volume 221 of that right. A region of protection 222 would surround the operating volume. In one embodiment, the exemplary RF spectrum right of FIG. 29 may be defined for each channel using an operating volume for the location, a maximum power density, a spectrum mask, an underlay mask, a power map, and a propagation map.

Example 5

Secondary Mobile Network RF Spectrum Rights

Mobile networks often include radios that use advanced radio technologies and protocols that make the networks cognizant of location and use of spectrum. Therefore, these networks may use RF spectrum in a secondary status. In one embodiment, secondary RF spectrum rights consist of a set of standard components of a transmitter right and the receiver rights of primary users that may restrict the secondary use of the spectrum. Secondary use may be managed by restricting any secondary use of spectrum that, because of proximity, could interfere with the primary users, allowing co-use in a location when the secondary user employs a specified protocol and when the secondary user follows a particular use policy. Typically, secondary users are not provided an explicit protection from other spectrum users, and as such, receiver rights may not be included in their rights. However, if there were a hierarchy of secondary users, then a secondary user may receive protections from lower priority users.

Figure 30:
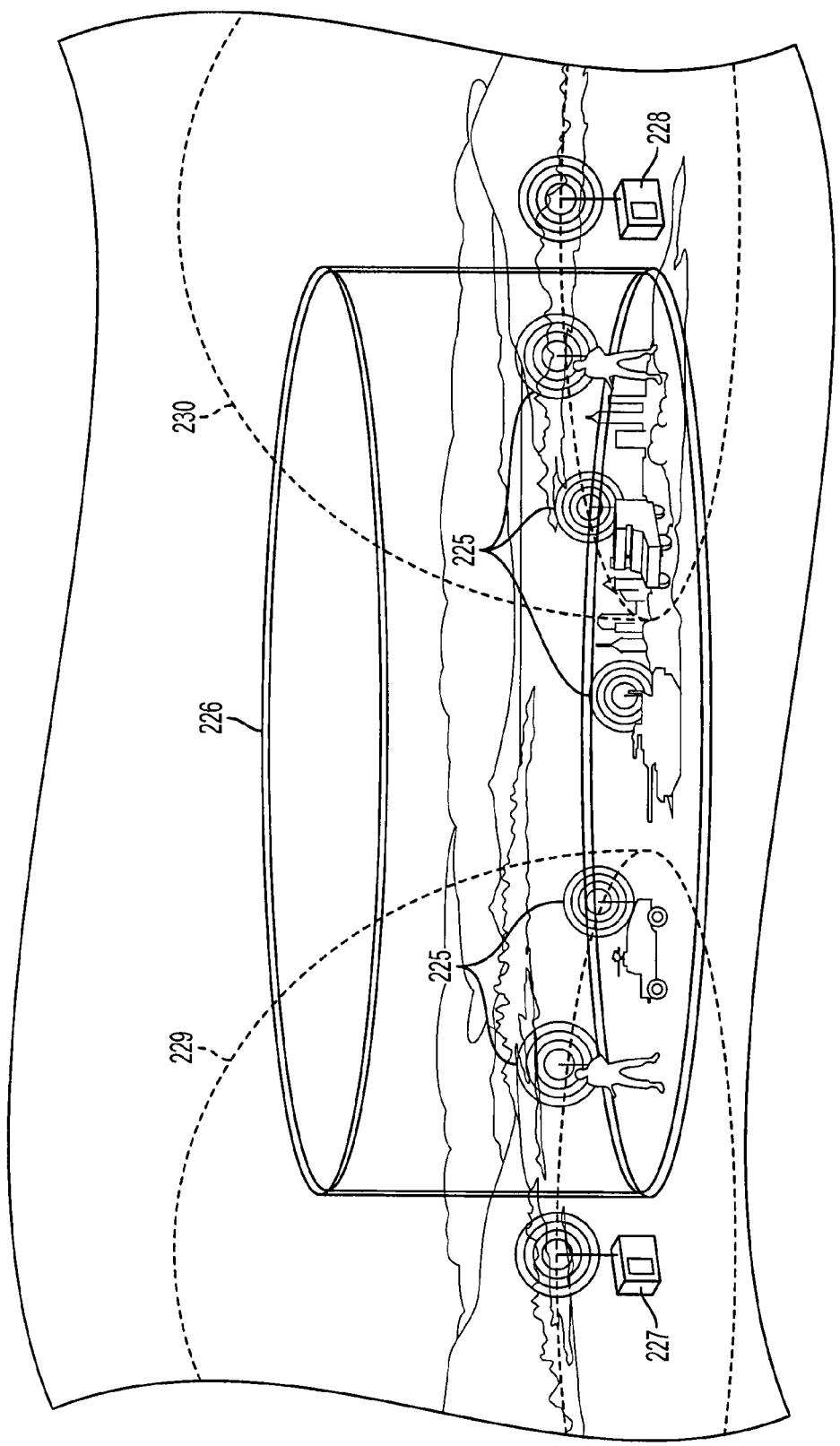
FIG. 30 illustrates an exemplary mobile network using spectrum in a secondary status.

FIG. 30 illustrates an exemplary mobile network scenario using RF spectrum in a secondary status. In FIG. 30, multiple mobile transceivers 225 receive secondary rights to use two bands of spectrum in a volume that is in the vicinity of two primary receivers, 227 and 228. The secondary rights for each channel may be one of multiple types. In one embodiment, a spectrum right for a channel includes a location, a maximum power density, a spectrum mask, and a power map, as well as a receiver right that would restrict its use. With this approach, radios would forgo using spectrum if they were to compute that their possible use could interfere with primary users based on the parameters of the receiver right. In another embodiment, the spectrum right of a channel includes a location, a maximum power density, a spectrum mask, a power map, and a protocol specification. In this case, the protocol specification defines behavior that prevents harmful interference, and therefore, the radios need not be aware of the location of primary receivers. In a third embodiment, the spectrum right of a channel includes a location, a maximum power density, a spectrum mask, and a power map, as well as a receiver right of the secondary user with a protocol specification. In this case, the secondary user can use spectrum in a manner of its choosing if it computes that it will not interfere with the primary receiver according to the receiver right, and further, the secondary user can use the channel in the space where it might interfere if it uses the specified protocol. In a fourth embodiment, a spectrum right of a channel includes a location, a maximum power density, a spectrum mask, a power map, and a policy specification. In this case, the policy specification defines conditions and behaviors that prevent harmful interference, and the radios need not be aware of the location of primary receivers. In a fifth embodiment, a spectrum right of a channel includes a location, a maximum power density, a spectrum mask, and a power map, as well as a receiver right of the secondary user with a policy specification. In this case, the secondary user can use spectrum in a manner of its choosing if it computes that it will not interfere with the primary receiver according to the receiver right, and the secondary user can use the channel in the space where it might interfere if it uses the specified policy. The present invention, although described in terms of specific secondary RF spectrum rights, is not limited to such embodiments, and one skilled in the art would recognize that additional techniques may be used to define secondary RF spectrum rights without departing from the spirit or scope of the present invention. Further, when a network is authorized to use multiple channels in a secondary status, those rights need not be of the same type.

6. System and Time Limited RF Spectrum Rights

Systems may require multiple channels for operation, and those channels can operate in different ways, each requiring different sorts of protection and allowing different opportunities for reuse. Thus, the spectrum rights of systems may consist of various combinations of spectrum rights. For example, the spectrum rights of a UAV system may consist of a transceiver pair right for the channel used by a ground controller to control the UAV, a transmitter-receiver pair right for a second channel for the downlink of flight information, and then a broadcast right for a third channel for the dissemination of the sensor information acquired by the UAV.

Further, system rights can be restricted to particular time periods through the specification of the time associated with the right. By using start and end times, or by using periodic use definition with the rights, rights can be subdivided in ways that allow further spectrum reuse opportunities. Time period can capture up and down times of systems or attempt to identify periods of use where the location of components are confined to smaller areas than the total possible operating range. Capturing the up and down times of one primary system may reveal times that other systems may use the same spectrum in a primary status. Further, capturing a reduced operating location reduces the spatial consumption of spectrum by a right allowing more opportunities for spatial reuse.

Figure 31:
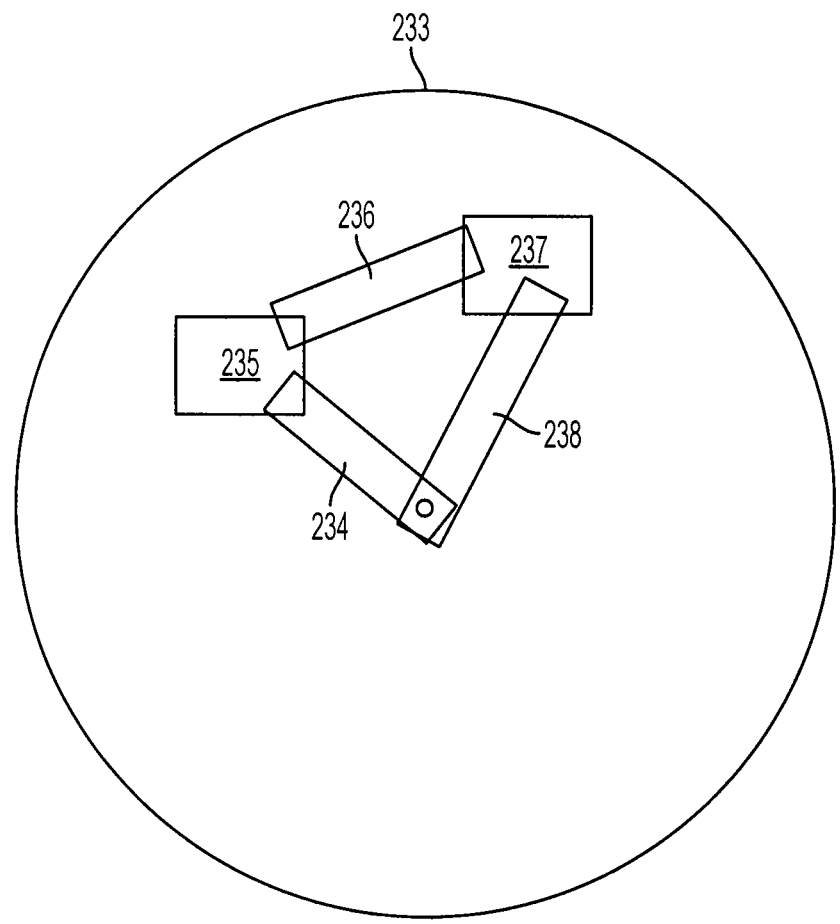
FIG. 31 illustrates an exemplary process for subdividing spectrum rights locations based on time.

FIG. 31 illustrates an exemplary process for subdividing spectrum rights locations based on time. In FIG. 31, a total possible operating region of a mobile transmitter is represented by circular area 233, but knowledge of a particular use of the system allows bounding the possible locations of the mobile transmitter to an area 234 for the first time period, to an area 235 for a second time period, to an area 236 for a third time period, to an area 237 for a fourth time period, and to an area 238 for a fifth time period. A similar method for capturing temporal change in the location of a right uses a track instead of a volume.

One skilled in the art would recognize that the foregoing examples do not represent an exhaustive description of all possible RF spectrum rights. In additional embodiments, further rights may be constructed from the basic components of a spectrum right, including: location, maximum power density, spectrum masks, underlay masks, power maps, propagation maps, start time, end times, periodic times, policy specifications, and protocol specifications. In these additional embodiments, the basic components may be combined in many ways and associated with particular components of a system to create unique rights as demanded by the plethora of systems that use RF spectrum and for the particular tasks they are used.

Compliance with RF Spectrum Rights

In order for any method for generating spectrum rights method to be effective, there must be a corresponding method to assess compliance. The compliance of primary transmitters, i.e., rights holders without any constraints from other users, to a transmitter right is generally straightforward. The RF components should be within the spectrum mask and the power of emission at the transmitter should comply with the power map. Further, the transmitter should only transmit when it is in a location where it is authorized to use the spectrum. Further, systems that are intended to be cognizant must be able to identify their location and verify they are within the location of the right. For non-cognizant systems, the users must ensure they are operated in the authorized space.

The compliance of secondary transmitters, i.e., rights holders with restrictions placed on their use of spectrum by other users of spectrum, requires the secondary users to compute the operating parameters that are compliant with the restrictions. Compliance is achieve by either (i) not interfering with a primary receiver by using different spectrum or a power that insures the interference is below or outside the spectrum mask, (ii) using a protocol that is compatible with a primary rights holder when in the location that the restriction applies, or (iii) using a policy that is compatible with the primary rights holder when in the location that this restriction applies.

Figure 32:
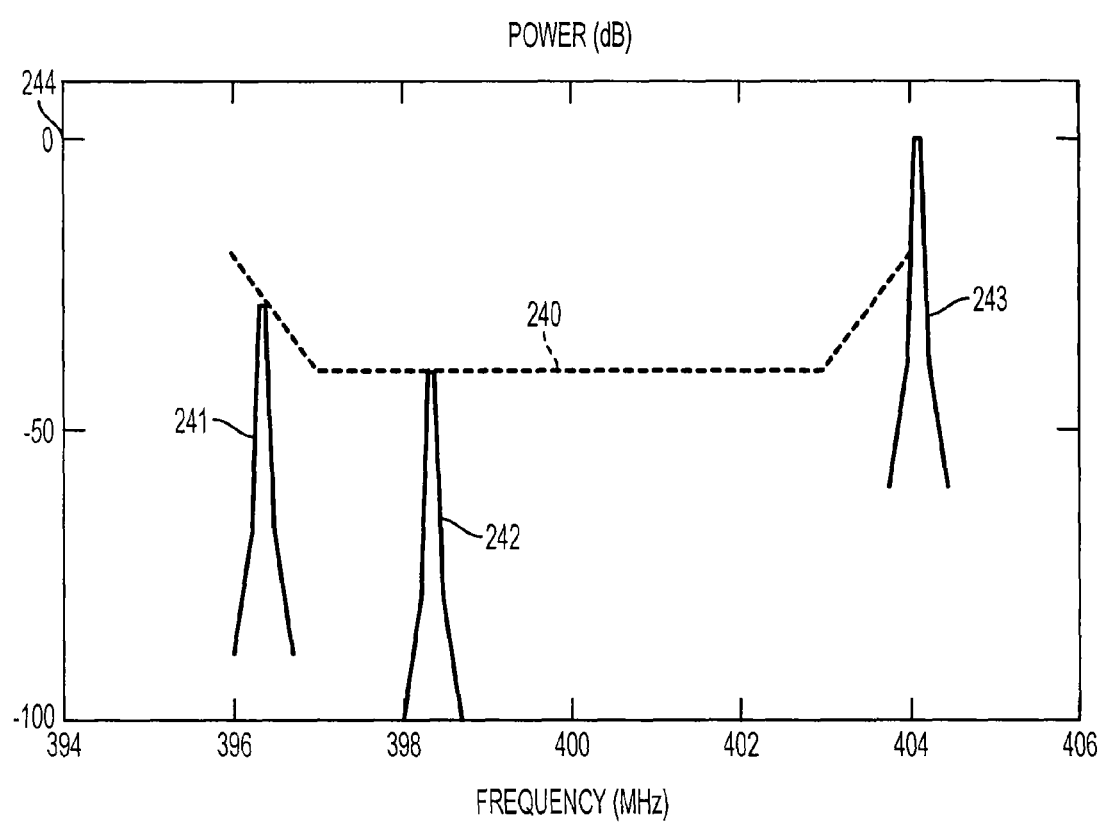
FIG. 32 illustrates the effect of a spectrum underlay of a primary receiver right on the allowed secondary power density of three secondary rights with identical spectrum masks but shifted in frequency.

Non-interfering compliance requires computing the power that a secondary user may use in its transmission to operate within the restrictions of a primary right. In one embodiment, the computation may include three intermediate computations. The first intermediate computation determines an effect of underlay masks of the constraining receiver rights on the transmit power of a secondary transmitter. The goal of the computation is to determine the minimum permissible difference, $p_m$, between the power density of the primary right and the power density of the secondary right at the locations of the primary right. One approach to determine this difference is to shift the transmitter spectrum mask in power to the point where the constraining mask first restricts the transmit power. FIG. 32 illustrates the effect of a spectrum underlay 240 of a primary receiver right on the allowed secondary power density of three secondary rights with identical spectrum masks and with shifted frequencies, 241, 242, and 243. Each secondary right is constrained to a different power density level. First channel 241 is allowed to operate at a power density 28 dB beneath the primary power density 244 (e.g., $p_m$=−28 dB). Further, second channel 242 is allowed to operate at 40 dB beneath the primary power density 244 (e.g., $p_m$=−40 dB), and third channel 243 is allowed to operate at the same power density 244 (e.g., $p_m$=0 dB.)

The second intermediate computation determines a constraining location of a primary right and a power density at that location. In a simple stationary receiver spectrum right, the constraining location is the location of the receiver, and the power density at that point, $p_p$, is the maximum power density of the receiver right adjusted by the power map for the direction toward the secondary transmitter.

The third intermediate computation determines a total attenuation from the secondary transmitter to the primary constraining location, $p_a$. This computation uses the pathloss exponent of the governing propagation map for the directions between the primary receiver and the secondary transmitter, usually the propagation map of the receiver right and the direction from the receiver right location and the secondary transmitter. Alternatively, if a propagation map has been designated for this purpose for the particular secondary transmitter, then the direction is from the secondary transmitter toward the constraining location of the primary receiver right.

Based on these intermediate computations, the maximum power density $p_d$ at the secondary transmitter toward the constraining location of the primary receiver right is $$p_d = p_p + p_m - p_a. \quad (21)$$

Determining the constraining location and power density of the primary right may be computationally intensive. For example, if a location of the receiver right were a volume, then the constraining location is the point in that volume that most constrains the secondary transmitter. Further, if a power density of the primary receiver right, the pathloss exponent toward the secondary transmitter, and the power density of the secondary transmitter were all the same for all locations in the receiver right volume, then the most constraining point is the point in the volume that is closest to the secondary transmitter. If the receiver right has a directional power density, the secondary transmitter uses a directional transmission, or the governing propagation map is directional, then the determination of the constraining point in a volume is more difficult. In various embodiments, the constraining point may be determined through a search algorithm or some heuristic approach. The computation would be further complicated if a single $p_d$ were sought that could be used at all points in the volume of a secondary right. In such an embodiment, the computation may involve determining the combination of points, one in the receiver right volume and one in the secondary transmitter right volume, that most constrains the secondary transmitter. The present invention is not limited to a single algorithm, and one skilled in the art would recognize that a variety of algorithms may be used to find the constraining point of a receiver right or the constraining pair of points in the a receiver right volume and a transmitter volume without departing from the spirit and scope of this invention.

Figure 33:
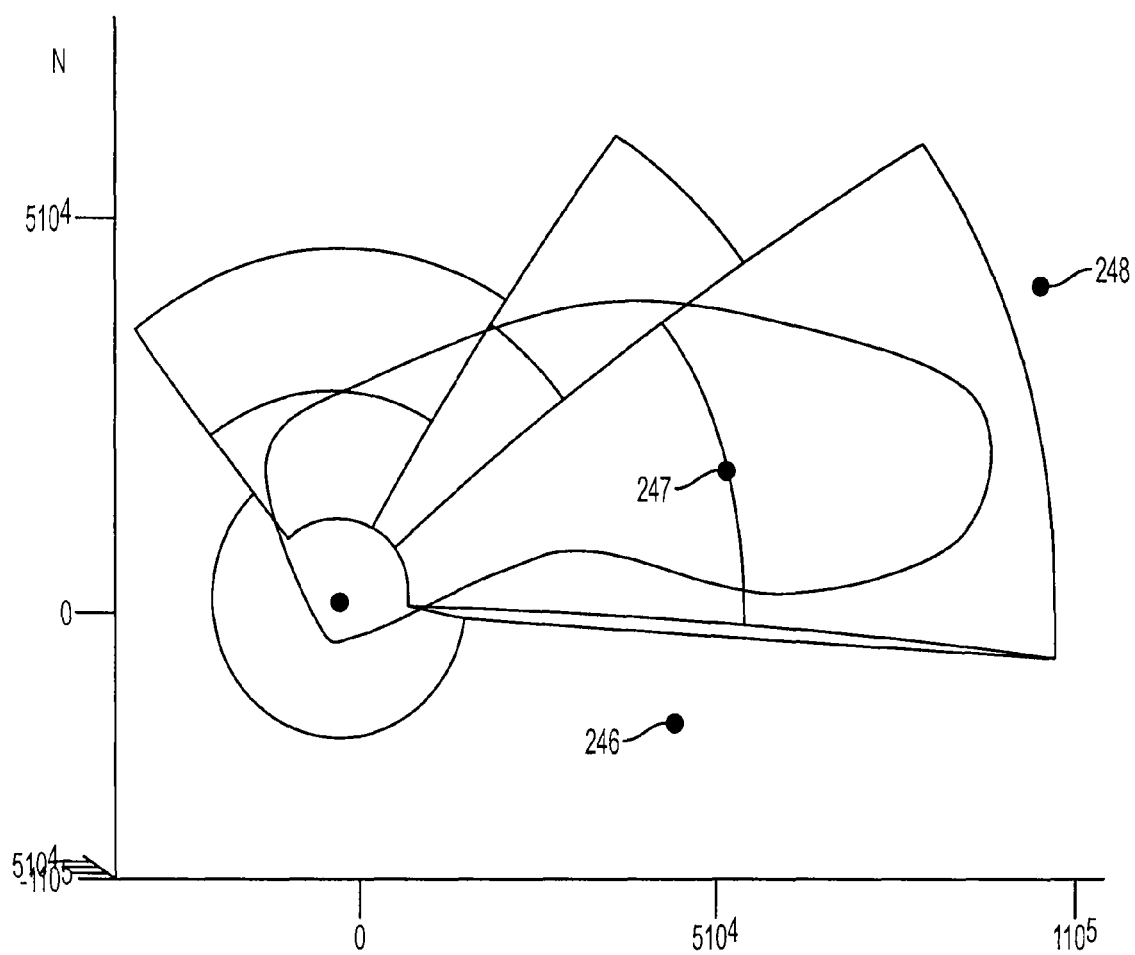
FIG. 33 illustrates three relative locations of secondary transmitters with respect to an exemplary broadcaster's right.

The determination of the constraining point in the receiver rights of a broadcaster's right is also computationally involved and is different than that of a receiver in a volume. The challenge in the receiver rights of broadcaster's rights is that the receiver rights change with location. The assessment of compliance of a secondary transmitter to a primary broadcaster right must consider the full volume of both rights, and therefore, the intersections of all sectors of both rights (a sector being a solid angle with a common power density and pathloss exponent). FIG. 33 illustrates three relative locations of secondary transmitters with respect to an exemplary broadcaster's right. A secondary transmitter 246 is adjacent to a sector, a transmitter at 247 is within a sector, and a transmitter 248 is beyond a sector.

Figure 34:
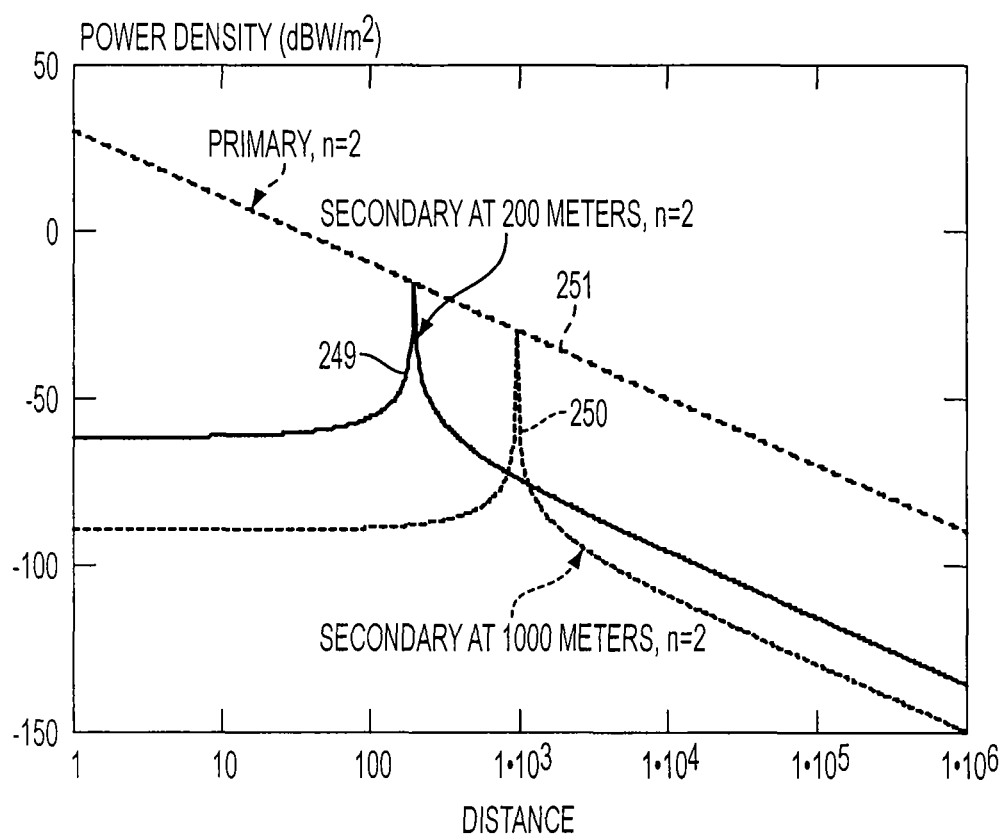
FIG. 34 illustrates the effect of power law attenuation on the compliance of secondary transmissions within sectors.

A secondary transmitter is compliant to a constraint in the sector in which it is located if the secondary transmitter is compliant at its immediate location within the sector. Further, the pathloss exponent for the sector of the broadcaster right is different from the pathloss exponent of the secondary transmitter right if the secondary transmitter is compliant at all points on the surface at the boundary of the primary right. The power law effect of signal attenuation will make signals that are compliant within a sector more compliant as they propagate, and FIG. 34 illustrates the effect of power law attenuation on the compliance of secondary transmissions within sectors. The attenuation of two secondary transmissions, one occurring at first location 249 of 200 meters and one occurring at a second location 250 of 1000 meters, is illustrated in FIG. 34. Both secondary locations are compliant to the transmit power limit of the broadcaster right 251 at the point of transmission. FIG. 34 demonstrates that the signals become more compliant as they propagate and that the signals will remain more compliant unless the secondary signal is modeled to attenuate at a lower rate than the primary transmitter, which could cause the bound to attenuate to a level below the secondary attenuated signal. If this crossover occurs before the threshold boundary of the broadcast right, then a point on the boundary that is not the location of the secondary transmitter is the constraining location of the right.

A transmitter beyond a sector of a primary right is compliant with the right of that primary sector if it is compliant to all points on the threshold surface of the sector. The specific point on the surface depends on those sectors from the secondary transmitter that intersect the surface of the primary sector. Given the intersection of a primary sector with a single secondary sector, then the constraining point of that combination is the point on the threshold surface of the primary sector that is closest to the secondary transmitter. All points would need to be checked, and the point that most constrains the transmit power of the secondary is considered the constraining point.

Figure 35:
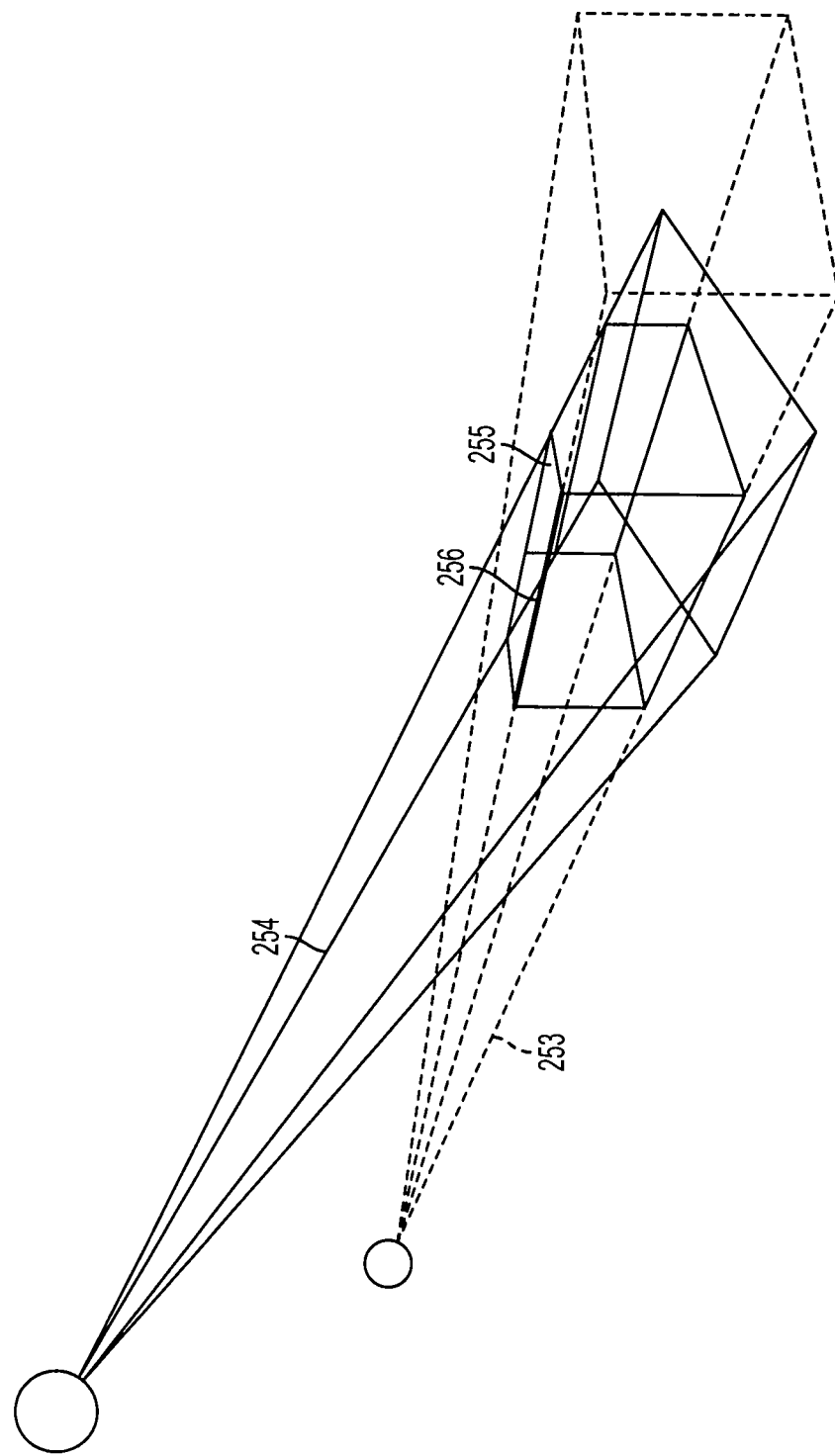
FIG. 35 illustrates the intersection of a secondary transmitter sector with a primary broadcast rights sector.

A transmitter that is adjacent to a sector will have sectors that intersect within the broadcaster right, and FIG. 35 illustrates the intersection of a secondary transmitter sector 254 with a primary broadcast rights sector 253 and depicts a volume of intersection 255. The point in this volume that most constrains the secondary transmitter is normally found on the primary attenuation path in the volume that is closest to the secondary transmitter, and the constraining point is normally the point on the path that is closest to the secondary transmitter. A primary attenuation path is a path on a line originating from the primary transmitter, and in FIG. 35, the primary attenuation path 256 occurs on an edge of the sector of intersection.

Thus, in the various embodiments presented herein, compliance of a secondary right to a primary broadcaster right requires determining the constraining point of the intersections of each pair of sectors, one from the primary right and one from the secondary right. In general, the constraining point that most constrains the secondary transmitter power governs.

Figure 36:
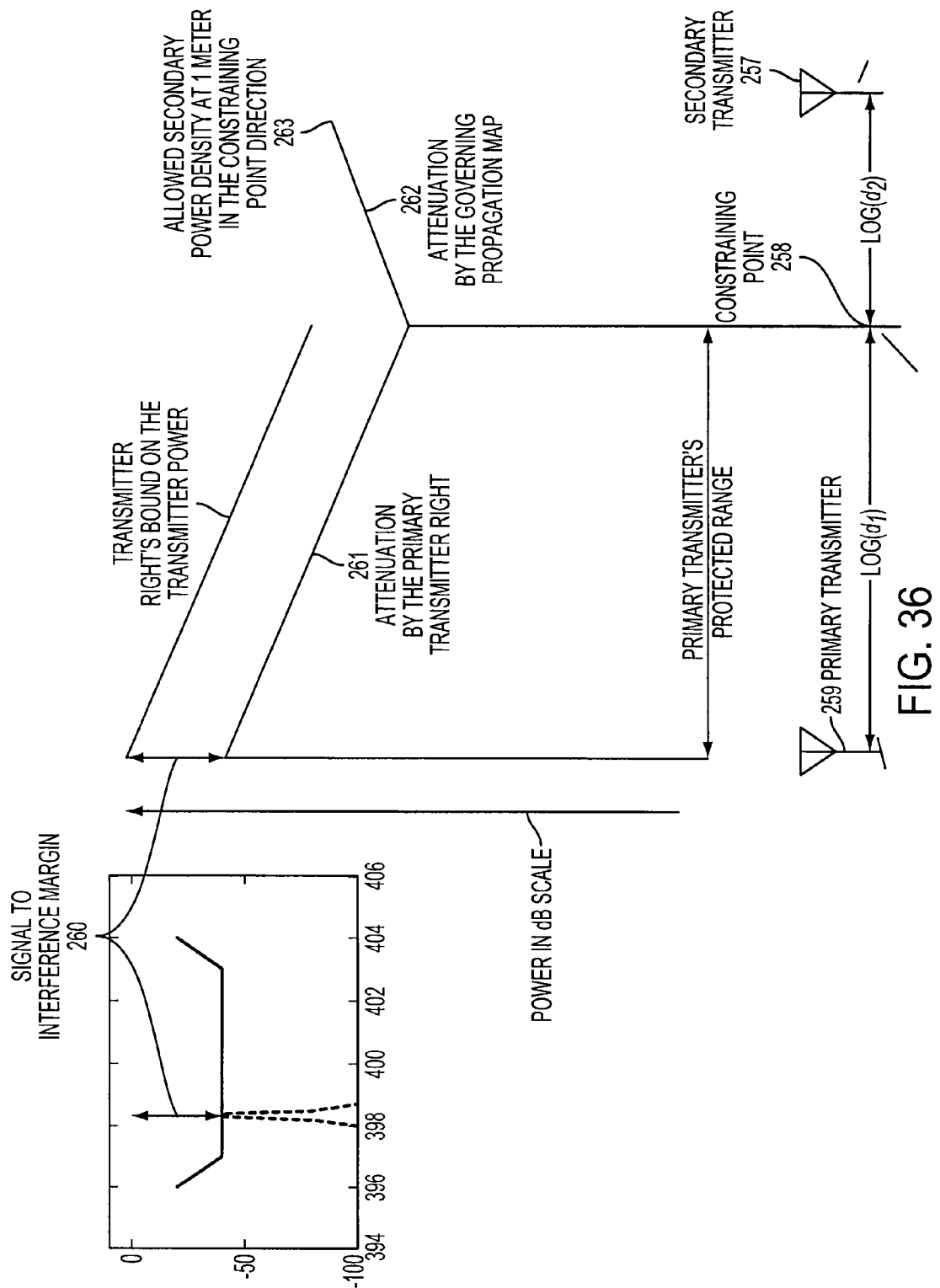
FIG. 36 illustrates an exemplary process for determining a power constraint on a secondary transmitter by a constraining point in the intersection of a primary broadcaster right sector and a secondary rights sector.

FIG. 36 illustrates an exemplary process for determining a power constraint on a secondary transmitter by a constraining point in the intersection of a primary broadcaster right sector and a secondary rights sector. The process begins by determining a minimum permissible difference $p_m$ between a maximum power density $p_p$ of the broadcast signal and the secondary signal, shown generally at 260, as constrained by the underlay mask of the broadcaster's right. The second step is to determine the total attenuation of the broadcasted signal $p_{ap}$ at a constraining point 258 using an attenuation 260 of the broadcasted signal predicted by a propagation map of the broadcaster's transmitter rights. The third step is to determine a total attenuation of the broadcasted signal $p_{as}$ from a secondary transmitter 257 to the constraining point 258 using an attenuation 262 predicted by the governing propagation map. Based on these intermediate calculations, the allowed transmit power may be written as $$p_d = p_p + p_m + p_{ap} - p_{as}. \quad (22)$$

Compliance to policy, or to protocol specifications, is verified by whether the system can follow the policy or protocol. It is anticipated that the ability of an RF component to implement the behaviors of a protocol or a policy would be certified as part of the licensing of equipment.

Examples of Using the Location-Based RF Spectrum Rights

The location-based method for specifying RF spectrum rights (LBSR) provides a flexible approach to capture the spectral, spatial, and temporal consumption of spectrum by RF devices and systems that includes sufficient information within the right to tractably compute compatible reuse of the spectrum. It is suitable for all spectrum related activities including RF spectrum regulation, conveying machine readable spectrum use policy to cognitive RF devices and systems, enabling the creation of tools for the computation of optimal reuse of spectrum, and thus the creation of tools for the dynamic management of spectrum for either a purely managerial role or for the purposes of creating a secondary spectrum market. In this section, we describe the use LBSR in these varied tasks.

Examples of Using the Location-Based RF Spectrum Rights

The location-based method for specifying RF spectrum rights (LBSR) provides a flexible approach to capture the spectral, spatial, and temporal consumption of spectrum by RF devices and systems that includes sufficient information within the right to tractably compute compatible reuse of the spectrum. It is suitable for all spectrum related activities including RF spectrum regulation, conveying machine readable spectrum use policy to cognitive RF devices and systems, enabling the creation of tools for the computation of optimal reuse of spectrum, and thus the creation of tools for the dynamic management of spectrum for either a purely managerial role or for the purposes of creating a secondary spectrum market. In this section, we describe the use of LBSR in these varied tasks.

1. Regulating Spectrum Use

Traditional spectrum regulation articulates authorized uses of spectrum by identifying who may transmit, what band of RF spectrum they may use, where they may transmit, and the limit to the power of their emissions. Although this is a sufficient definition for users and regulators to assess compliance, the actual spatial consumption of spectrum remains ambiguous. Enabling spectrum reuse is an administrative process that involves tools for the computation of propagation effects and signal strength and administrative proceedings to vet concerns about potential interference. The results of the process are new authorizations, either a license or an assignment, with the implication that these authorizations have been granted since it was determined through this process that they can co-exist with legacy authorizations in the same spectrum with acceptable interactions.

The LBSR provides a better approach to articulate authorized uses of RF spectrum, since the LBSR specifies spatial and spectral consumption in an unambiguous way. Thus, the LSBR documents and reveal the thought process that led to the assignments and revealing the opportunities for reuse. In various embodiments, the addition of components of the receiver rights portions of spectrum rights to the LSBR allows the LSBR to specify spatial and spectral consumption unambiguously. Further, in additional embodiments, the LBSR can provide the same constraints to authorized users as traditional methods. One benefit of the LBSR is that it serves as its own constraint to other users of spectrum, thus reducing if not totally eliminating the need for administrative proceedings for new uses. In these embodiments, there is no dependence on third party models to compute compatible coexistence. Further, the LSBR exposes the assumptions about where components of an RF system operate, their performance specifically their tolerance of interference, and what protection is required to maintain their performance.

2. Computing Spectrum Reuse

Traditional spectrum management systems maintain a database of spectrum users and the characteristics of their radios. These component models of systems are very conservative and usually imply that they are intolerant of any interference. The spectrum management systems provide terrain and propagation models for computing signal strength. A spectrum manager wanting to determine whether a new use is possible specifies details of the use, i.e., information about the transmitter and its location of use, and the tool returns the answer whether the new use will or will not interfere with the legacy uses. These yes or no answers are based on sophisticated propagation models, yet conservative estimates of tolerance have limited value when seeking an optimum approach to assigning spectrum especially for systems that are mobile. For example, the computation of whether one mobile system can coexist with another may be especially affected by conservative estimates of tolerance. Since propagation can vary by each pairwise positioning of the two systems, there are an infinite number of possibilities and no practical approach to search the alternatives. Further, it is desirable for cognitive systems to compute their reuse opportunities. It would be impractical for these cognitive systems to maintain the large databases of systems and to implement sophisticated terrain and propagation models for this purpose.

In various embodiments, the LBSR is well suited to the problem of computing spectrum reuse. First, the LSBR provides a disciplined approach to capture the performance of RF components in the specified environments. The building of LBSRs requires the specification of tolerance to interference and the specification of a propagation model that provides an acceptable margin to variances in actual pathloss or to account for what is unknown about the propagation conditions. Committing to these models removes ambiguity and reveals the true spatial and spectral consumption of spectrum of a system. Second, the LBSR provides a model of spectrum consumption that makes the computation of reuse tractable. As described above, it is possible to compute compatible reuse in a very manageable way and without any external models except those specified within the right. In one embodiment, this latter feature makes the LBSR especially suitable for conveying spectrum use to cognitive systems. Cognitive systems can compute reuse opportunities using just a collection of rights that have already been authorized.

3. Conveying Machine Readable Spectrum Use Policy

Spectrum use policy conveys to a cognitive system what spectrum they may use and under what conditions. Current approaches in conveying policy rely on sensing conditions alone to reveal reuse opportunities and behaviors. Since specific interference is based on location a policy that does not include location must be conservative and be created to account for the most restrictive spatial conditions. Further, there is no agreed upon ontology for specifying the components of spectrum policy. This is an active area of research.

In an embodiment, the LBSR is perfectly suited for specifying policy. In such an embodiment, the LSBR provides an unambiguous method for specifying what spectrum may be used and under what conditions. The conditions can be based on location alone, be based on sensing alone, or a combination. Further, the method allows the specification of detailed protocols that allow sharing in some situations where neither sensing nor location can be used to enable reuse. The LBSR provides a general approach to specifying spectrum policy and can be extended with additional sensing policies and protocols as they are discovered to be compatible with particular uses of spectrum that must be protected. A great advantage of the LBSR is that policies do not have to be created to protect a plurality of users; rather, the specific rights of other users are themselves the basis of the policy. The receiver right of a primary user is the most restrictive constraint to a secondary user. The receiver right can then be enhanced with either a sensing policy or a protocol that allows compatible reuse of spectrum in the same volumes.

Making a policy machine readable requires a particular syntax with semantics for expressing the policy, and in one embodiment, the LBSR provides the semantics for the components of rights and policies. The syntax choices have been left to be resolved as part of future standardization efforts. One skilled in the art would recognize that various choices of syntax may be used without departing from the spirit or scope of the present invention.

4. Dynamic Spectrum Management

Current spectrum management approaches seek to resolve to persistent decisions on uses and assignments of spectrum. Such an approach to spectrum management can result in missing opportunities to reuse spectrum temporally and spatially especially for non-persistent uses of spectrum that are forced to fit into the persistent paradigm.

In one embodiment, the LBSR is well suited to serve as the foundation of a more dynamic spectrum management system. The benefits of the LBSR are rooted in its ability to articulate the consumption of spectrum without any details of the components of the systems that are using the spectrum. Further, since the LSBR models the pathloss in the right, it eliminates the need for systems to have detailed propagation models of the environments in which they are used. So, once rights are converted into the location-based spectrum rights definition, a single set of algorithms can be used to compute compliant reuse of spectrum and spectrum reuse opportunities. In turn, this functionality allows the spectrum management tasks to be distributed. Individual mission planning tools can determine their own compatibility with rights given to others, and these tools can communicate their own mission level use of spectrum. The process described above is often referred to as the fast command and control model of spectrum management.

Figure 37:
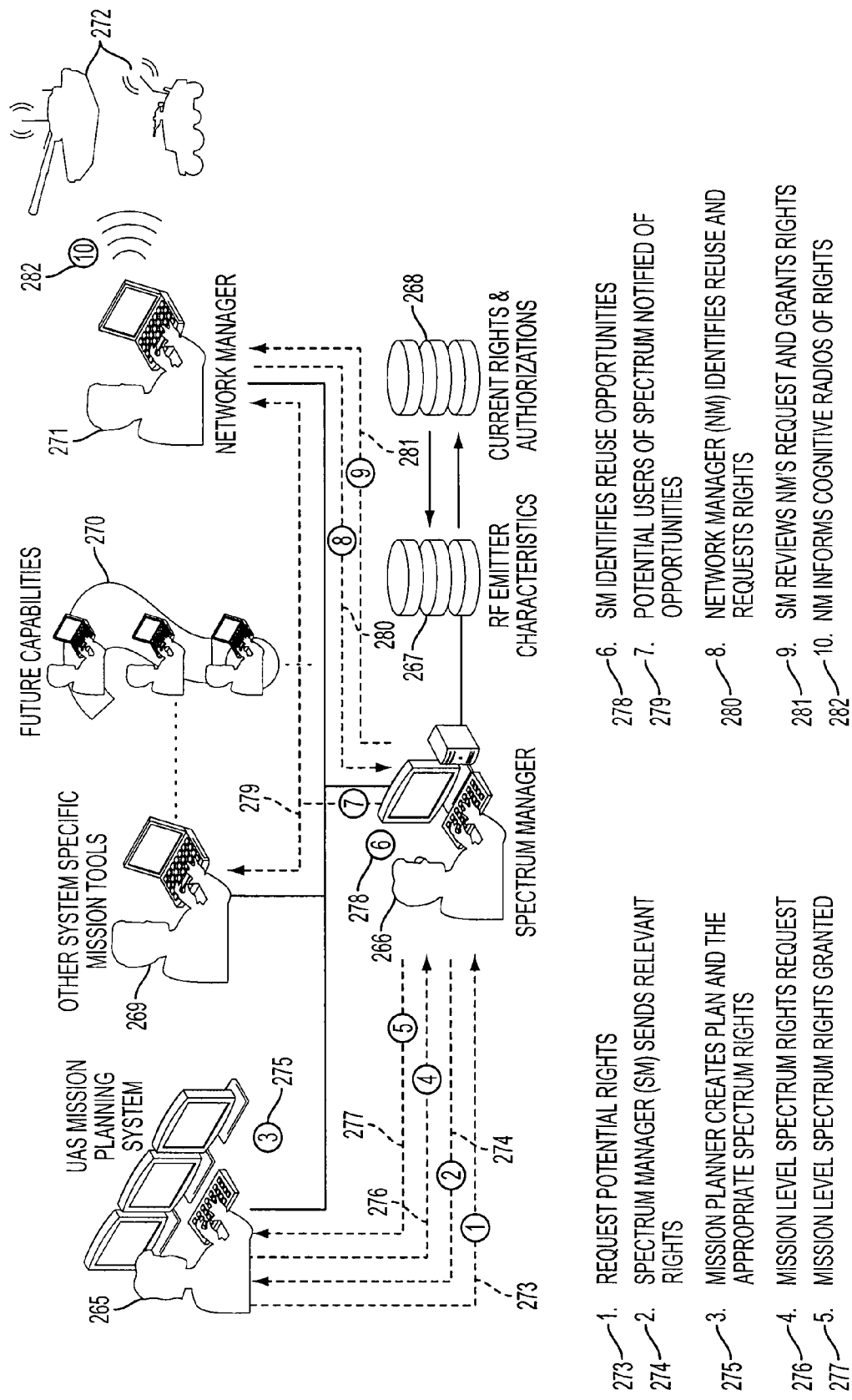
FIG. 37 illustrates an exemplary dynamic spectrum management system.

FIG. 37 illustrates an exemplary dynamic spectrum management system that utilizes LSBR. In FIG. 37, the dynamic spectrum management system includes an unmanned aerial system (UAS) mission planning system 265, a spectrum manager 266 with a databases of RF system characteristics 267 and current spectrum authorizations using the LBSR 268, other mission planning systems 269, future capabilities 270, a network manager 271, and wireless network components 272. The planning process begins with the mission planning system 265 requesting spectrum 272 from the spectrum manager 266. The spectrum manager 268 responds with rights for the UAS systems together with relevant restrictions to spectrum use 273. With these rights and the planning tool's own knowledge of spectrum use of its systems, the planner can consider available spectrum in planning and defining missions. Once the mission planner resolves upon the set of missions their unit will execute 274, they request the rights necessary for these missions from the spectrum manager 275. If the requests have no errors, then the spectrum manager loads the rights into the database of rights and confirms the request 276. The spectrum manager can then search for reuse opportunities 278 and convey these rights 279 to a secondary user that uses spectrum on availability so that those systems can determine opportunities to use the same spectrum. In this case, the network manager 271 identifies ways that it can use a portion of the available spectrum and responds to the spectrum manager with a request 280. The spectrum manager subsequently grants this request 281. In the example of FIG. 37, the network manager requests spectrum for cognitive radios, and therefore, these radios are informed of the spectrum 282 that they may try to use.

In the embodiment of FIG. 37, the LSBR is used in all communications and computations of the process. For example, the LSBR is used for all communications of requests for rights, 273, 276, and 278. Further, the LSBR is used in the computation of use opportunities, 275 and 278. The LSBR is also used to capture the mission level use of spectrum 275, to convey RF spectrum use opportunities 279 and policy 282, and to grant RF spectrum requests 277 and 281.

Figure 38:
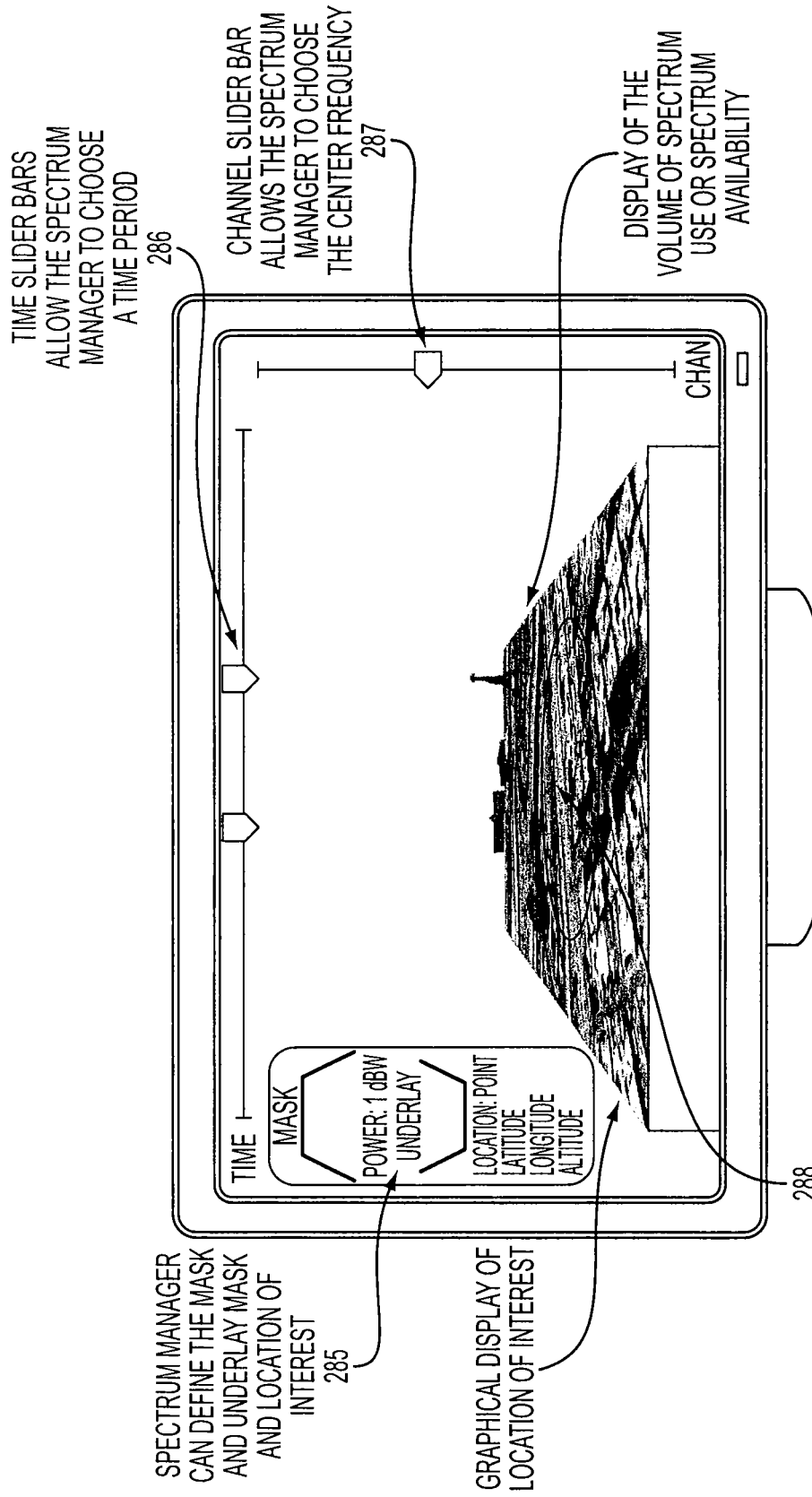
FIG. 38 illustrates an exemplary spectrum managers work station that captures spectrum rights.

FIG. 38 illustrates an exemplary of a spectrum manager's system that uses the LBSR to capture spectrum rights. In the embodiment of FIG. 37, the spectrum manager's system would have a number of automated processes that assist the spectrum manager in his work. For example, routine tasks might include, but are not limited to, checking the compliance of rights suggested by mission planning tools, granting rights, searching for spectrum reuse opportunities with some constraints, and creating rights for new systems. FIG. 38 illustrates a screen shot of one possible screen that could be used to assist a spectrum manager to search for spectrum reuse opportunities at a fine resolution. The spectrum manager may discover opportunities by specifying the requirements of the system in terms of its spectrum mask 285 and required receiver rights, and then use time slider bars 286, channel bars 287, and the area display 288 of the graphical user interface to define the mission period, frequencies and locations that are required for a new mission. Automated processes could search the database of rights and identify the channel(s) that might be assigned. The spectrum manager may select a channel and the system would create the right associated with the manager's definition of the mission requirement.

FIG. 37 also identifies future capabilities 270 as part of the system. In one embodiment, a future capability uses a system of sensors to detect the uses of spectrum for the purposes of seeking reuse opportunities, identifying inappropriate use of spectrum, and for calibrating rights. Further, in an additional embodiment, the same graphical user interface of FIG. 38 may also be used to display sensed use of spectrum. The display of the use of spectrum can be compared to dispensed rights to determine where rights are too liberal in their authorization of spectrum use, or the comparison can be used to determine when spectrum is being used outside authorized areas.

Figure 39:
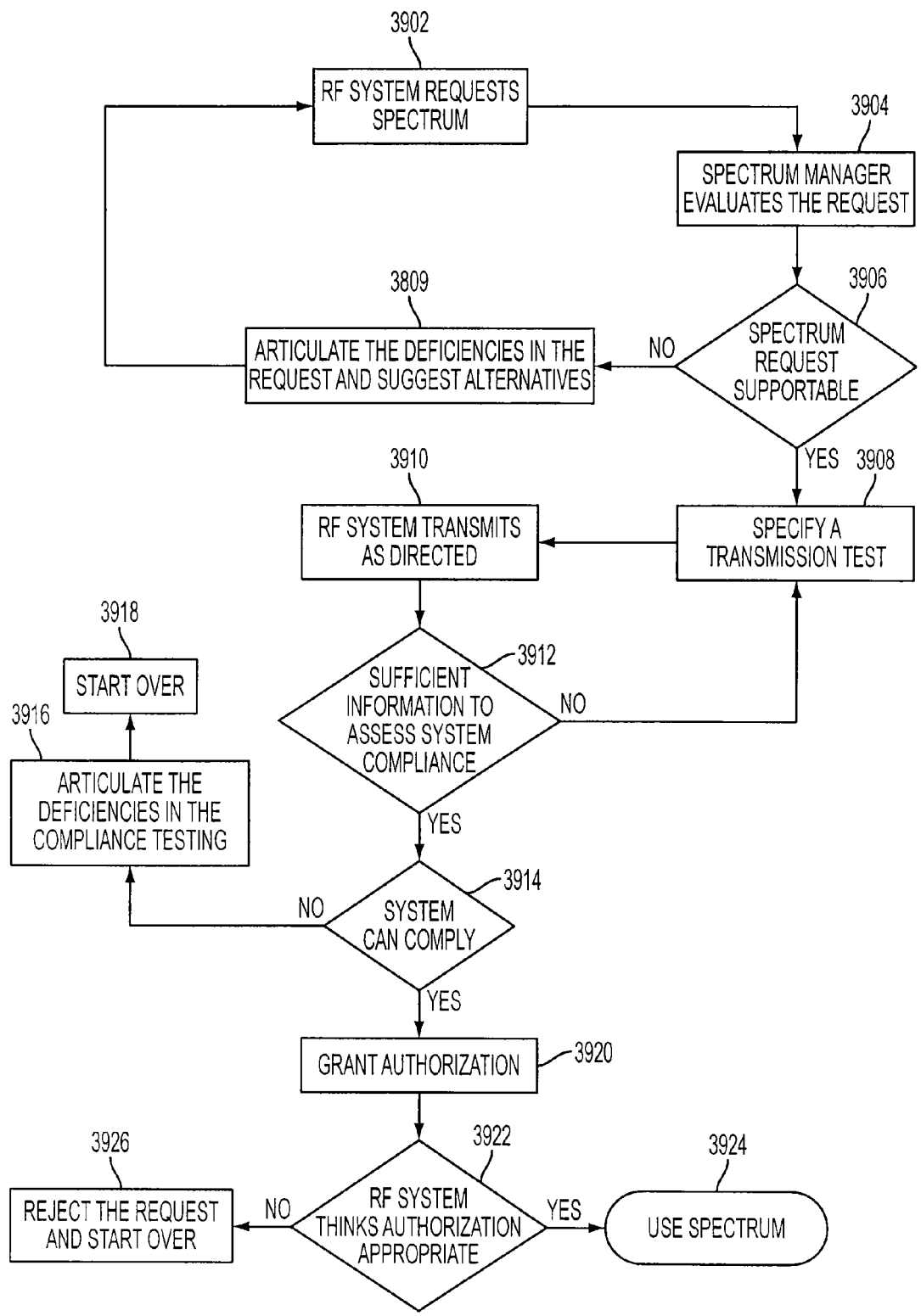
FIG. 39 illustrates an exemplary process of requesting spectrum rights and the role of calibration in that process.

FIG. 39 illustrates an exemplary method 3900 of requesting spectrum rights and the role of calibration in that process. In step 3902, a remote RF system requests spectrum. A spectrum manager evaluates the request in step 3904 and determines in step 3906 whether the request is supportable. If the request is not supportable, then the spectrum manager will articulate the deficiencies in the request and propose some alternative spectrum to the requestor in step 3909. The requestor may choose one of these proposals, or request additional spectrum in step 3902, and steps 3902, 3904, 3906, and 3909 may be repeated until the spectrum request is acceptable to the spectrum manager.

Once the spectrum request is deemed supportable by the spectrum manager in step 3906, the spectrum manager initiates a calibration process in step 3908 in which the spectrum requestor is given direction to transmit within the criteria of a right specified by the spectrum manager. The requesting system then transmits as directed in step 3910. Sensors of the network observe and report on the requestor's spectrum use, and the spectrum manager makes an assessment in step 3912 as to whether there is sufficient information to verify compliance. If the spectrum manager is unable to verify compliance in step 3912, then the spectrum manager may require an additional transmission test in step 3908.

In one embodiment, steps 3908, 3910, and 3912 may calibrate an RF system to ensure the subsequent right has a physical behavior that matches the intention of the right. However, in an additional embodiment, steps 3908, 3910, and 3912 may verify that an RF system is capable of implementing a protocol or policy that is necessary for operation within a requested volume. If there is sufficient information to verify compliance in step 3912, the spectrum manager assesses whether the system can comply with directions in step 3914. If the system manager determines the system cannot comply with directions, then the spectrum manager will report the deficiency to the requesting system in step 3916, and the system may request additional spectrum in step 3918.

If the system can comply with directions in step 3914, then the spectrum manager provides a calibrated right to the requesting RF system in step 3920. In step 3922, the system can then assess whether the granted right is adequate for its needs. If the system accepts the granted right in step 3922, then the system uses the spectrum in step 3924. Otherwise, the system rejects the authorization and the process starts over in step 3926.

A significant aspect of this process of negotiating for spectrum rights and then calibrating that use is the use of the LBSR to convey spectrum needs, to propose alternatives, and to direct transmission tests.

5. Secondary Spectrum Markets

A common lament of manufacturers of RF products, of providers of services using RF spectrum, and of enterprises that use RF spectrum in their operations is that there are many bands of spectrum that do not appear to be used. However, users of that spectrum insist that their use is critical even if it is sporadic. A primary cause of the loss of use of spectrum is an artifact of spectrum management and administrative approaches that seek persistent assignments, and as such, sporadic users that have protection needs receive persistent protection. Spectrum administrations, such as the Federal Communications Commission (FCC), have clearly indicated through their policies that they do not intend to participate in the dynamic management and enforcement of spectrum use. Therefore, the detachment of the FCC provides the opportunity for non-government entities to take on the role of spectrum broker with a net social benefit of making more of the RF spectrum available for use. In general, the non-governmental entities believe brokering activity can be self-supporting, and that the opportunities to earn money on unused spectrum will serve as an incentive to sporadic users of spectrum to find ways that make their spectrum available on the secondary market, while also keeping it available for their use on amenable terms.

In one embodiment, the LBSR and the spectrum management capabilities it enables are well suited for brokering activities. The LBSR definition of the spectrum resource captures spectral, spatial, and temporal use of spectrum. It enables the combining of rights or the subdivision of rights into smaller amounts dividing those smaller amounts using any of the dimensions of time, space or frequency. Spectrum resale could be either a simple price for resource or could involve a negotiation process where the requirements of the resource are specified, the broker suggests alternatives, the customer chooses an alternative, and the broker and the customer negotiate a price. The means for communicating requests and receiving authorizations can all be through the internet. An exemplary of this process could follow the same flow chart as in FIG. 39 with the addition that bids and/or prices would be included in the initial negotiation steps 3902, 3204, 3206, and 3909 of FIG. 39.

In order to be a viable solution, a standardized syntax will be required for communicating rights. In one embodiment, the definition of the syntax is to be defined through a standardization process.

Exemplary Computer Systems

Figure 40:
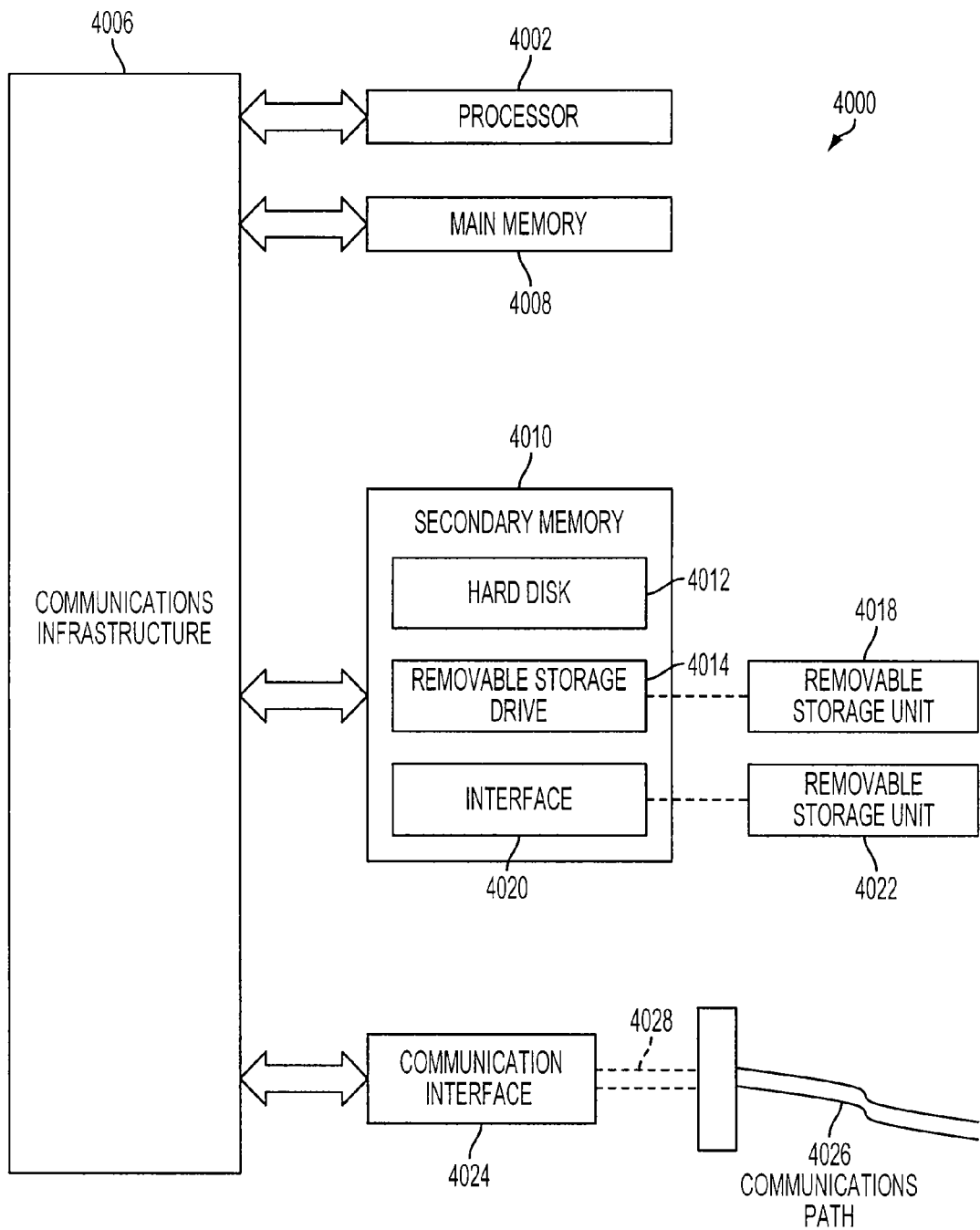
FIG. 40 is an exemplary computer architecture upon which the methods, systems, and computer program products of the present invention may be implemented in accordance with an embodiment of the invention.

FIG. 40 is an exemplary computer architecture 4000 upon which the methods, systems, and computer program products of the present invention may be implemented, according to an embodiment of the invention. Exemplary computer system 4000 includes one or more processors, such as processor 4002. The processor 4002 is connected to a communication infrastructure 4006, such as a bus or network. Various example software implementations are described in terms of this exemplary computer system. After reading this description, it will become apparent to a person skilled in the relevant art how to implement the invention using other computer systems and/or computer architectures.

Computer system 4000 also includes a main memory 4008, preferably random access memory (RAM), and may include a secondary memory 4010. The secondary memory 4010 may include, for example, a hard disk drive 4012 and/or a removable storage drive 4014, representing a magnetic tape drive, an optical disk drive, CD/DVD drive, etc. The removable storage drive 4014 reads from and/or writes to a removable storage unit 4018 in a well-known manner. Removable storage unit 4018 represents a magnetic tape, optical disk, or other storage medium that is read by and written to by removable storage drive 4014. As will be appreciated, the removable storage unit 4018 can include a computer usable storage medium having stored therein computer software and/or data.

In alternative implementations, secondary memory 4010 may include other means for allowing computer programs or other instructions to be loaded into computer system 4000. Such means may include, for example, a removable storage unit 4022 and an interface 4020. An example of such means may include a removable memory chip (such as an EPROM, or PROM) and associated socket, or other removable storage units 4022 and interfaces 4020, which allow software and data to be transferred from the removable storage unit 4022 to computer system 4000.

Computer system 4000 may also include one or more communications interfaces, such as communications interface 4024. Communications interface 4024 allows software and data to be transferred between computer system 4000 and external devices. Examples of communications interface 4024 may include a modem, a network interface (such as an Ethernet card), a communications port, a PCMCIA slot and card, etc. Software and data transferred via communications interface 4024 are in the form of signals 4028, which may be electronic, electromagnetic, optical or other signals capable of being received by communications interface 4024. These signals 4028 are provided to communications interface 4024 via a communications path (i.e., channel) 4026. This channel 4026 carries signals 4028 and may be implemented using wire or cable, fiber optics, an RF link and other communications channels. In an embodiment of the invention, signals 4028 comprise data packets sent to processor 4002. Information representing processed packets can also be sent in the form of signals 4028 from processor 4002 through communications path 4026.

The terms "computer program medium" and "computer usable medium" are used to refer generally to media such as removable storage units 4018 and 4022, a hard disk installed in hard disk drive 4012, and signals 4028, which provide software to the computer system 4000.

Computer programs are stored in main memory 4008 and/or secondary memory 4010. Computer programs may also be received via communications interface 4024. Such computer programs, when executed, enable the computer system 4000 to implement the present invention as discussed herein. In particular, the computer programs, when executed, enable the processor 4002 to implement the present invention. Where the invention is implemented using software, the software may be stored in a computer program product and loaded into computer system 4000 using removable storage drive 4014, hard drive 4012 or communications interface 4024.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for dynamically managing available spectrum across a plurality of bands for concurrent reuse in a radio frequency (RF) environment, comprising:

defining a transmitter right for a transmitter in a first system in a predetermined band by establishing spatial, spectral, and temporal restrictions on a second RF system in the predetermined band, the transmitter right responsive to a geographical location of the transmitter, a maximum power density, a spectrum mask, and a power map;

defining a receiver right for a receiver in the first RF system in the predetermined band by establishing spatial, spectral, and temporal restrictions on the second RF system in the predetermined band responsive to a location of the receiver, a maximum power density, an underlay mask, and a propagation map;

determining responsive to the transmitter right and the receiver right in the first RF system, a first interference caused by the first RF system and affecting the second RF system in the predetermined band during a time period in a geographical region and a second interference caused by the second RF system and affecting the first RF system in the predetermined band during the time period in the geographical region;

determining by the second RF system a concurrent reuse of available spectrum in the predetermined band during the time period in the geographical region not being used by the first RF system responsive to the first and second interference; and transmitting by the second RF system a request for concurrent reuse of available spectrum in the predetermined band during the time period in the geographical region to a spectrum manager.

2. The method of claim 1, wherein the underlay mask specifies a maximum power density at the receive of a maximum allowed interference of a remote interfering transmission.

3. The method of claim 1, further comprising:
generating a comparison of the second interference with a maximum allowed interference of a remote interfering transmission across all regions in which the receiver right applies; and
identifying, based on the comparison, regions of space in which the second interference is less than the maximum allowed interference of the remote interfering transmission.

4. The method of claim 1, wherein the transmitter right and the receiver right are further responsive to a maximum power density, a minimum power density, rules, geospatial parameters, and temporal parameters.

5. The method of claim 4, wherein the geospatial parameters comprise one or more of a point in space, a volume in space, or a track through space; and wherein the temporal parameters comprise one or more of a start time, and end time, and an expression of periodicity.

6. The method of claim 1, further comprising specifying the spectrum mask and the underlay mask as a vector of values alternating between frequency and power density.

7. The method of claim 1, further comprising specifying the propagation map and the power map as a vector of values comprising azimuths, elevations, and values of a model parameter.

8. The method of claim 1, further comprising adjusting a consumption of spectrum by a secondary user in the geographical region based on determined consumption of spectrum by a primary user in the geographical region.

9. The method of claim 1, further comprising:
computing a maximum permissible power for the spectrum mask and a maximum power for the power map; and
verifying that all RF emissions from the transmitter are within the maximum permissible power and the maximum power.

10. The method of claim 1, wherein the request for concurrent reuse of available spectrum is made by a secondary user based on the transmitter right and the receiver right of a primary user.

11. The method of claim 10, further comprising:
managing the available spectrum to increase use in one or more of a spatial, temporal, or spectral dimension.

12. The method of claim 11, wherein the managing further comprises subdividing the available spectrum in one or more of a spatial, temporal, or spectral dimension.

13. The method of claim 11, wherein the managing further comprises trading at least a portion of the available spectrum to a user in exchange for a payment.

14. The method of claim 1, further comprising:
negotiating a price for the available spectrum by the second RF system.

15. The method of claim 14, wherein the negotiating further comprises:
receiving at least one bid from at least one bidder for the of available spectrum.

16. The method of claim 1, further comprising:
reselling the available spectrum responsive to a negotiation between a broker and a customer.

17. The method of claim 16, further comprising:
communicating requests for the available spectrum and authorizing the requests for the available spectrum over a communications network.

18. The method of claim 1, further comprising:
trading the available spectrum to a user upon payment of a negotiated price.

19. The method of claim 18, wherein the negotiated price is negotiated by a broker and a customer according to a bidding process.

20. The method of claim 1, further comprising:
receiving a request from a requester for the available spectrum in the geographical region by the spectrum manager;
determining whether the request for the available spectrum is supportable by the first RF system;
negotiating a trade of the available spectrum between a broker and the requester; and
trading the available spectrum to the requester upon payment of a negotiated price to a broker.

21. The method of claim 1, further comprising:
defining boundaries of spectrum use based on at least the defined transmitter right and the defined receiver right; and
determining whether a new use of spectrum may coexist with current use of the spectrum based on the boundaries of spectrum use.

22. A system for dynamically managing available spectrum across a plurality of bands for concurrent reuse in a radio frequency (RF) environment, comprising:
computer readable code for defining a transmitter right for a transmitter in a first RF system in a predetermined band by establishing spatial, spectral, and temporal restrictions on a second RF system in the predetermined band, the transmitter right responsive to a geographical location of the transmitter, a maximum power density, a spectrum mask, and a power map;
computer readable code for defining a receiver right for a receiver in the first RF system in the predetermined band by establishing spatial, spectral, and temporal restrictions on the second RF system in the predetermined band responsive to a location of the receiver, a maximum power density, an underlay map, and a propagation map;
computer readable code for determining responsive to the transmitter right and the receiver right in the first RF system, a first interference caused by the first RF system and affecting the second RF system in the predetermined band during a time period in a geographical region and a second interference caused by the second RF system and affecting the first RF system in the predetermined band during the time period in the geographical region;
computer readable code for determining by the second RF system a concurrent reuse of available spectrum in the predetermined band during the time period in the geographical region not being used by the first RF system responsive to the first and second interference;
computer readable code for transmitting by the second RF system a request for concurrent reuse of available spectrum in the predetermined band during the time period in the geographical region to a spectrum manager; and
at least one processor configured to process the computer readable code.

23. The system of claim 22, wherein the underlay mask specifies a maximum power density at the receiver of a maximum allowed interference of a remote interfering transmission.

24. The system of claim 22, further comprising:
computer readable code for generating a comparison of the second interference with a maximum allowed interference of a remote interfering transmission across all regions in which the receiver right applies; and
computer readable code for identifying, based on the comparison, regions of space in which the second interference is less than the maximum allowed interference of the remote interfering transmission.

25. The system of claim 22, wherein the transmitter right and the receiver right are further responsive to a maximum power density, a minimum power density, rules, geospatial parameters, and temporal parameters.

26. The system of claim 25, wherein the geospatial parameters comprise one or more of a point in space, a volume in space, or a tack through space; and wherein the temporal parameters comprise one or more of a start time, and end time, and an expression of periodicity.

27. The system of claim 22, further comprising computer readable code for specifying the spectrum mask and the underlay mask as a vector of values alternating between frequency and power density.

28. The system of claim 22, further comprising computer readable code for specifying the propagation map and the power map as a vector of values comprising azimuths, elevations, and values of a model parameter.

29. The system of claim 22, further comprising computer readable code for adjusting a consumption of spectrum by a secondary user in the geographical region based on determined consumption of spectrum by a primary user in the geographical region.

30. The system of claim 22, further comprising:
computer readable code for computing a maximum permissible power for the spectrum mask and a maximum power for the power map; and
computer readable code for verifying that all RF emissions from the transmitter are within the maximum permissible power and the maximum power.

31. The system of claim 22, wherein the request for concurrent reuse of available spectrum is made by a secondary user based on the transmitter right and the receiver right of a primary user.

32. The system of claim 31, further comprising computer readable code for managing the available spectrum to increase use in one or more of a spatial, temporal, or spectral dimension.

33. The system of claim 32, wherein the computer readable code for managing further comprises computer readable code for subdividing the available spectrum in one or more of a spatial, temporal, or spectral dimension.

34. The system of claim 32, wherein the computer readable code for managing further comprises computer readable code for facilitating the trade of at least a portion of the available spectrum to a user in exchange for a payment.

35. A computer program product comprising a non-transitory computer-readable medium having control logic stored therein for causing a processor to dynamically manage available spectrum across a plurality of bands for concurrent reuse in a radio frequency (RF) environment, said control logic comprising:
first computer readable program code for causing the processor to define a transmitter right for a transmitter in a first RF system in a predetermined band by establishing spatial, spectral, and temporal restrictions on a second RF system in the predetermined band, the transmitter right responsive to a geographical location of the transmitter, a maximum power density, a spectrum mask, and a power map;
second computer readable program code for causing the processor to define a receiver right for a receiver in of the first RF system in the predetermined band by establishing spatial, spectral, and temporal restrictions on the second RF system in the predetermined band responsive to a location of the receiver, a maximum power density, an underlay mask, and a propagation map;
third computer readable program code for causing the processor to determine responsive to the transmitter right and the receiver right in the first RF system, a first interference caused by the first RF system and affecting the second RF system in the predetermined band during a time period in a geographical region and a second interference caused by the second RF system and affecting the first RF system in the predetermined band during the time period in the geographical region;
fourth computer readable program code for causing the processor to determine by the second RF system a concurrent reuse of available spectrum in the predetermined band during the time period in the geographical region not being used by the first RF system responsive to the first and second interference; and
fifth computer readable program code for causing the processor to transmit by the second RF system a request for concurrent reuse of available spectrum in the predetermined band during the time period in the geographical region to a spectrum manager.

36. The computer program product of claim 35, wherein the underlay mask specifies a maximum power density at the receiver of a maximum allowed interference of a remote interfering transmission.

37. The computer program product of claim 35, said control logic further comprising:
computer readable program code for causing the processor to generate a comparison of the second interference with a maximum allowed interference of a remote interfering transmission across all regions in which the receiver right applies; and
computer readable program code for causing the processor to identify, based on the comparison, regions of space in which the second interference is less than the maximum allowed interference of the remote interfering transmission.

38. The computer program product of claim 35, wherein the transmitter right and the receiver right are further responsive to a maximum power density, a minimum power density, rules, geospatial parameters, and temporal parameters.

39. The computer program product of claim 38, wherein the geospatial parameters comprise one or more of a point in space, a volume in space, or a track through space; and wherein the temporal parameters comprise one or more of a start time, and end time, and an expression of periodicity.

40. The computer program product of claim 35, said control logic further comprising:
computer readable program code for causing the processor to specify the spectrum mask and the underlay mask as a vector of values alternating between frequency and power density.

41. The computer program product of claim 35, said control logic further comprising:
computer readable program code for causing the processor to specify the propagation map and the power map as a vector of values comprising azimuths, elevations, and values of a model parameter.

42. The computer program product of claim 35, said control logic further comprising:
  computer readable program code for causing the processor to adjust a consumption of spectrum by a secondary user in the geographical region based on determined consumption of spectrum by a primary user in the geographical region.

43. The computer program product of claim 35, said control logic further comprising:
  computer readable program code for causing the processor to compute a maximum permissible power for the spectrum mask and a maximum power for the power map; and
  computer readable program code for causing the processor to verify that all RF emissions from the transmitter are within the maximum permissible power and the maximum power.

44. The computer program product of claim 35, wherein the request for concurrent reuse of available spectrum is made by a secondary user based on the transmitter right and the receiver right of a primary user.

45. The computer program product of claim 44, said control logic further comprising:
  computer readable program code for causing the processor to manage the available spectrum to increase use in one or more of a spatial, temporal, or spectral dimension.

46. The computer program product of claim 45, said control logic further comprising:
  computer readable program code for causing the processor to subdivide the available spectrum in one or more of a spatial, temporal, or spectral dimension.

47. The computer program product of claim 45, said control logic further comprising:
  computer readable program code for causing the processor to trade at least a portion of the available spectrum to a user in exchange for a payment.

* * * * *

UNITED STATES PATENT AND TRADEMARK OFFICE
CERTIFICATE OF CORRECTION

| | | |
|---|---|---|
| PATENT NO. | : 8,712,426 B2 | Page 1 of 1 |
| APPLICATION NO. | : 11/984671 | |
| DATED | : April 29, 2014 | |
| INVENTOR(S) | : Stine | |

It is certified that error appears in the above-identified patent and that said Letters Patent is hereby corrected as shown below:

On the Title Page, Item [54] and in the Specification, Column 1, Line 2, please replace "Ratio" with --Radio--.

Signed and Sealed this
Twenty-second Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,712,426 B2  
APPLICATION NO. : 11/984671  
DATED : April 29, 2014  
INVENTOR(S) : John Andrew Stine It is certified that error appears in the above-identified patent and that said Letters Patent is hereby corrected as shown below:

In the Claims:

Column 45, line 6, claim 2, please replace "receive" with --receiver--.

Column 47, line 17, claim 26, please replace "tack" with --track--.

Column 48, line 5, claim 35, please delete "of" between --in-- and --the--.

Signed and Sealed this
Second Day of September, 2014

Michelle K. Lee
*Deputy Director of the United States Patent and Trademark Office*